US012795070B2

(12) United States Patent
Filippov et al.

(10) Patent No.: US 12,795,070 B2
(45) Date of Patent: Nov. 10, 2026

(54) PREDICTION WITH LOCAL ILLUMINATION COMPENSATION

(71) Applicant: Comcast Cable Communications, LLC, Philadelphia, PA (US)

(72) Inventors: Alexey Konstantinovich Filippov, Khimki (RU); Vasily Alexeevich Rufitskiy, Vladimir (RU); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 56 days.

(21) Appl. No.: 18/513,101

(22) Filed: Nov. 17, 2023

(65) Prior Publication Data

US 2024/0179301 A1 May 30, 2024

Related U.S. Application Data

(60) Provisional application No. 63/463,186, filed on May 1, 2023, provisional application No. 63/426,664, filed on Nov. 18, 2022.

(51) Int. Cl.
*H04N 19/105* (2014.01)
*G06T 5/20* (2006.01)
(Continued)

(52) U.S. Cl.
CPC ............. *H04N 19/105* (2014.11); *G06T 5/20* (2013.01); *G06T 5/94* (2024.01); *H04N 19/136* (2014.11);
(Continued)

(58) Field of Classification Search
CPC ... G06T 2207/10016; G06T 5/20; G06T 5/94; H04N 19/105; H04N 19/136;
(Continued)

(56) References Cited

U.S. PATENT DOCUMENTS

2015/0373370 A1* 12/2015 Rapaka .................. H04N 19/52 375/240.02
2017/0339404 A1* 11/2017 Panusopone ......... H04N 19/647
(Continued)

FOREIGN PATENT DOCUMENTS

JP 2019531029 A 10/2019
JP 2021518059 A 7/2021
(Continued)

OTHER PUBLICATIONS

JVET-AB2025, Joint Video Experts Team (JVET) of ITU-T SG 16 WP 3 and ISO/IEC JTC 1/SC 29 28th Meeting, Mainz, DE, Oct. 20-28, 2022, Source: Editors, Title: Algorithm Description of Enhanced Compression Model 7 (ECM 7).
(Continued)

*Primary Examiner* — Anner Holder
(74) *Attorney, Agent, or Firm* — Banner & Witcoff, Ltd.

(57) ABSTRACT

A current block to be encoded and candidate reference block templates may be determined from the same picture. A bitstream may include an indication of whether to use local illumination compensation (LIC) on the current block. Based on the indication, differences between the current block and the candidate reference blocks may be determined. Based on the differences, a reference block may be determined, and a prediction of the current block may be made based on the indication and the difference between the current block and the reference block.

20 Claims, 33 Drawing Sheets

(51) Int. Cl.

| | |
|---|---|
| ***G06T 5/94*** | (2024.01) |
| ***H04N 19/136*** | (2014.01) |
| ***H04N 19/159*** | (2014.01) |
| ***H04N 19/176*** | (2014.01) |

(52) U.S. Cl.
CPC ......... *H04N 19/159* (2014.11); *H04N 19/176* (2014.11); *G06T 2207/10016* (2013.01)

(58) Field of Classification Search
CPC .. H04N 19/159; H04N 19/176; H04N 19/593; H04N 19/70; H04N 19/91
See application file for complete search history.

(56) References Cited

U.S. PATENT DOCUMENTS

| | | | | |
|---|---|---|---|---|
| 2017/0347095 | A1* | 11/2017 | Panusopone | H04N 19/70 |
| 2020/0396465 | A1* | 12/2020 | Zhang | H04N 19/107 |
| 2021/0235110 | A1* | 7/2021 | Liu | H04N 19/52 |
| 2022/0109852 | A1* | 4/2022 | Xu | H04N 19/159 |
| 2022/0239899 | A1* | 7/2022 | Zhang | H04N 19/46 |
| 2023/0095946 | A1* | 3/2023 | Ruiz Coll | H04N 19/52 375/240.02 |
| 2024/0267533 | A1* | 8/2024 | Zhang | H04N 19/176 |

FOREIGN PATENT DOCUMENTS

| | | | |
|---|---|---|---|
| WO | 2019234639 | A1 | 12/2019 |
| WO | 2020084506 | A1 | 4/2020 |
| WO | 2022167322 | A1 | 8/2022 |
| WO | 2023198131 | A1 | 10/2023 |

OTHER PUBLICATIONS

JVET-AC0112, Joint Video Experts Team (JVET) of ITU-T SG 16 WP 3 and ISO/IEC JTC 1/SC 29 29th Meeting, by teleconference, Jan. 11-20, 2023, Source: Bytedance Inc., Kwai Inc., Title: EE2-3.6: IBC-CIIP, IBC-GPM, and IBC- LIC.

JVET-G1001-v1, Joint Video Experts Team (JVET) of ITU-T SG 16 WP 3 and ISO/IEC JTC 1/SC 29/WG 11 7th Meeting: Torino, IT, Jul. 13-21, 2017, Source: Editors, Title: Algorithm Description of Joint Exploration Test Model 7 (JEM 7).

JVET-M0500-v3, Joint Video Experts Team (JVET) of ITU-T SG 16 WP 3 and ISO/IEC JTC 1/SC 29/WG 11 13th Meeting: Marrakech, MA, Jan. 9-18, 2019, Source: Qualcomm Incorporated, Title: CE10-related: Unidirectional illumination compensation.

JVET-N0343-v3, Joint Video Experts Team (JVET) of ITU-T SG 16 WP 3 and ISO/IEC JTC 1/SC 29/WG 11 14th Meeting: Geneva, CH, Mar. 19-27, 2019, Source: Qualcomm Incorporated, Title: CE1: Unidirectional illumination compensation (CE1-5.1).

JVET-O0066-v1, Joint Video Experts Team (JVET) of ITU-T SG 16 WP 3 and ISO/IEC JTC 1/SC 29/WG 11 15th Meeting: Gothenburg, SE, Jul. 3-12, 2019, Source: Qualcomm Incorporated, MediaTek Inc, Huawei Technologies. Co., Ltd, Title: CE4-3.1a and CE4-3.1b: Unidirectional local illumination compensation with affine prediction.

Mar. 4, 2024—International Search Report—App. No. PCT/US2023/080360.

JVET-G1001-v1, JVET of ITU-T SG 16 WP3, 7th Meeting, Torino, Italy, Jul. 13-21, 2017, Source: Editors, Title: Algorithm Description of Joint Exploration Test Model 7 (JEM 7).

Kim, Jae Hoon et al., New Coding Tools for Illumination and Focus Mismatch Compensation in Multiview Video Coding, IEEE Transactions on Circuits and Systems for Video Technology, [online], vol. 17, No. 11, IEEE, 2007, pp. 1519-1535, Retrieved from <URL: https://ieeexplore.ieee.org/document/4373321>.

JVET-Q2001-v1, Joint Video Experts Team (JVET) of ITU-T SG 16 WP 3 and ISO/IEC JTC 1/SC 29/WG 11 17th Meeting, Brussels, BE, Jan. 7-17, 2020, Source: Editors, Title: Versatile Video Coding (Draft 8).

JVET-X0124-v2, Joint Video Experts Team (JVET) of ITU-T SG 16 WP 3 and ISO/IEC JTC 1/SC 29 24th Meeting, Teleconference, Oct. 6-15, 2021, Source: OPPO, Title: AHG 12: On signalling of intra template matching.

Apr. 28, 2026-Japanese Office Action—JP App. 2025-528813.

* cited by examiner

PREDICTION WITH LOCAL ILLUMINATION COMPENSATION

CROSS-REFERENCE TO RELATED APPLICATIONS

The application claims the benefit of U.S. Provisional Application No. 63/426,664 filed on Nov. 18, 2022, and U.S. Provisional Application No. 63/463,186 filed on May 1, 2023. The above-referenced applications are hereby incorporated by reference in their entirety.

BACKGROUND

A current block may be predicted with or without local illumination compensations (LIC). The current block may be predicted based on a reference block and a difference between templates of the current bock and the reference block.

SUMMARY

The following summary presents a simplified summary of certain features. The summary is not an extensive overview and is not intended to identify key or critical elements.

Intra block copy (IBC) may be used when encoding a current block within a picture to reduce the amount of data that is sent. A difference between templates of the current block and templates of a reference block may be determined. The current block may be predicted using the reference block and the difference between the templates. Local illumination compensation (LIC) is a technique used to compensate for illumination variations between a current block template and a reference block template and may be used during encoding to further reduce the amount of data sent. Prediction of the current block may be with or without LIC, but using LIC in some situations may lead to inaccurate predictions. An encoder may include, in a bitstream, an indication of whether LIC is to be used to predict the current block. By including this indication in the bitstream, a decoder may then determine whether to include LIC in predicting the current block.

These and other features and advantages are described in greater detail below.

BRIEF DESCRIPTION OF THE DRAWINGS

Examples of several of the various embodiments of the present disclosure are described herein with reference to the drawings.

DETAILED DESCRIPTION

Figure 1:
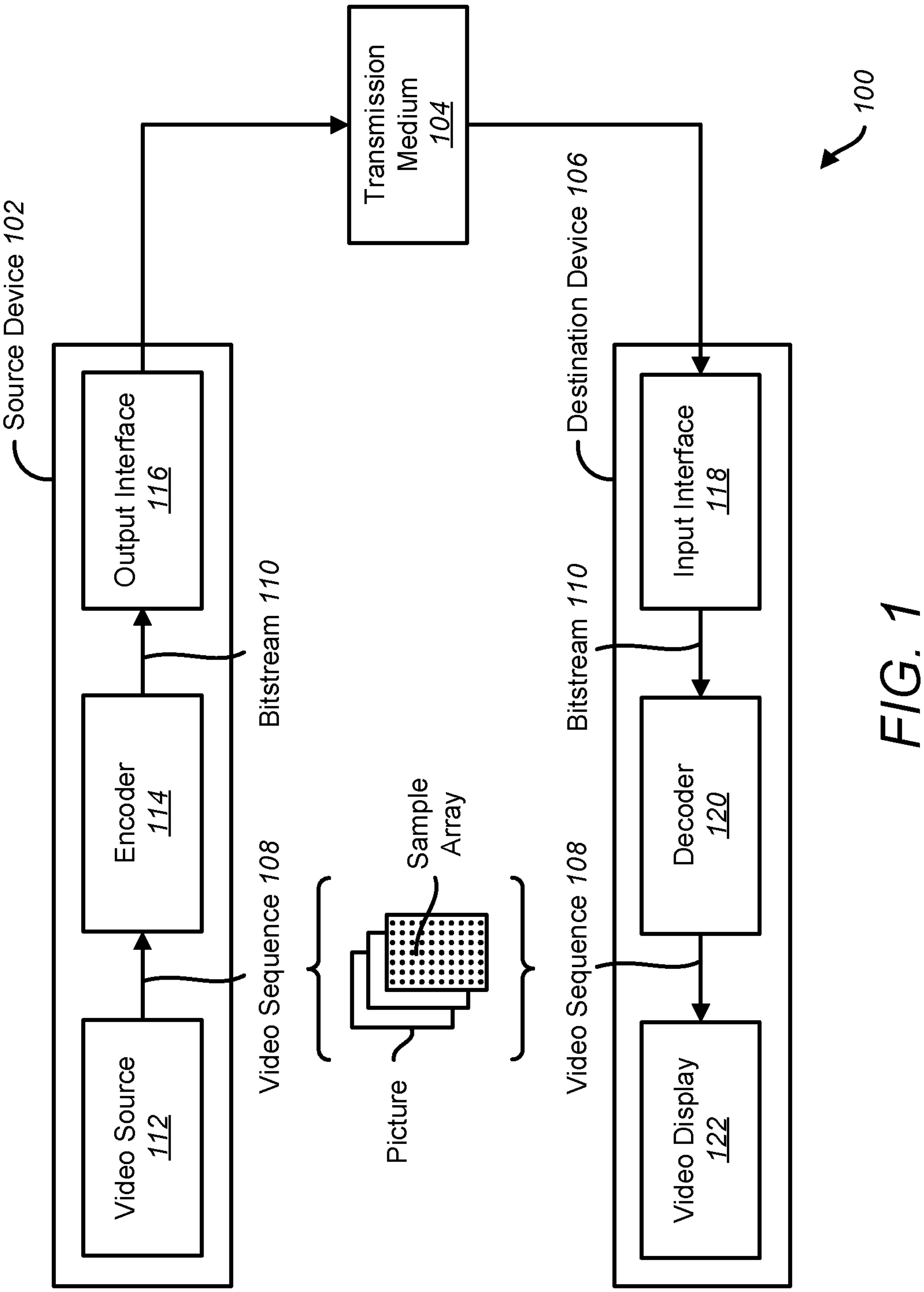
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence 108. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of the video sequence 108.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks using/based on prediction types, motion vectors, and prediction modes. The encoder 114 may perform one or more of quantization and entropy coding of the transform coefficients and/or the other information used to determine the prediction blocks, for example, prior to forming the bitstream 110. The quantization and/or the entropy coding may further reduce the quantity of bits needed to store and/or transmit the video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via the transmission medium 104. The output interface 116 may comprise a wired and/or a wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP)

standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one or more networks (e.g., the internet) or file servers configured to store and/or send/transmit encoded video data.

The destination device 106 may decode the bitstream 110 into the video sequence 108 for display. The destination device 106 may comprise one or more of an input interface 118, a decoder 120, and/or a video display 122. The input interface 118 may be configured to read the bitstream 110 stored on the transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 in accordance with one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence 108. The decoder 120 may generate the prediction blocks using/based on prediction types, prediction modes, and/or motion vectors received in the bitstream 110. The decoder 120 may determine the prediction errors using the transform coefficients received in the bitstream 110. The decoder 120 may determine the prediction errors by weighting transform basis functions using the transform coefficients. The decoder 120 may combine the prediction blocks and the prediction errors to decode the video sequence 108. The video sequence 108 at the destination device 106 may be, or may not necessarily be, the same video sequence sent, such as the video sequence 108 as sent by the source device 102. The decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate in accordance with one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other video coding protocol).

Figure 2:
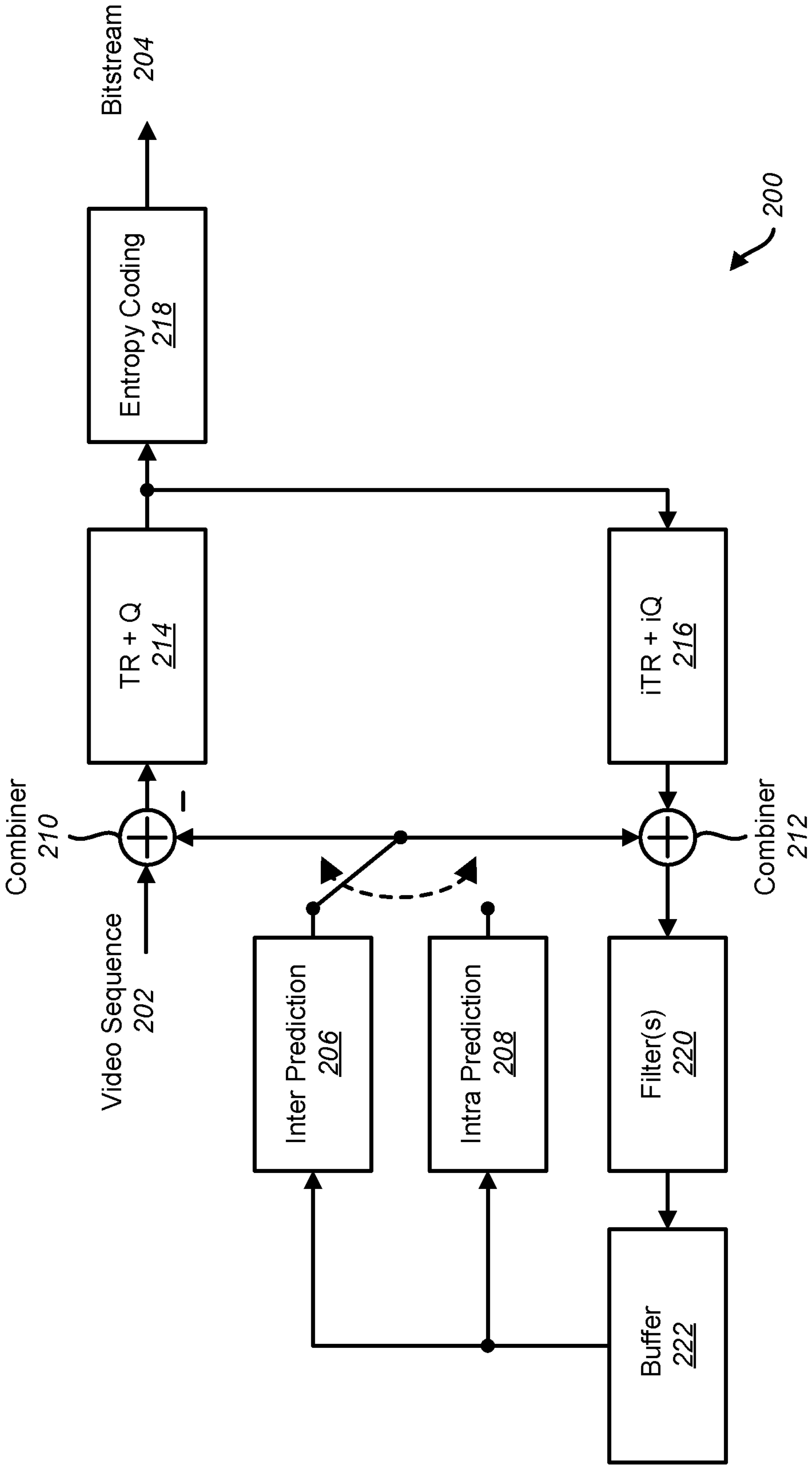
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. The reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of the video sequence 202 may be similar except for differences due to motion and/or affine transformation of the screen content over time.

The intra prediction unit 208 may perform intra prediction by forming a prediction block based on data from reconstructed neighboring samples of the block to be encoded within the same picture of the video sequence 202. The reconstructed sample may be a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of the video sequence 202.

The transform and quantization unit (TR+Q) 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit (iTR+iQ) 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of the video sequence 202.

The encoder 200 may further comprise an encoder control unit. The encoder control unit may be configured to control one or more units of the encoder 200 as shown in FIG. 2. The encoder control unit may control the one or more units of the encoder 200 such that the bitstream 204 may be generated in conformance with the requirements of one or more proprietary coding protocols, industry video coding standards, and/or any other video cording protocol. For example, the encoder control unit may control the one or more units of the encoder 200 such that bitstream 204 may be generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of the video sequence 202 into blocks, whether a block is inter predicted by the inter prediction unit 206 or intra predicted by the intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and/or transform and/or quantization parameters may be packed with the prediction error to form the bitstream 204.

The encoder 200 is merely an example and encoders different from the encoder 200 and/or modified versions of the encoder 200 may perform the methods and processes as described herein. For example, the encoder 200 may comprise other components and/or arrangements. One or more of the components shown in FIG. 2 may be optionally included in the encoder 200 (e.g., the entropy coding unit 218 and/or the filters(s) 220).

Figure 3:
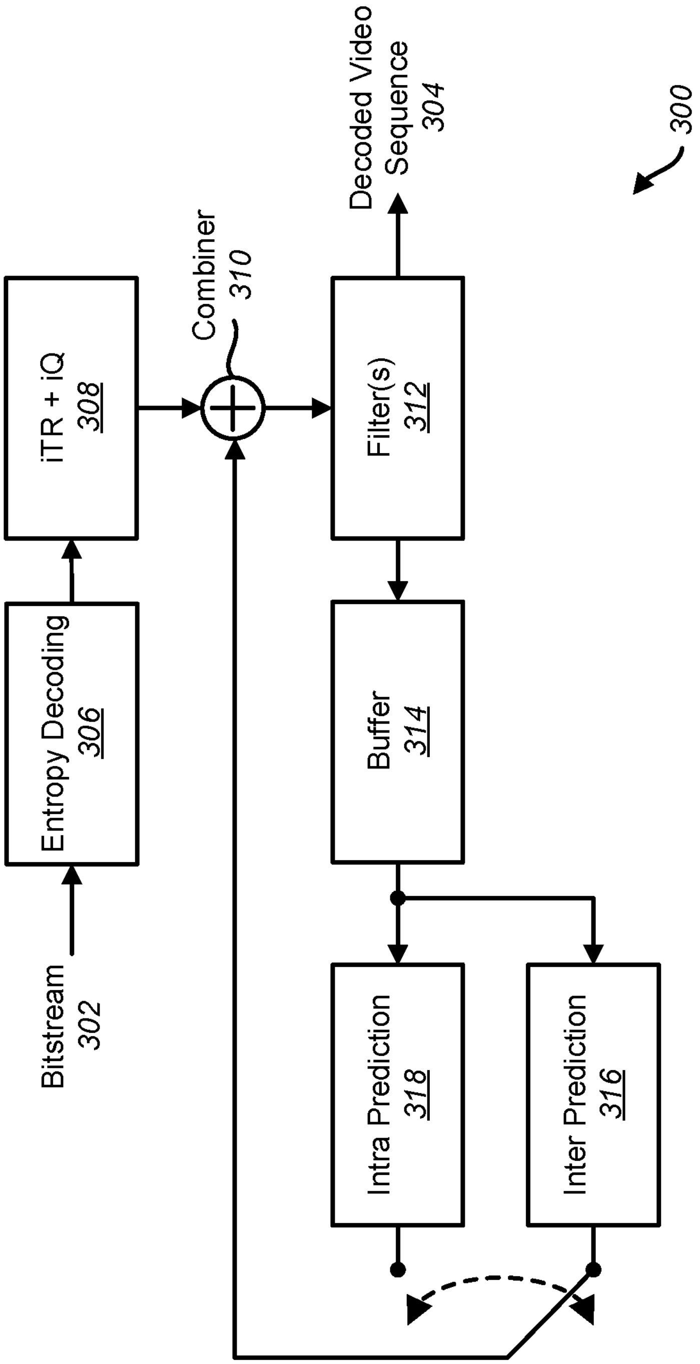
FIG. 3 shows an example decoder.

FIG. 3 shows an example decoder. A decoder 300 as shown in FIG. 3 may implement one or more processes described herein. The decoder 300 may decode a bitstream 302 into a decoded video sequence 304 for display and/or some other form of consumption. The decoder 300 may be implemented in the video encoding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the intra prediction unit 318 or the inter prediction unit 316 (e.g., as described above with respect to encoder 200 in FIG. 2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bit-stream 302. The decoded video sequence 304 may be output from the filter(s) 312 as shown in FIG. 3.

The decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in the decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of 2n×2n samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
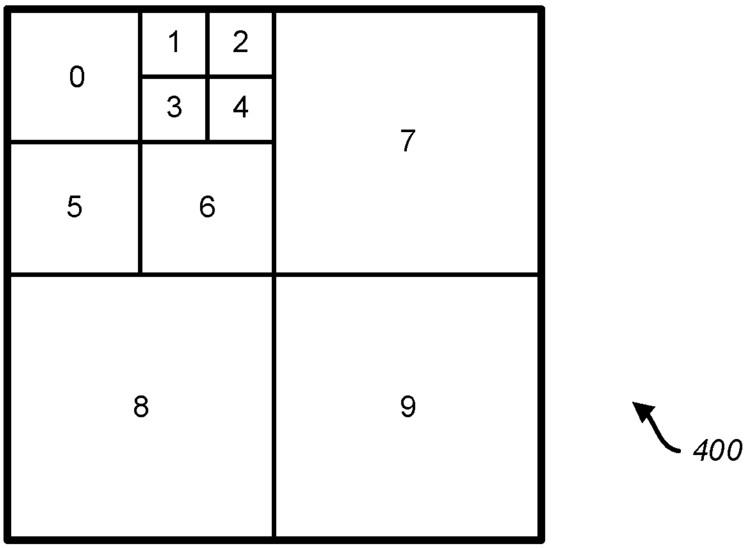
FIG. 4 shows an example quadtree partitioning of a coding tree block (CTB).
Figure 5:
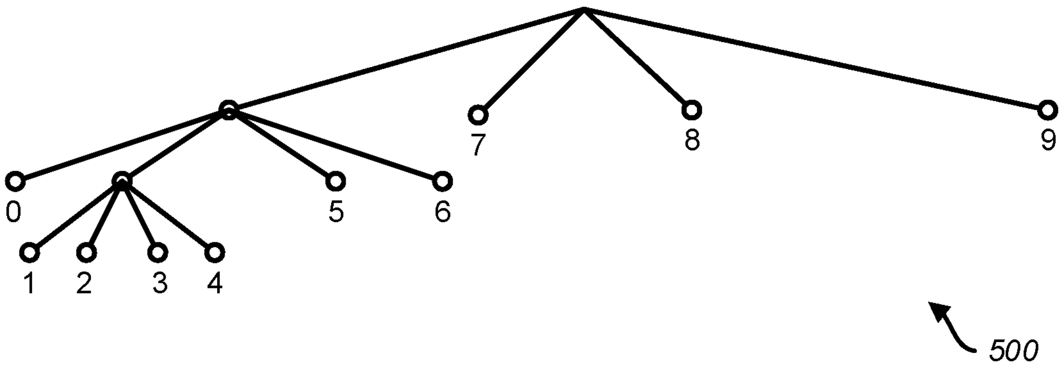
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., 10 CB leaf nodes of the quadtree 500 as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

Figure 6:
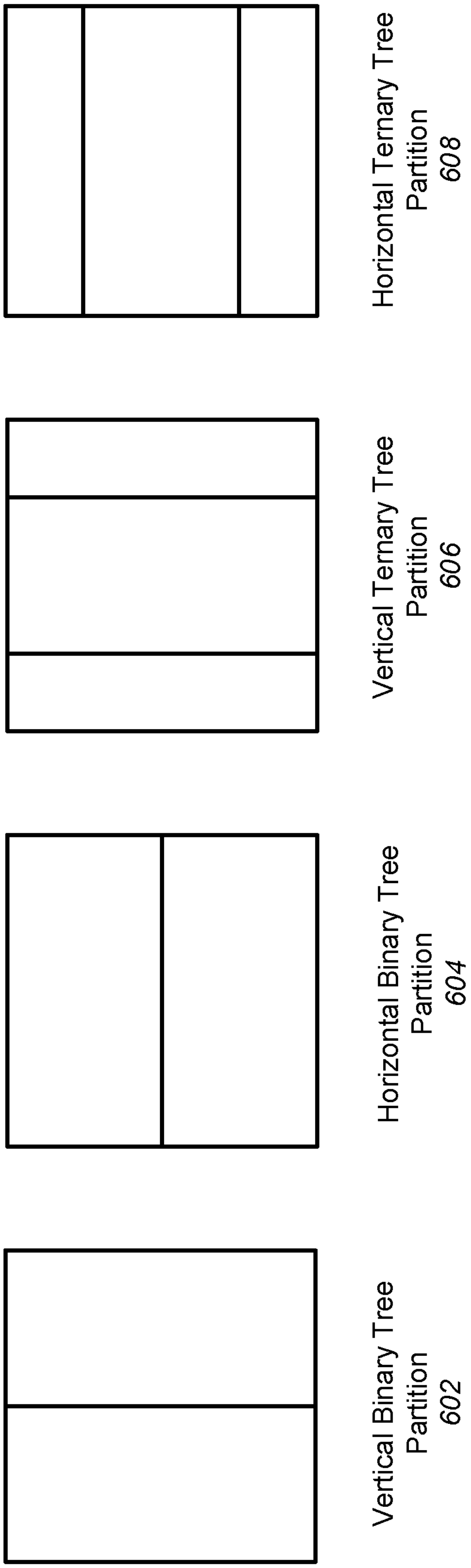
FIG. 6 shows example binary tree and ternary tree partitions.

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type tree partitioning) because of the addition of binary and/or ternary tree partitioning to quadtree partitioning.

Figure 7:
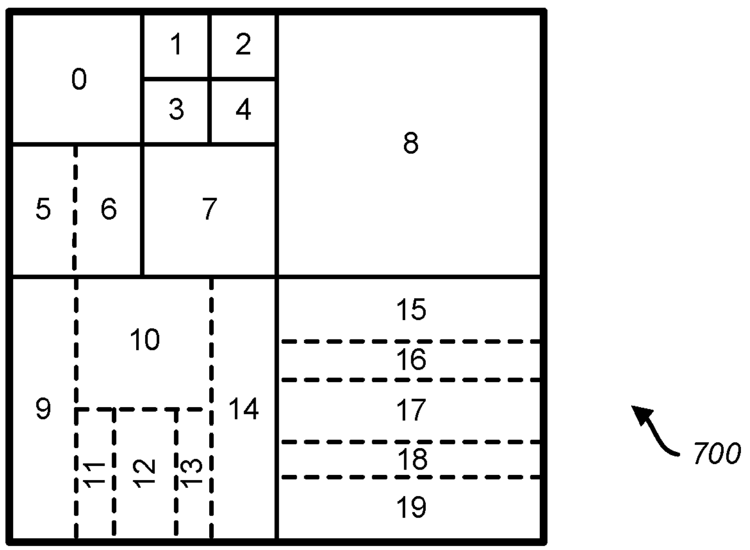
FIG. 7 shows an example of combined quadtree and multi-type tree partitioning of a CTB.
Figure 8:
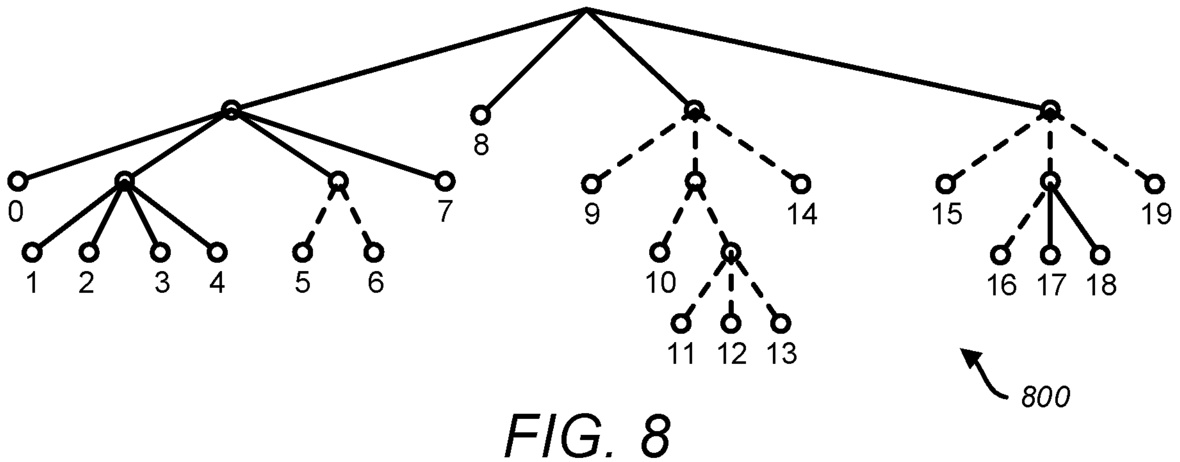
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type tree partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtree partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBS respectively labeled 16, 17, and 18 in FIGS. 7 and 8.

Altogether, the CTB 700 may be partitioned into 20 leaf CBs respectively labeled 0-19. The 20 leaf CBs may correspond to 20 leaf nodes (e.g., 20 leaf nodes of the tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBs, PBs, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
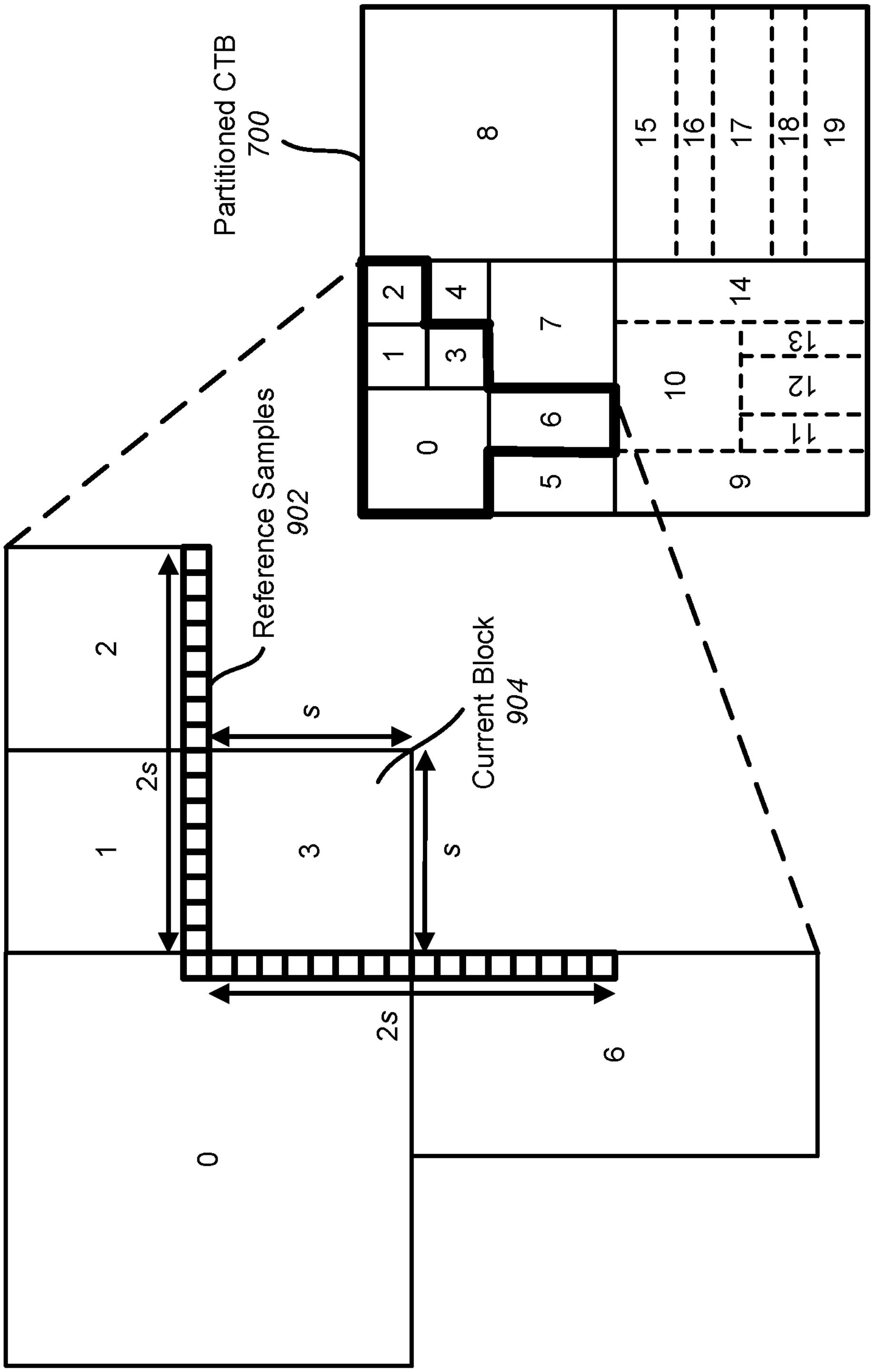
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2w samples (or any other quantity of samples) of the row immediately adjacent to the top-most row of the current block 904, 2h samples (or any other quantity of samples) of the column immediately adjacent to the left-most column of the current block 904, and the top left neighboring corner sample to the current block 904. The current block 904 may be square, such that w=h=s. In other examples, a current block need not be square, such that w≠h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. Samples from neighboring blocks 0, 1, and 2 may be available to construct the reference samples 902 given that these blocks are encoded and reconstructed at an encoder and decoded at a decoder prior to coding of the current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

Unavailable samples from the reference samples 902 may be filled with one or more of the available reference samples 902. For example, an unavailable reference sample may be filled with a nearest available reference sample. The nearest available reference sample may be determined by moving in a clock-wise direction through the reference samples 902 from the position of the unavailable reference. The reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described above. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
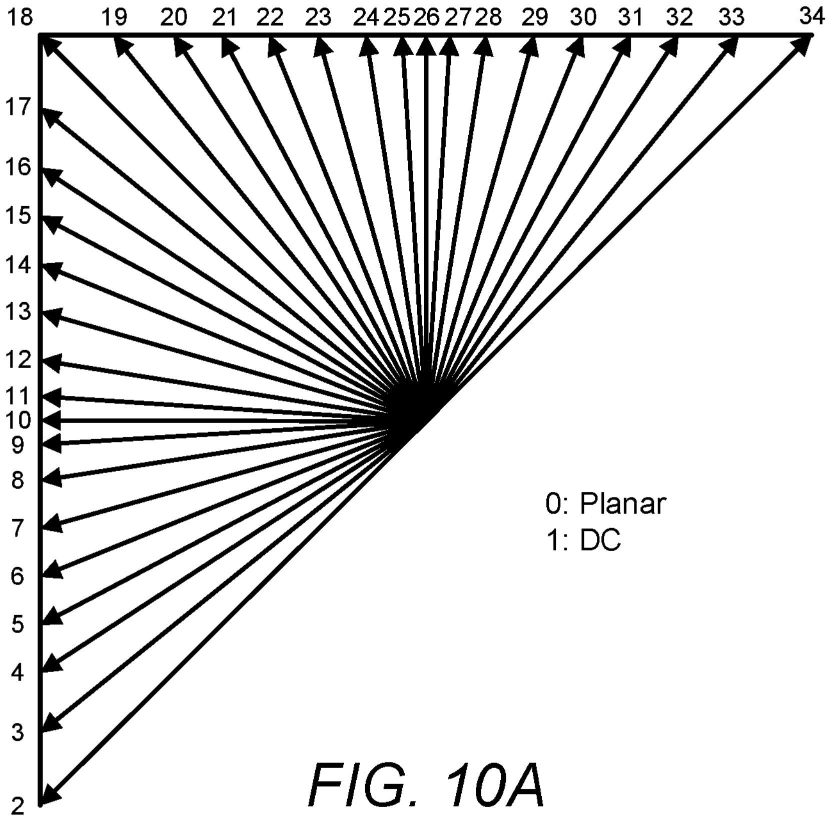
FIGS. 10A and 10B show example intra prediction modes.
Figure 10B:
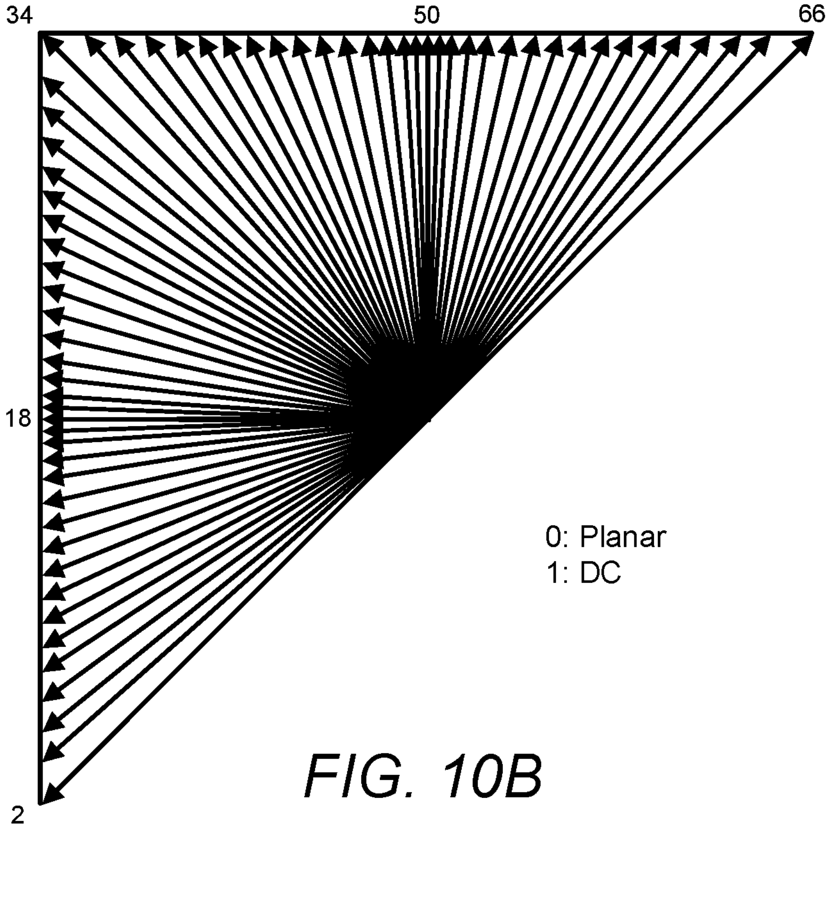

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
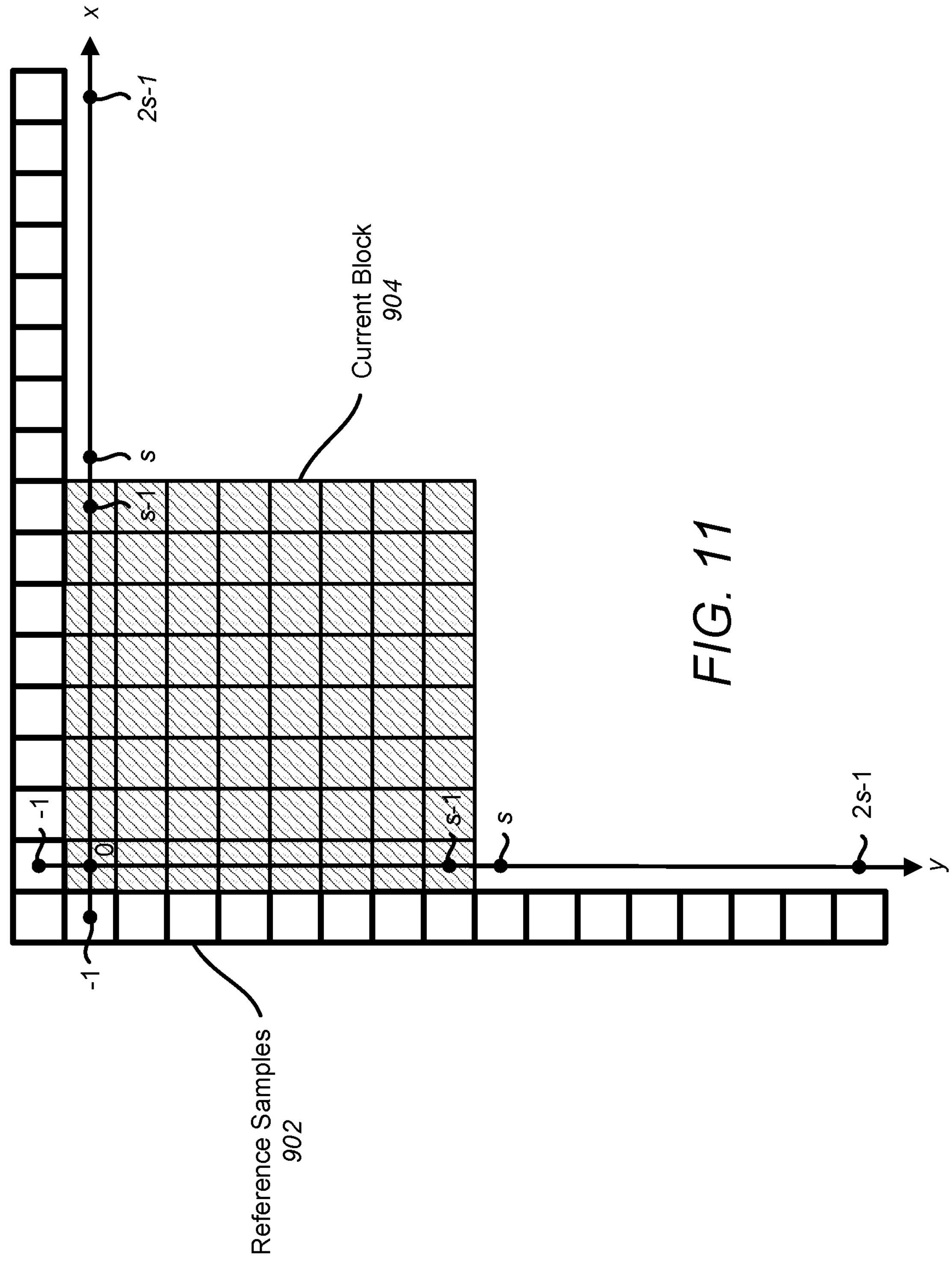
FIG. 11 shows a current block and corresponding reference samples.

FIG. 11 shows a current block and corresponding reference samples. In FIG. 11, the current block 904 and the reference samples 902 from FIG. 9 are shown in a two-dimensional x, y plane, where a sample may be referenced as p[x][y]. In order to simplify the prediction process, the reference samples 902 may be placed in two, one-dimensional arrays. The reference samples 902, above the current block 904, may be placed in the one-dimensional array $ref_1[x]$:

$$ref_1[x] = p[-1+x][-1],\ (x \geq 0). \tag{1}$$

The reference samples 902 to the left of the current block 904 may be placed in the one-dimensional array $ref_2[y]$:

$$ref_2[y] = p[-1][-1+y],\ (y \geq 0). \tag{2}$$

The prediction process may comprise determination of a predicted sample p[x][y] (e.g., a predicted value) at a location [x][y] in the current block 904. For planar mode, a sample at the location [x][y] in the current block 904 may be predicted by determining/calculating the mean of two interpolated values. The first of the two interpolated values may be based on a horizontal linear interpolation at the location [x][y] in the current block 904. The second of the two interpolated values may be based on a vertical linear interpolation at the location [x][y] in the current block 904. The predicted sample p[x][y] in the current block 904 may be determined/calculated as:

$$p[x][y] = \frac{1}{2\cdot s}(h[x][y] + v[x][y] + s), \tag{3}$$

where $$h[x][y] = (s-x-1)\cdot ref_2[y] + (x+1)\cdot ref_1[s] \tag{4}$$

may be the horizonal linear interpolation at the location [x][y] in the current block 904 and $$v[x][y] = (s-y-1)\cdot ref_1[x] + (y+1)\cdot ref_2[s] \tag{5}$$

may be the vertical linear interpolation at the location [x][y] in the current block 904. s may be equal to a length of a side (e.g., a number of samples on a side) of the current block 904.

A sample at a location [x][y] in the current block 904 may be predicted by the mean of the reference samples 902, such as for a DC mode. The predicted sample p [x][y] in the current block 904 may be determined/calculated as:

$$p[x][y] = \frac{1}{2 \cdot s}\left(\sum_{x=0}^{s-1} ref_1[x] + \sum_{y=0}^{s-1} ref_2[y]\right). \tag{6}$$

A sample at a location [x][y] in the current block 904 may be predicted by projecting the location [x][y] in a direction specified by a given angular mode to a point on the horizontal or vertical line of samples comprising the reference samples 902, such as for an angular mode. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
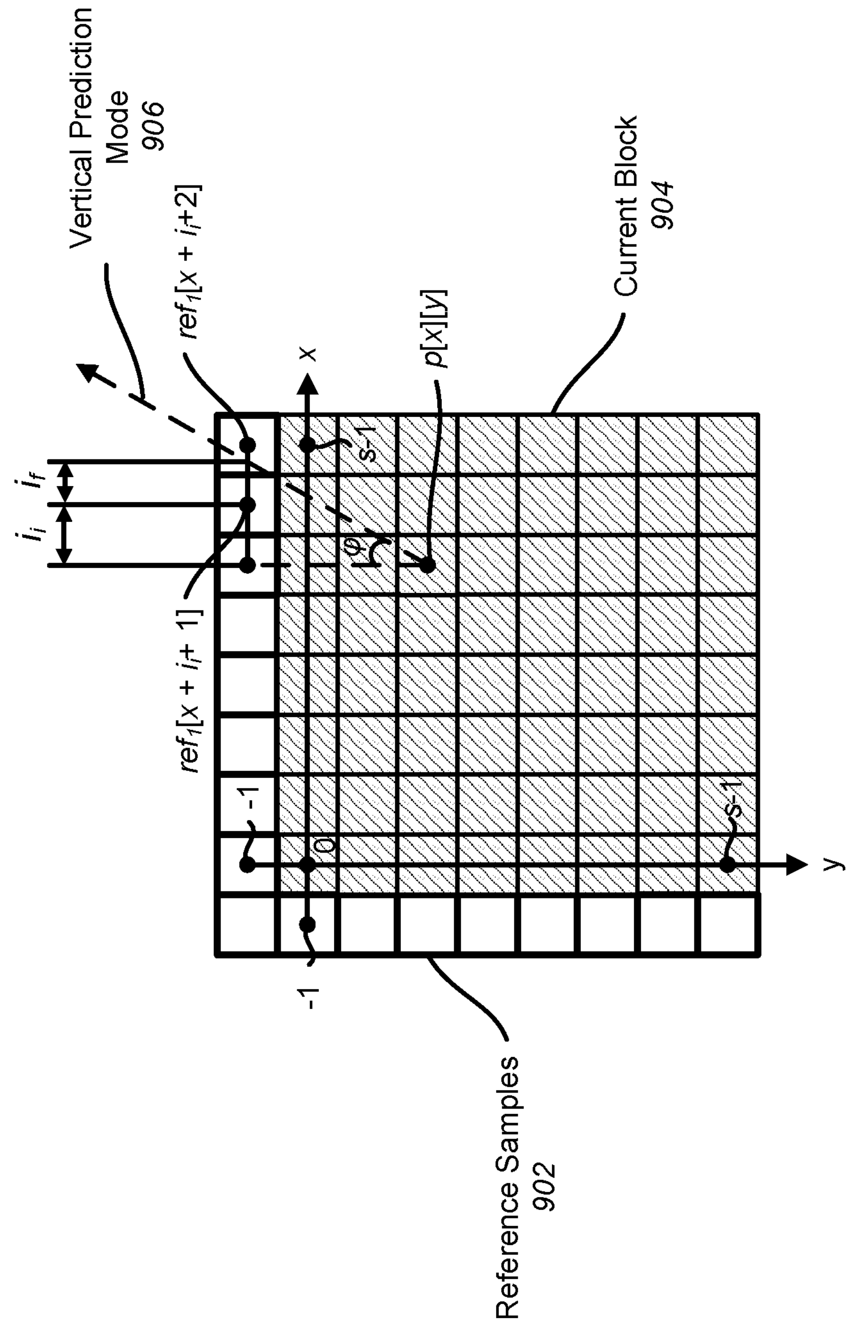
FIG. 12 shows an example application of an intra prediction mode for prediction of a current block.

FIG. 12 shows an example application of an intra prediction mode for prediction of a current block. FIG. 12 specifically shows prediction of a sample at a location [x][y] in the current block 904 for a vertical prediction mode 906. The vertical prediction mode 906 may be given by an angle φ with respect to the vertical axis. The location [x][y] in the current block 904, in vertical prediction modes, may be projected to a point (e.g., a projection point) on the horizontal line of reference samples $ref_1[x]$. The reference samples 902 are only partially shown in FIG. 12 for ease of illustration. As shown in FIG. 12, the projection point on the horizontal line of reference samples $ref_1[x]$ may not be exactly on a reference sample. A predicted sample p[x][y] in the current block 904 may be determined/calculated by linearly interpolating between the two reference samples, for example, if the projection point falls at a fractional sample position between two reference samples. The predicted sample p[x][y] may be determined/calculated as:

$$p[x][y] = (1 - i_f) \cdot ref_1[x + i_i + 1] + i_f \cdot ref_1[x + i_i + 2]. \tag{7}$$

$i_i$ may be the integer part of the horizontal displacement of the projection point relative to the location [x][y]. $i_i$ may be determined/calculated as a function of the tangent of the angle φ of the vertical prediction mode 906 as:

$$i_i = \lfloor (y + 1) \cdot \tan\varphi \rfloor. \tag{8}$$

$i_f$ may be the fractional part of the horizontal displacement of the projection point relative to the location [x][y] and may be determined/calculated as:

$$i_f = ((y + 1) \cdot \tan\varphi) - \lfloor (y + 1) \cdot \tan\varphi \rfloor, \tag{9}$$

where $\lfloor \cdot \rfloor$ is the integer floor function.

A location [x][y] of a sample in the current block 904 may be projected onto the vertical line of reference samples $ref_2[y]$, such as for horizontal prediction modes. A predicted sample p[x][y for horizontal prediction modes may be determined/calculated as:

$$p[x][y] = (1 - i_f) \cdot ref_2[y + i_i + 1] + i_f \cdot ref_2[y + i_i + 2]. \tag{10}$$

$i_i$ may be the integer part of the vertical displacement of the projection point relative to the location [x][y]. $i_i$ may be determined/calculated as a function of the tangent of the angle q of the horizontal prediction mode as:

$$i_i = \lfloor (x + 1) \cdot \tan\varphi \rfloor. \tag{11}$$

$i_i$ may be the fractional part of the vertical displacement of the projection point relative to the location [x][y]. $i_i$ may be determined/calculated as:

$$i_f = ((x + 1) \cdot \tan\varphi) - \lfloor (x + 1) \cdot \tan\varphi \rfloor, \tag{12}$$

where $\lfloor \cdot \rfloor$ is the integer floor function.

The interpolation functions given by Equations (7) and (10) may be implemented by an encoder and/or a decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by $(1-i_f)$ and $i_f$. The predicted sample p[x][y], in angular intra prediction, may be calculated with some predefined level of sample accuracy (e.g., 1/32 sample accuracy, or accuracy defined by any other metric). For 1/32 sample accuracy, the set of two-tap FIR interpolation filters may comprise up to 32 different two-tap FIR interpolation filters—one for each of the 32 possible values of the fractional part of the projected displacement $i_f$. In other examples, different levels of sample accuracy may be used.

The FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on $i_f$ (e.g., similar to the two-tap FIR filter). For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x][y], for vertical prediction modes, may be determined based on the four-tap FIR filter as:

$$p[x][y] = \sum_{i=0}^{3} fT[i] \cdot ref_1[x + iIdx + i], \tag{13}$$

where fT[i], i=0 . . . 3, may be the filter coefficients, and Idx is integer displacement. A predicted sample p[x][y], for horizontal prediction modes, may be determined based on the four-tap FIR filter as:

$$p[x][y] = \sum_{i=0}^{3} fT[i] \cdot ref_2[y + iIdx + i]. \quad (14)$$

Supplementary reference samples may be determined/constructed if the location [x][y] of a sample in the current block 904 to be predicted is projected to a negative x coordinate. The location [x][y] of a sample may be projected to a negative x coordinate, for example, if negative vertical prediction angles φ are used. The supplementary reference samples may be determined/constructed by projecting the reference samples in $ref_2[y]$ in the vertical line of reference samples 902 to the horizontal line of reference samples 902 using the negative vertical prediction angle φ. Supplementary reference samples may be similarly determined/constructed, for example, if the location [x][y] of a sample in the current block 904 to be predicted is projected to a negative y coordinate. The location [x][y] of a sample may be projected to a negative y coordinate, for example, if negative horizontal prediction angles φ are used. The supplementary reference samples may be determined/constructed by projecting the reference samples in $ref_1[x]$ on the horizontal line of reference samples 902 to the vertical line of reference samples 902 using the negative horizontal prediction angle φ.

An encoder may determine/predict samples of a current block being encoded (e.g., the current block 904) for a plurality of intra prediction modes (e.g., using one or more of the functions described herein). For example, an encoder may determine/predict samples of a current block for each of 35 intra prediction modes in HEVC and/or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block. The encoder may determine/select the intra prediction mode to encode the current block based on a rate-distortion measure (e.g., Lagrangian rate-distortion cost) determined using the prediction errors. The encoder may send an indication of the determined/selected intra prediction mode and its corresponding prediction error (e.g., residual) to a decoder for decoding of the current block.

A decoder may determine/predict samples of a current block being decoded (e.g., the current block 904) for an intra prediction mode. For example, a decoder may receive an indication of an intra prediction mode (e.g., an angular intra prediction mode) from an encoder for a current block. The decoder may construct a set of reference samples and perform intra prediction based on the intra prediction mode indicated by the encoder for the current block in a similar manner (e.g., as described above for the encoder). The decoder may add predicted values of the samples (e.g., determined based on the intra prediction mode) of the current block to a residual of the current block to reconstruct the current block. A decoder need not receive an indication of an angular intra prediction mode from an encoder for a current block. A decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for a current block. An encoder may determine a difference, for example, based on/after determining/generating a prediction for a current block (e.g., using inter prediction). The difference may be a prediction error and/or as a residual. The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
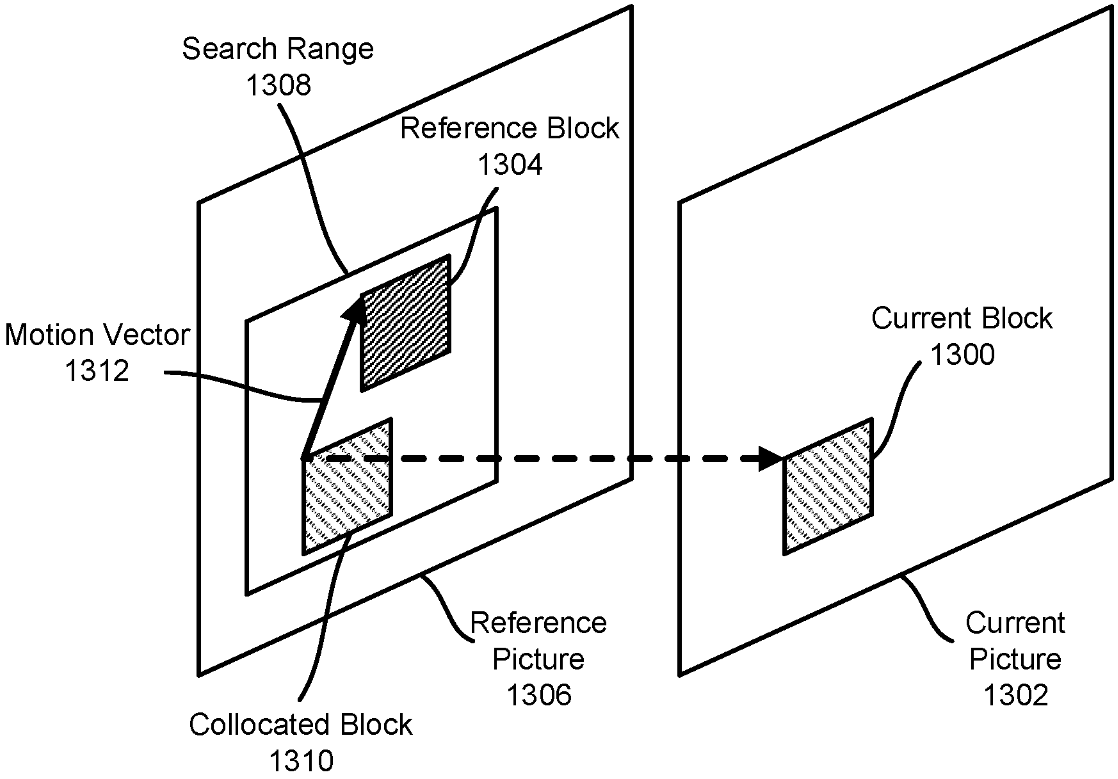
FIG. 13A shows an example of inter prediction.

FIG. 13A shows an example of inter prediction. The inter prediction may be performed for a current block 1300 in a current picture 1302 being encoded. An encoder (e.g., the encoder 200 as shown in FIG. 2) may perform inter prediction to determine and/or generate a reference block 1304 in a reference picture 1306. The reference block 1304 may be used to predict the current block 1300. Reference pictures (e.g., the reference picture 1306) may be prior decoded pictures available at the encoder and/or a decoder. Availability of a prior decoded picture may depend/be based on whether the prior decoded picture is available in a decoded picture buffer, at the time, the current block 1300 is being encoded and/or decoded. The encoder may search the one or more reference pictures 1306 for a block that is similar (or substantially similar) to the current block 1300. The encoder may determine the best matching block from the blocks tested during the searching process. The best matching block may be a reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and original samples of the current block 1300.

The encoder may search for the reference block 1304 within a reference region (e.g., a search range 1308). The reference region (e.g., a search range 1308) may be positioned around a collocated position (or block) 1310, of the current block 1300, in the reference picture 1306. The collocated block 1310 may have a same position in the reference picture 1306 as the current block 1300 in the current picture 1302. The reference region (e.g., a search range 1308) may at least partially extend outside of the reference picture 1306. Constant boundary extension may be used, for example, if the reference region (e.g., a search range 1308) extends outside of the reference picture 1306. The constant boundary extension may be used such that values of the samples in a row or a column of reference picture 1306, immediately adjacent to a portion of the reference region (e.g., a search range 1308) extending outside of the reference picture 1306, may be used for sample locations outside of the reference picture 1306. A subset of potential positions, or all potential positions, within the reference region (e.g., a search range 1308) may be searched for the reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising the reference picture 1306.

Figure 13B:
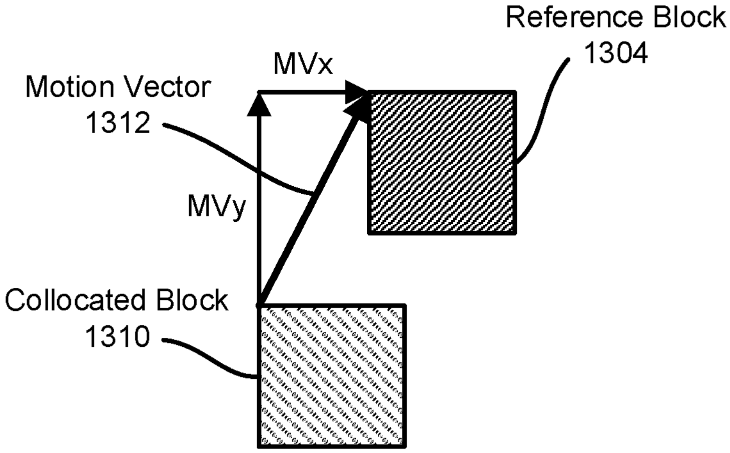
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component (MVx) and a vertical component (MVy) relative to the position of the current block 1300. A motion vector (e.g., the motion vector 1312) may have fractional or integer resolution. A motion vector with fractional resolution may point between two samples in a reference picture to provide a better estimation of the motion of the current block 1300. For example, a motion vector may have ½, ¼, ⅛, 1/16, 1/32, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be a prediction error and/or a residual. The encoder may store and/or send (e.g., signal), in/via a bitstream, the prediction error and/or related motion information. The prediction error and/or the related motion information may be used for decoding (e.g., decoding the current block 1300) and/or other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the prediction error and/or the related motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as a source of a prediction for the current block 1300. Inter prediction based on a prediction of a current block using a single picture may be referred to as uni-prediction.

Inter prediction of a current block, using bi-prediction, may be based on two pictures. Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
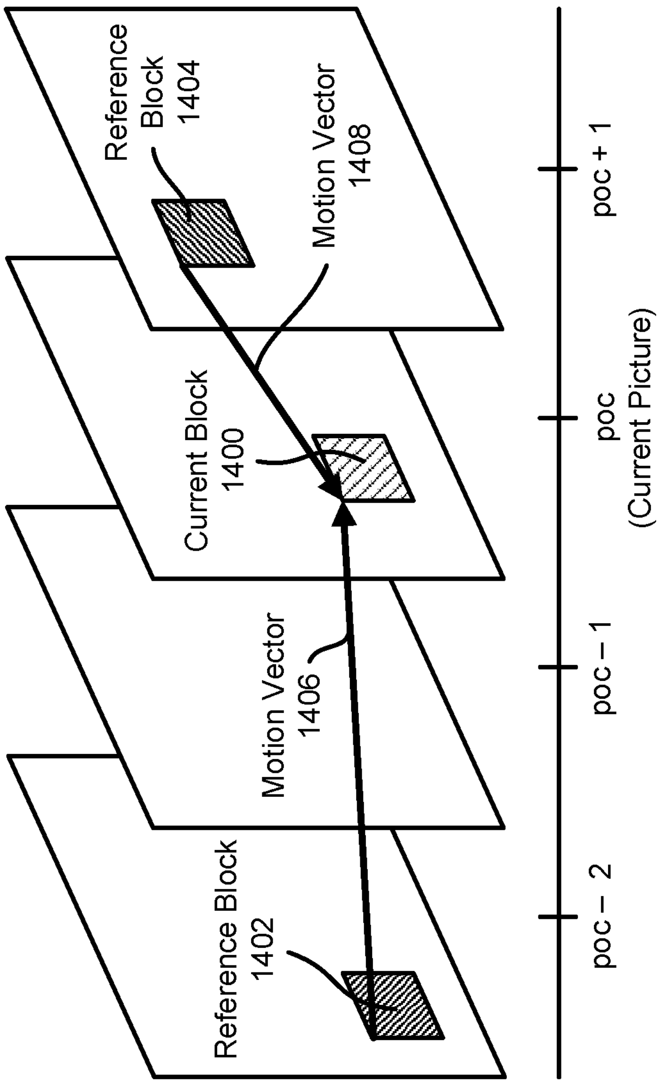
FIG. 14 shows an example of bi-prediction.

FIG. 14 shows an example of bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, the reference block 1402 may be in a first picture that precedes (e.g., in time) a current picture of the current block 1400, and the reference block 1404 may be in a second picture that succeeds (e.g., in time) the current picture of the current block 1400. The first picture may precede the current picture in terms of a picture order count (POC). The second picture may succeed the current picture in terms of the POC. The reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for the current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between the current block 1400 and each of the reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption. The motion information for the reference block 1402 may comprise a motion vector 1406 and/or a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/indicator. The reference indicator may indicate a reference picture, of the reference block 1408, in a reference picture list. The motion information for the reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the prediction errors and/or the respective related motion information for the reference blocks 1402 and 1404. The reference blocks 1402 and 1404 may correspond to/form (e.g., be considered as) the predictions of the current block 1400. The decoder may decode the current block 1400 based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques may comprise advanced motion vector prediction (AMVP) and/or inter prediction block merging. An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component (MVx) and a vertical component (MVy)) relative to a position of the current block being coded, the MVD may be represented by two components MVD_x and MVD_y. MVD_x and MVD_y may be determined/calculated as:

$$MVD_x = MV_x - MVP_x, \tag{15}$$

$$MVD_y = MV_y - MVP_y. \tag{16}$$

MVDx and MVDy may respectively represent horizontal and vertical components of the MVD. MVPx and MVPy may respectively represent horizontal and vertical components of the MVP. A decoder (e.g., the decoder 300 as shown in FIG. 3) may decode the motion vector by adding the MVD to the MVP indicated in/via the bitstream. The decoder may decode the current block by determining and/or generating the reference block. The decoder may determine and/or generate the reference block, for example, based on the decoded motion vector. The reference block may correspond to/form (e.g., be considered as) the prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
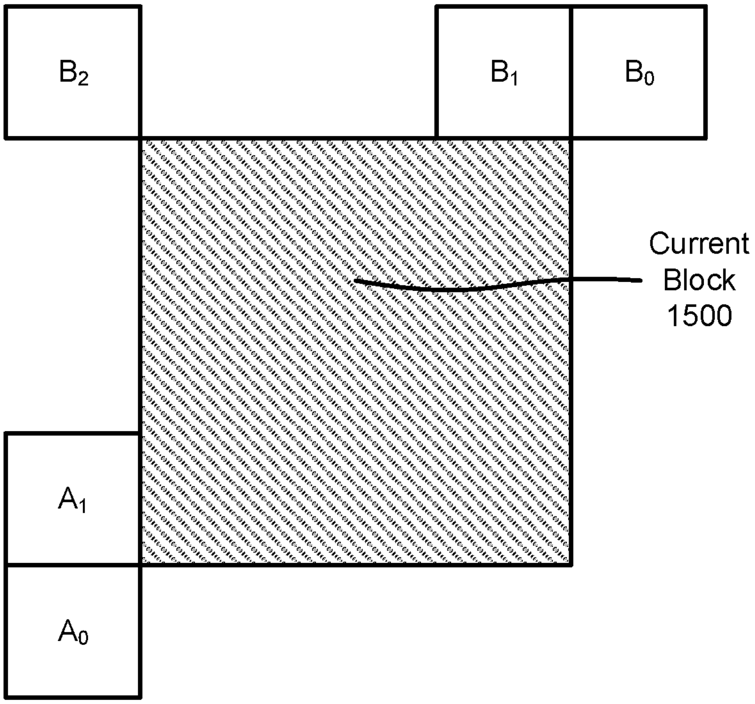
FIG. 15A shows example spatial candidate neighboring blocks for a current block.
Figure 15B:
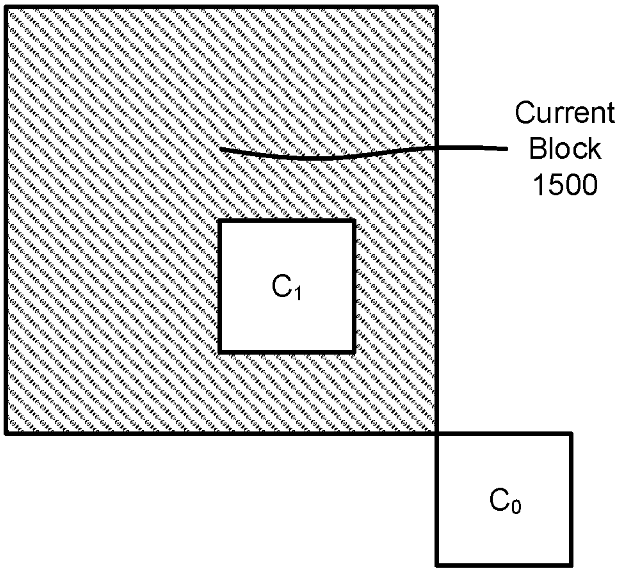
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be A0, A1, B0, B1, and B2. FIG. 15B shows temporal, co-located blocks for the current block. For example, two (or any other quantity of) temporal, co-located blocks may be located relative to the current block 1500. The two temporal, co-located blocks may be C0 and C1. The two temporal, co-located blocks may be in one or more reference pictures that may be different from the current picture of the current block 1500.

An encoder (e.g., the encoder 200 as shown in FIG. 2) may code a motion vector using inter prediction block merging (e.g., a merge mode). The encoder (e.g., using merge mode) may reuse the same motion information of a neighboring block (e.g., one of neighboring blocks A0, A1, B0, B1, and B2) for inter prediction of a current block. The encoder (e.g., using merge mode) may reuse the same motion information of a temporal, co-located block (e.g., one of temporal, co-located blocks C0 and C1) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than that of a current block being encoded. Block matching may be used to determine a reference block in a same picture as that of a current block being encoded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture. Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

Figure 16:
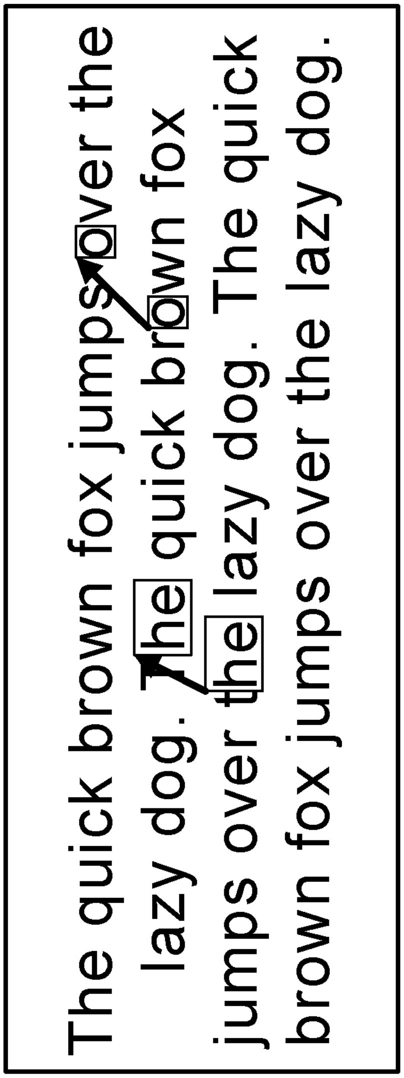
FIG. 16 shows an example of intra block copy (IBC) for encoding.

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standards/formats/protocols) before being stored and/or sent/signaled in/via a bit stream. The BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., the encoder 200 as shown in FIG. 2) performing BV prediction and coding may code a BV as a difference between the BV of a current block being coded and a block vector predictor (BVP). An encoder may select/determine the BVP from a list of candidate BVPs. The candidate BVPs may comprise/correspond to previously decoded BVs of neighboring blocks in the current picture of the current block. The encoder and/or a decoder may generate or determine the list of candidate BVPs.

Figure 17:
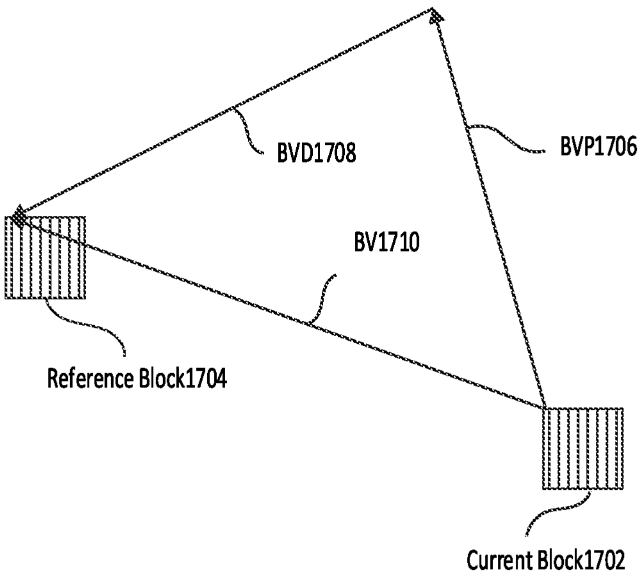
FIG. 17 shows examples of a block vector prediction (BVP), a block vector (BV), and a corresponding block vector difference (BVD).

An encoder may signal, in a bitstream, an indication of a selected BVP and/or a BV difference (BVD). An encoder may signal, in a bitstream, an indication of a selected BVP and/or a BV difference (BVD), for example, if the encoder selects a BVP from the list of candidate BVPs. FIG. 17 shows examples of a BVP, BV, and a corresponding BVD (e.g., BVP 1706, BVD 1708 and BV 1710). The encoder may indicate the selected BVP in the bitstream by an index pointing into a list of candidate BVPs. The BVD may be calculated. The BVD may be calculated, for example, based on the difference between the BV of the current block and the selected BVP. The BVD may represented by two components, for example, for a BV represented by a horizontal component (BVx) and a vertical component (BVy) relative to the position of the current block being coded. The BVD may represented by two components calculated as follows:

$$BVD_x = BV_x - BVP_x \tag{17}$$

$$BVD_y = BV_y - BVP_y \tag{18}$$

where $BVD_x$ and $BVD_y$ respectively represent the horizontal and vertical components of the BVD, and $BVP_x$ and $BVP_y$ respectively represent the horizontal and vertical components of the BVP. A decoder (e.g., a decoder as described herein in FIG. 3) may decode the BV. The decoder may decode the BV, for example, by adding the BVD to the BVP indicated in the bitstream. The decoder may decode the current block. The decoder may decode the current block, for example, by determining and/or generating the reference block, that forms the prediction of the current block, using the decoded BV and combining the prediction with the prediction error.

In HEVC and VVC, a list of candidate BVPs may comprise two candidates referred to, for example, as candidates A and B. Candidates A and B may include up to two spatial candidate BVPs derived from five spatial neighboring blocks of the current block being encoded, or one or more of the last two coded BVs if spatial neighboring candidates are not available. Spatial neighboring candidates may not available, for example, because they are coded in intra or inter mode. The location of the five spatial candidate neighboring blocks relative to a current block being encoded using IBC may be the same as those shown in FIG. 15A for inter prediction. The five spatial candidate neighboring blocks are respectively denoted $A_0$, $A_1$, $B_0$, $B_1$, and $B_2$.

An intra prediction mode may enable reducing the amount of bits that may be sent (e.g., transmitted) from the encoder to the decoder. For example, intra template matching prediction (Intra TMP) may enable reducing the amount of bits that may be sent (e.g., transmitted) from the encoder to the decoder. In intra TMP mode, a best reference block (e.g., minimum difference or minimum error between the current block template and the reference block template) from a reconstructed part of the current frame may be used as the reference block. The reconstructed part of the current frame may have an L-shaped template that may match the current template (i.e., the L-shaped template of the current block). The sum of absolute differences (SAD) may be used as a cost function in determining the template that may be most similar to the current template. The decoder may search for the template that has the least SAD value with respect to the current one. The decoder may use its corresponding block as a prediction block. Although SAD may be used as the example difference calculation technique, other difference calculation techniques may be used instead of SAD (e.g., a sum of squared errors (SSE), a sum of transformed differences (SATD), a mean-removed SAD (MR-SAD)).

SATD may comprise a Hadamard transform that may be used on the differences, and absolute values of the resulting transform coefficients may be summed up. The encoder may search for the most similar template to the current template in a reconstructed part of the current frame. The encoder may use the corresponding block as a prediction block, for example, for a predefined search range. The encoder may signal the usage of this mode to the decoder, and the same prediction operation may be performed at the decoder side.

A prediction signal may be generated by matching a L-shaped template of a current block with a L-shaped template of another block. A prediction signal may be generated by matching a L-shaped template of a current block with a L-shaped template of another block, for example, in a predefined search area within the current frame. The predefined area may be an area where all blocks have been reconstructed. A predefined area may include an entirety of a reconstructed region of a current frame. Alternatively, a predefined search area may be limited to a subset of the already decoded blocks of the current frame. Intra TMP is described in the Enhanced Compression Model (ECM) software algorithm that is currently under coordinated exploration study by the Joint Video Exploration Team (JVET) of ITU-T Video Coding Experts Group (VCEG) and ISO/IEC MPEG as potential enhanced video coding technology beyond the capabilities of VVC.

Figure 18:
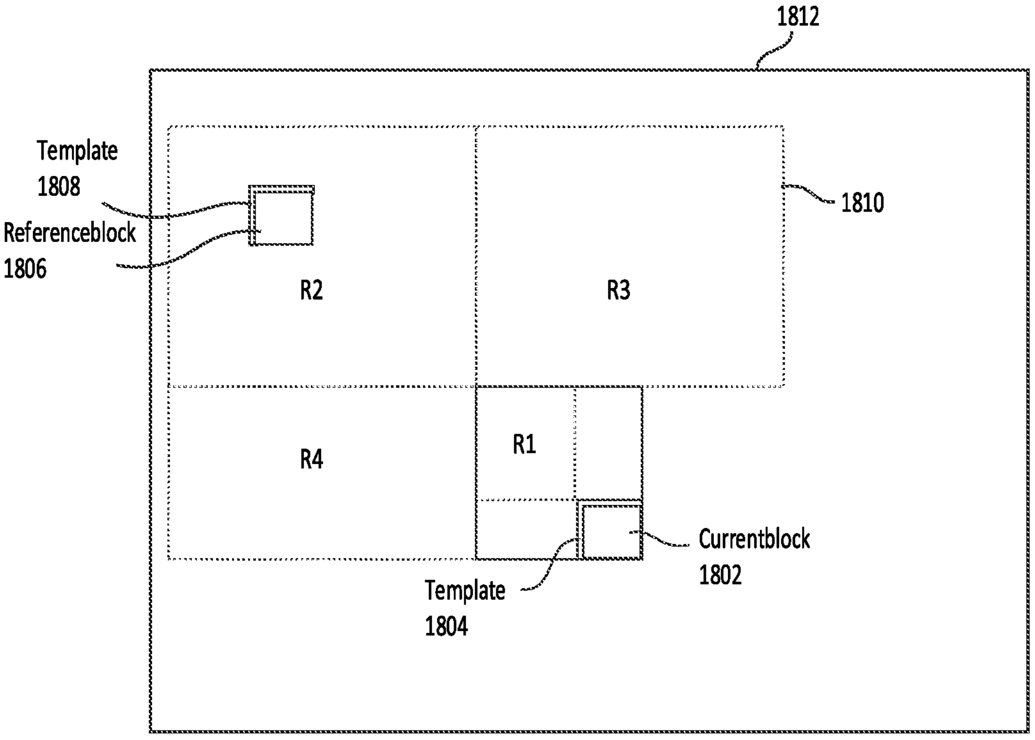
FIG. 18 shows examples of a current block, a current block template, a reference block, and a reference block template.

FIG. 18 shows an example of a current block 1802, a current block template 1804, a reference block 1806, and a reference block template 1808. The "template" of a block, as the term is used herein and as shown in FIG. 18, may be formed by neighboring samples to the left of, and at the top of, the block. A template of a block may consist of neighbor samples adjacent to the left border of the block and neighbor samples adjacent to the top border of the block. Methods are not limited to a particular number of samples in a template.

Local illumination compensation may be one technique for improving motion compensation in VVC. Local illumination compensation (LIC) may be a prediction technique to model local illumination variation between a current block and its prediction block as a function of that between a current block template and a reference block template. The parameters of the LIC function may be denoted by a scale $\alpha$ and an offset $\beta$ of a linear equation, that is, $\alpha$*p[x]+$\beta$ to compensate illumination changes, with p[x] being a reference sample pointed to by a displacement vector (e.g., a motion vector (MV) in inter prediction or block vector (BV) in intra prediction) at a location x on the reference picture. Because parameters $\alpha$ and $\beta$ may be derived based on a current block template and a reference block template, no signaling overhead is required for them, except that an LIC flag may be signaled to indicate the use of LIC.

An application of LIC to a block comprises adjusting predicted samples (e.g., samples of a predicted block) by multiplying the predicted samples (e.g., values of the samples) by $\alpha$ (e.g., a value of $\alpha$) and adding $\beta$ (e.g., a value of $\beta$) in accordance with the above described linear equation for compensating for local illumination differences. The parameters $\alpha$ and $\beta$ may be derived from samples in the templates of a current block and a reference block, for example, by using a least mean squares method. The parameters $\alpha$ and $\beta$ may be derived using all, a subset, or subsets of samples in the templates.

Figure 19:
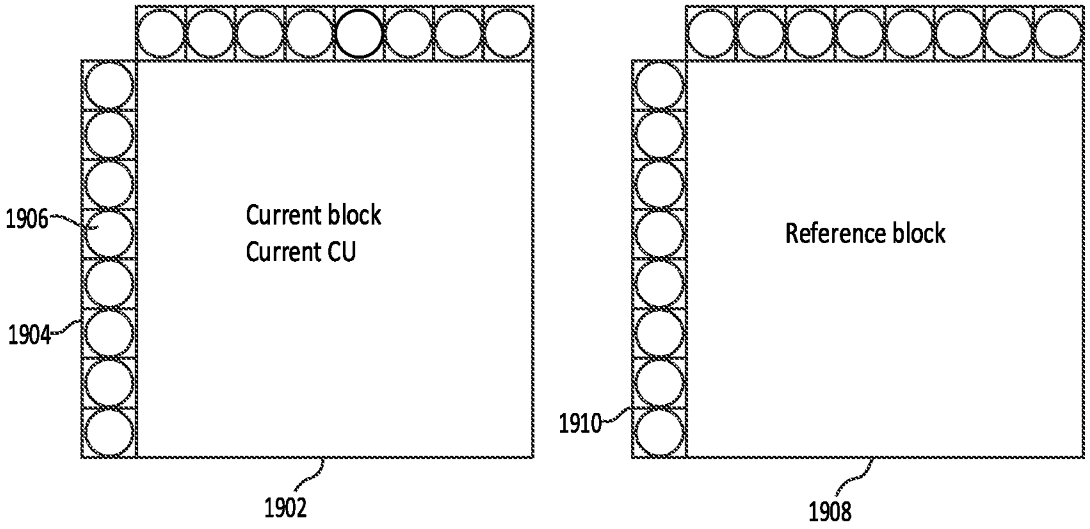
FIG. 19 shows example blocks and their respective templates.

FIG. 19 shows example blocks and their respective templates. FIG. 19 shows an example of a current block and samples and a reference block and reference samples. FIG. 19 shows on the left hand side a current block 1902 (e.g. a current CU) and samples 1906 (e.g., neighboring samples) in the current block's template 1904 as empty circles. The reference samples (e.g., neighboring samples) may be samples adjacent to a left border (e.g., a boundary) and adjacent a top border of the current block. The reference samples may belong to previously reconstructed neighboring blocks of the current block. FIG. 19 shows on the right hand side a reference block, e.g. the reference block used for prediction of the current block, and reference samples (such as neighboring samples) of the reference block as empty circles. The reference samples (e.g., neighboring samples of the reference block) may be samples adjacent to a border (e.g., a left border and a top border) of the reference block 1908. Neighboring samples of the reference block 1908 may have the same relative position with regard to the reference block as the neighboring samples of the current block. Relative positions of the neighboring samples in the template 1910 of the reference block and the current block match. The LIC parameter calculation may only include a subset of the samples. LIC is described for inter prediction in the Enhanced Compression Model (ECM) software algorithm that is currently under coordinated exploration study by the Joint Video Exploration Team (JVET) of ITU-T Video Coding Experts Group (VCEG) and ISO/IEC MPEG as potential enhanced video coding technology beyond the capabilities of VVC.

Local illumination variation between a current block and its prediction block may be modelled as a linear equation. Local illumination variation between a current block and its prediction block may be modelled as a linear equation, for example, if IBC-LIC is used with a current block (e.g., CU). The parameters of the linear equation may be derived in a manner similar to LIC for inter prediction, for example, in which reference block 1908 (as shown in FIG. 19) may be from a different reference picture as that of current block 1902, as explained herein with respect to FIG. 14. IBC-LIC may be used with IBC AMVP mode and IBC merge mode. An IBC-LIC flag may indicate the use of IBC-LIC for IBC AMVP mode. The IBC-LIC flag may be inferred from the merge candidate for IBC merge mode.

IBC may be used to reduce the amount of data to be sent (e.g., transmitted) from the encoder to the decoder in a bitstream, for example, if encoding a current block within a picture. Moreover, an encoder may use LIC to a reference block to further reduce sent (e.g., transmitted) data by compensating for illumination differences between the current block and the reference block and thereby reducing the residual that needs to be encoded. A difference calculation to determine differences between a template of a current block and templates of reference blocks, as determined by the sum-of-absolute-differences (SAD), may not correctly measure similarity. A difference calculation to determine differences between a template of a current block and templates of reference blocks, as determined by the sum-of-absolute-differences (SAD), may not correctly measure similarity, for example, if pictures and/or blocks are encoded using IBC with LIC (IBC-LIC). This happens because, if LIC is used with a reference block, the illumination differences between the reference block and the current block are reduced or eliminated. Therefore, use of SAD as a difference calculation, which is sensitive to illumination differences, may lead to inaccurate results.

Various examples herein describe approaches for improving the accuracy of template matches in IBC-LIC encoded bitstreams. To minimize the issues associated with illumination differences and the inaccurate results they cause, an indicator may be used to indicate whether LIC is used. The indicator may be a flag. The indicator may be contained in a bitstream. By determining whether LIC is used, the prediction of a current block may consider the impact of LIC. LIC may improve accuracy of current block prediction by compensating for contrast and brightness differences of the current and reference blocks. More accurate predictions may result in compression efficiency improvements, for example, if the number of bins to encode residual signal is reduced, and higher reconstructed picture quality may be achieved using the same number of coded bins. The present disclosure relating to improved prediction based on LIC may be further extended to templates of reference blocks determined for inter prediction. These and other features are described further below.

Both HEVC and VVC include a prediction technique to exploit a correlation between blocks of samples within a same picture. This technique is referred to as intra block copy (IBC). IBC, IBC with local illumination compensation (IBC-LIC), and intra template matching prediction (intra TMP) are included in the Enhanced Compression Model (ECM) software algorithm that is currently under coordinated exploration study by the Joint Video Exploration Team (JVET) of ITU-T Video Coding Experts Group (VCEG) and ISO/IEC MPEG as potential enhanced video coding technology beyond the capabilities of VVC.

FIG. 17 shows an example of IBC as disclosed herein. An encoder may determine a block vector (BV) 1710 that may indicate a displacement from a current block 1702 to a reference block 1704 (e.g., an intra block compensated prediction) in the same picture. An encoder may determine a block vector (BV) 1710 that may indicate a displacement from a current block 1702 to a reference block 1704 (e.g., an intra block compensated prediction) in the same picture, for example, if IBC occurs. The encoder may determine reference block 1704 from among one or more reference blocks using a search process.

An encoder in IBC mode may also be configured to set LIC to on or off. IBC-LIC is an intra prediction technique to model local illumination variation between a current block and its prediction block as a function of the difference between current block template and reference block template. LIC provides for the encoder to reduce the amount of data that may be sent to the decoder. LIC provides for the encoder to reduce the amount of data that may be sent to the decoder, for example, by compensating for local illumination differences between the reference block and the current block. Compensating for local illumination differences between the reference block and the current block may occur, for example, before the residual is encoded.

Intra TMP is another technique that may reduce an amount of data sent (e.g., transmitted) from an encoder to a decoder. An encoder may search a predefined region (e.g., a "search region") for a block template that may be a best match for the template of the current block, for example, if IBC-LIC is on for a current block that is being encoded. FIG. 18 shows a current block 1802, a current block template 1804, a reference block 1806, and a reference block template 1808 in a search region 1810 made up of areas R1-R4 within a current frame 1812 or picture. A block template that may be tested with a current block template may first be updated according to the local illumination function described herein. The block template may be updated according to the local illumination function described herein, for example, if IBC-LIC is on. More specifically, each template that may be tested may first be used with the current block template to determine the parameters for the local illumination compensation function. The local illumination compensation function may be used with the template that may be tested. The local illumination compensation function may be used with the template that may be tested, for example, based on the determined parameters. The best match may be the block template that, among all block templates tested within the search region, has the smallest difference with the template of the current block. FIG. 19 shows an example current block and current block template (e.g., current block 1902 and current block template 1904) having samples (e.g., samples 1906). An example reference block 1908 and its template 1910 of neighboring samples are also shown in FIG. 19.

A difference may be calculated using a sum of absolute differences (SAD). A difference may be calculated using a sum of absolute differences (SAD), for example, if IBC-LIC is not on, The difference may be calculated using mean-removed SAD (MR-SAD). The difference may be calculated using mean-removed SAD (MR-SAD), for example, if IBC-LIC is on. An encoder may determine a difference between samples of a template of a reference block and samples of a template of a current block (e.g., current block 1702). An encoder may determine a difference between samples of a template of a reference block and samples of a template of a current block, for example, for each of the one or more block templates tested during the search. The encoder may determine reference block 1704 from among the one or more reference blocks. The encoder may determine reference block 1704 from among the one or more reference blocks, for example, based on the template of reference block 1704 having the smallest difference from the template of current block 1702 among the one or more reference blocks. The encoder may determine reference block 1704 from among the one or more reference blocks, for example, based on some other criteria. Reference block 1704 and the one or more other reference blocks corresponding to the tested templates during the searching process may comprise decoded samples or reconstructed samples. The decoded (or reconstructed) samples may not have been processed by in-loop filtering operations (e.g., deblocking or SAO filtering).

Figure 20:
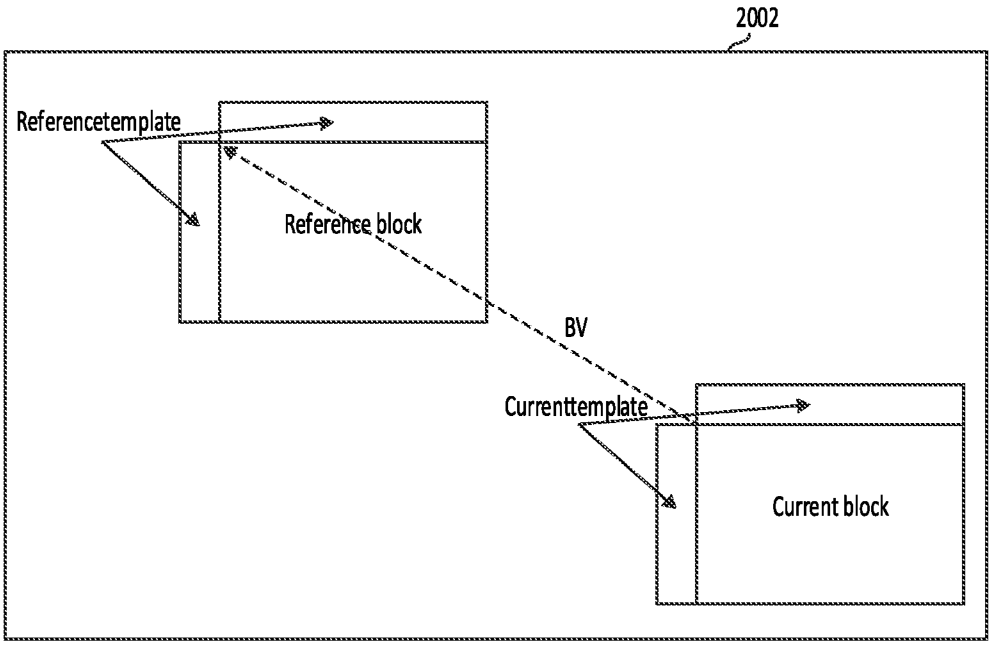
FIG. 20 shows a current block, a reference block, and a corresponding BV.

FIG. 20 shows a current block, a reference block, and a corresponding BV. An encoder may use reference block 1704 to predict current block 1702, for example, if reference block 1704 is determined for current block 1702 that is to be encoded. The encoder may determine and/or use a difference (e.g., a corresponding sample-by-sample difference) between reference block 1704 and current block 1702. The difference may be referred to as a prediction error and/or a residual. The samples of the reference block may be updated according to a LIC linear function as described herein. The samples of the reference block may be updated according to a LIC linear function as described herein, for example, before determining the residual. The samples of the reference block may be updated according to a LIC linear function as described herein before determining the residual, for example, if IBC-LIC is on. The update may be designed to make the residual between the updated reference block and the current block to be less than the residual between the reference block. The update may be designed to make the residual between the updated reference block and the current block to be less than the residual between the reference block, for example, before the update and the current block. The encoder may signal the residual (e.g., prediction error) and the related prediction information in a bitstream. The prediction information may include BV 1710. The prediction information may include an indication of BV 1710. A decoder, such as decoder 300 shown in FIG. 3, may receive the bitstream and decode current block 1702. The decoder may receive the bitstream and decode current block 1702, for example, by determining reference block 1704, which forms the prediction of current block 1702, using the prediction information and combining the prediction with the prediction error.

An encoder may not include a BV 1710, an indication of a BV, a BVP 1706, or a BVD 1708 in a bitstream sent (e.g., transmitted) to a decoder. An encoder may not include a BV 1710, an indication of a BV, a BVP 1706, or a BVD 1708 in a bitstream sent (e.g., transmitted) to a decoder, for example, if, as described herein, the encoder determined a reference block by searching for the best matching template in a search region. An indication in the bitstream that intra TMP is used for the current block, may be used by the decoder to perform the process of intra TMP for the current block to determine the reference block in the same manner as was done at the encoder.

BV 1710 may be predictively encoded. BV 1710 may be predictively encoded, for example, before being signaled in a bit stream. BV 1710 may be predictively encoded, for example, based on the BVs of neighboring blocks of current block 1702 or BVs of other blocks. An encoder may predictively encode BV 1710 using a merge mode or AMVP as described herein. The encoder may encode BV 1710 as a difference between BV 1710 and a BV predictor (BVP) 1706 for AMVP as described herein in FIG. 17. The encoder may select BVP 1706 from a list of candidate BVPs. The candidate BVPs may come from previously decoded BVs of neighboring blocks of current block 1702 or other sources. Both the encoder and decoder may generate or determine the list of candidate BVPs.

An encoder may signal, in a bitstream, an indication of BVP 1706 and a BV difference (BVD) 1708. An encoder may signal, in a bitstream, an indication of BVP 1706 and a BV difference (BVD) 1708, for example, if the encoder selects a BVP 1706 from a list of candidate BVPs. The encoder may indicate BVP 1706 in the bitstream by an index, pointing into the list of candidate BVPs, or one or more flags. BVD 1708 may be calculated based on the difference between BV 1710 and BVP 1706. BVD 1708 may comprise a horizontal component (BVDx) and a vertical component (BVDy) that may be respectively determined in accordance with Equations (17) and (18) described herein. The two components BVDx and BVDy may each comprise a magnitude and sign. The encoder may indicate BVD 1708 in the bitstream via its two components BVDx and BVDy.

A decoder may decode a BV 1710. A decoder may decode a BV 1710, for example, by adding a BVD 1708 to a BVP 1706. The decoder may decode a current block 1702. The decoder may decode a current block 1702, for example, by determining a reference block 1704, that forms the prediction of a current block 1702, using BV 1710 and combining the prediction with the prediction error. The decoder may determine the reference block 1704, for example, by adding BV 1710 to the location of current block 1702, which may give the location of reference block 1704.

Figure 21:
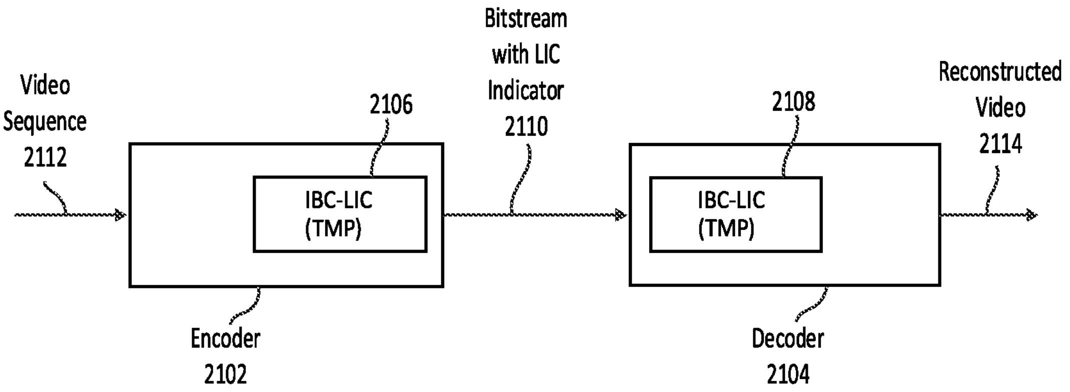
FIG. 21 shows an encoder and a decoder configured for intra block copy local illumination compensation (IBC-LIC) and intra template matching prediction (intra TMP).

FIG. 21 shows an encoder and a decoder configured for intra block copy local illumination compensation (IBC-LIC) and intra template matching prediction (intra TMP). FIG. 21 shows an example encoder 2102 and decoder 2106 each being configured for IBC-LIC and intra TMP (e.g., modules 2106 and 2108). The encoder 2102 may be similar or identical to encoders 114 and 200 as described herein. The encoder 2102 may be configured to perform encoder operations as described herein. The decoder 2106 may be similar or identical to decoders 120 and 300 described herein. The decoder 210 may be configured to perform decoder operations as described herein. The encoder 2102 may encode an input video stream 2110 and send (e.g., transmit) the encoded data in a bitstream 2112 to the decoder 2106. The decoder 2106 may generate a reconstructed video stream 2114 from the bitstream 2112. Operations performed by encoder 2102 and decoder 2104 may be further extended to adjusting templates of candidate reference blocks determined for inter prediction.

Figure 22:
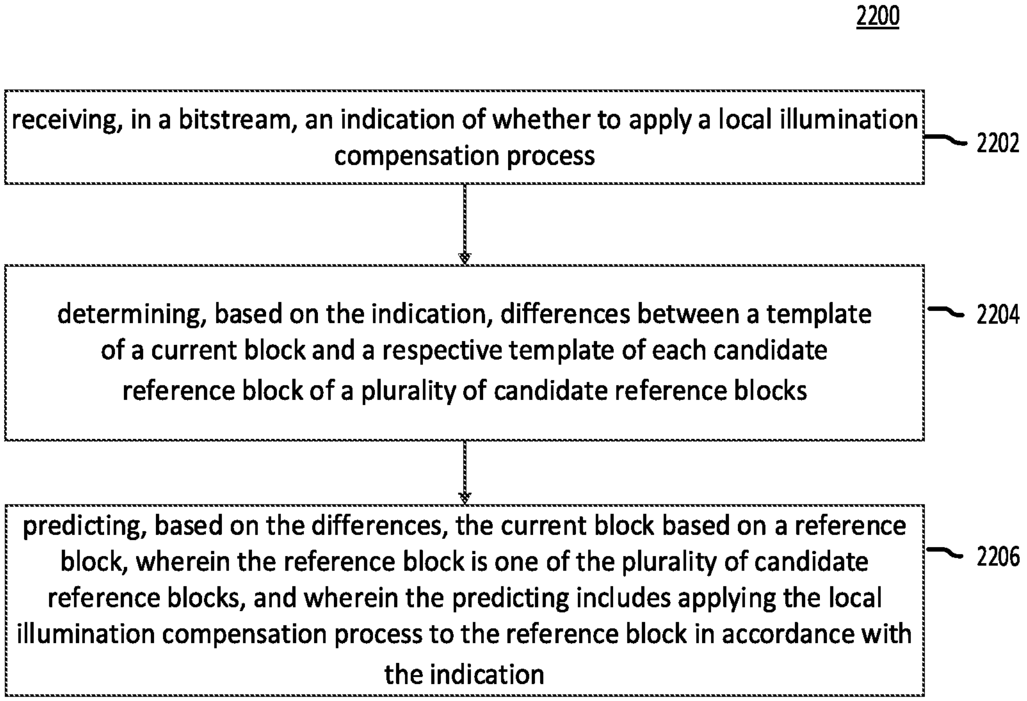
FIG. 22 shows an example method performed by a decoder.

FIG. 22 shows an example method performed by a decoder. FIG. 22 shows a flowchart 2200. One or more steps of the example flowchart 2200 may be performed by a decoder, such as decoder 2104 shown in FIG. 21. An example counterpart encoder process is described herein with respect to FIG. 24. The method may begin, for example, if a decoder (e.g., decoder) 2104 receives a bitstream of encoded video information sent (e.g., transmitted) by an encoder (e.g., encoder 2102). The encoder may be configured to use IBC and intra TMP for encoding at least some intra predicted blocks, and to use LIC with IBC. At step 2202, the decoder may receive, in a bitstream, a flag (e.g., a “LIC flag”). The flag may indicate whether to use an LIC process in association with a current block. A value of “1” (e.g., to indicate on) for the LIC flag may represent that LIC is to be used. A value of “0” (e.g., to indicate off) may represent that LIC is not to be used. The bitstream may further include one or more other flags indicating that the current block was predicted using IBC and/or intra TMP. The bitstream may further include one or more other flags indicating that the current block was predicted using inter prediction and with TMP. Configurations and/or structures for any flags are not limited to a particular value.

Figure 23A:
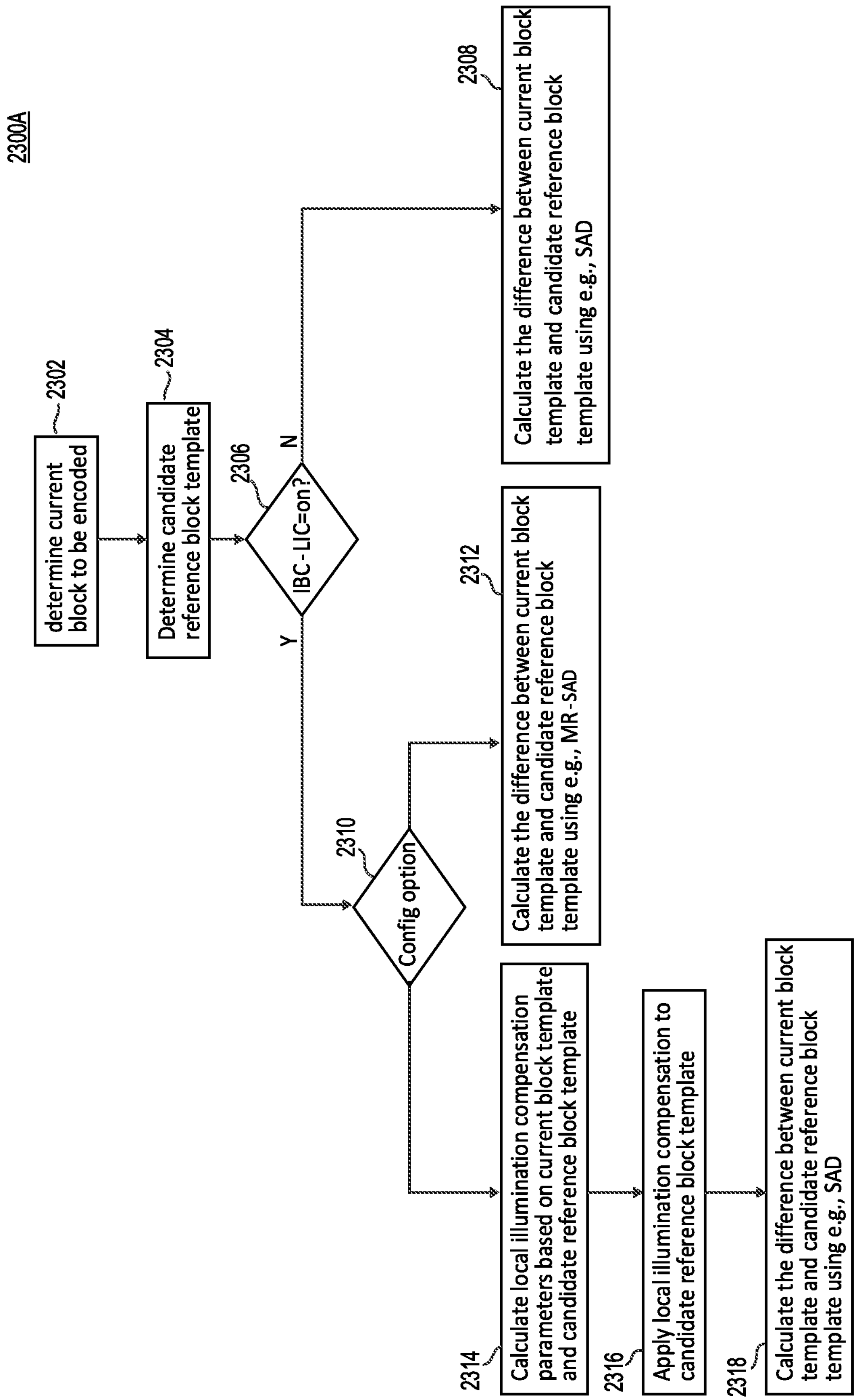
FIG. 23A, FIG. 23B, and FIG. 23C show examples of a method for determining differences between the templates of the respective candidate reference blocks and the current block based on an LIC flag.
Figure 23B:
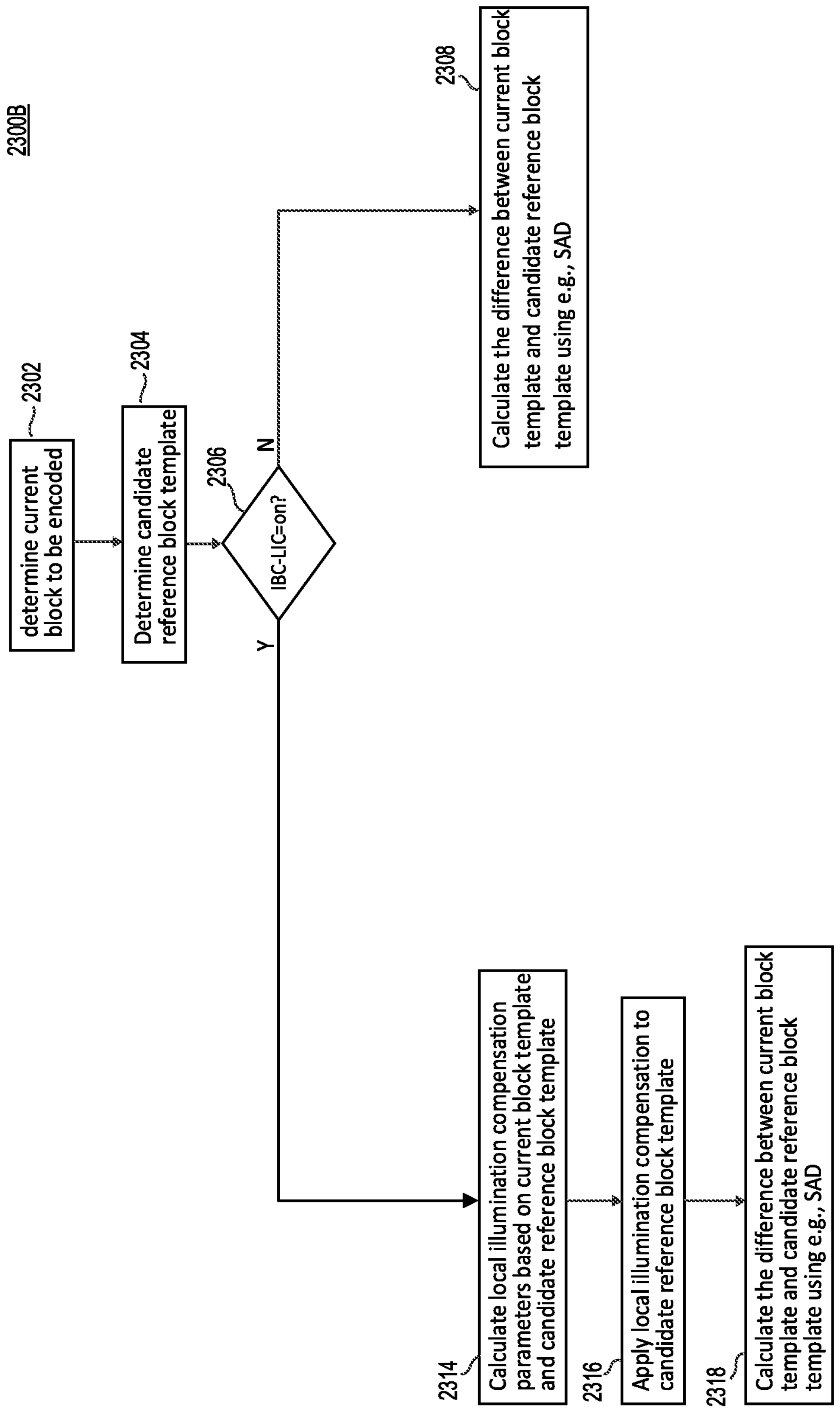
Figure 23C:
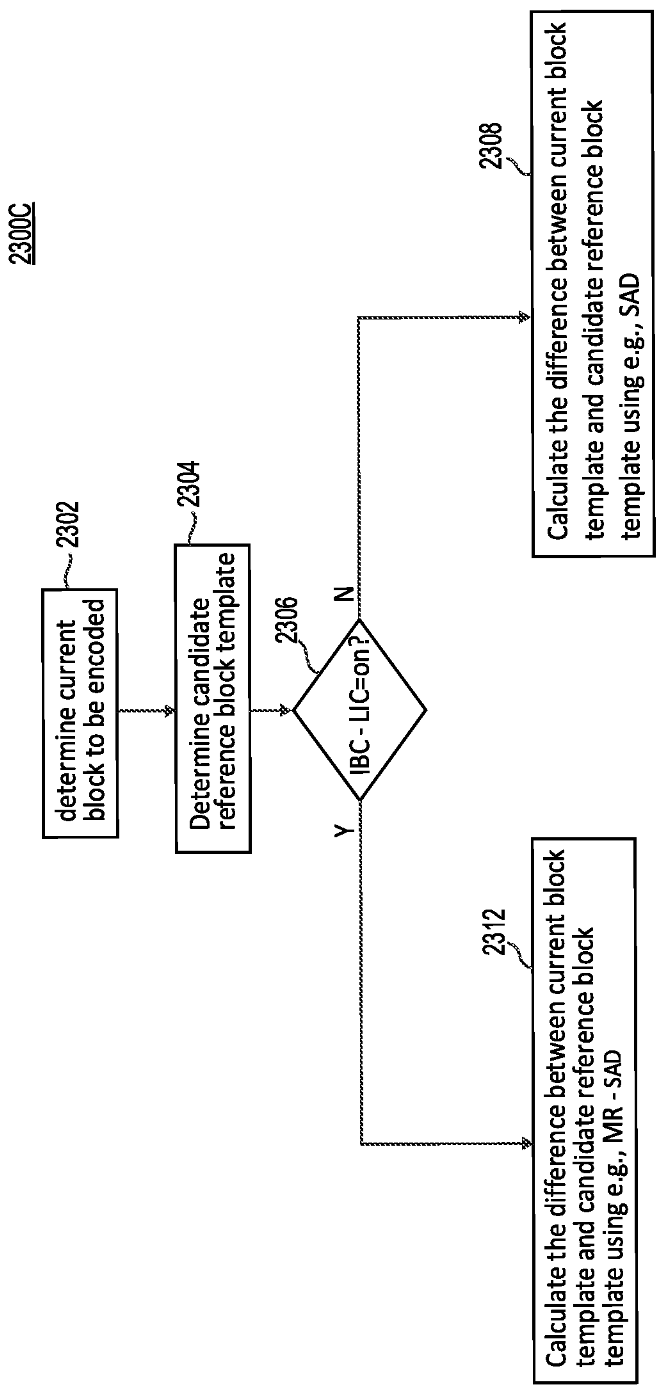

At step 2204, a decoder may determine differences between a template of a current block and a respective template of each candidate reference block of a plurality of candidate reference blocks. The decoder may determine differences between a template of a current block and a respective template of each candidate reference block of a plurality of candidate reference blocks, for example, based on the value of the LIC flag. A decoder may use template matching to determine candidate reference blocks for the current block within the same picture, for example, if IBC and intra TMP are being signaled as being used for the current block. As described herein, in IBC a current block may be predicted using a reference block in the same picture. Also, as described herein, a reference block may be determined using template matching, and a bitstream may not be required to include a BV or an indication of a BV if intra TMP is used with IBC. The determination of the differences between templates may be performed differently. The determination of the differences between templates may be performed differently, for example, based on whether the LIC flag is on or is off. More particularly, the differences may be calculated using a difference calculation technique such as SAD that is sensitive to differences in illumination, for example, if the LIC flag is off, indicating that LIC is not used with respect to the current block. The difference calculation may be performed in a manner that may account for LIC if the LIC flag is on, indicating that LIC is to be used with respect to the current block. The current block may be predicted in an inter-prediction mode, which may be indicated by one or more flags received in the bitstream. Template matching may be performed on reference templates of candidate reference blocks from a different picture than that of the current block. FIGS. 23A-23C describe further details that may be used in calculating differences between the templates of the respective candidate reference templates and the template of the current block in different embodiments.

At step 2206, a decoder may predict a current block. A decoder may predict a current block, for example, based on a reference block selected from a plurality of candidate reference blocks. A decoder may predict a current block based on a reference block selected from a plurality of candidate reference blocks, for example based on the differences calculated in step 2204. A reference block corresponds to a template that has a minimum calculated difference among the templates of all candidate reference blocks. A metric other than a minimum difference may be used to select a reference block. The predicting may include using a local illumination compensation process with respect to the reference block in accordance with the indication of whether to use an LIC process. The predicting may include updating sample values of the reference block in accordance with the linear LIC function, for example, if the indication indicates to use the LIC process.

Reconstruction of a candidate block may be performed by copying a reference block and adding a residual that may be obtained from a bitstream, for example, based on determining a reference block. Sample values of the reference block may be updated in accordance with a linear LIC function described herein. Sample values of the reference block may be updated in accordance with a linear LIC function described herein, for example, before the residual is added to determine the sample values of the reconstructed current block if LIC is being used. As described herein, a bitstream may include an indication (e.g. LIC flag) of whether LIC is to be used or not to be used. Obtaining an indication from a bitstream is not required, and the indication may be obtained from elsewhere. At least in some instances, the indication may be obtained from the candidate reference block, for example, in IBC-merge mode.

FIG. 23A, FIG. 23B, and FIG. 23C show examples of a method for determining differences between the templates of the respective candidate reference blocks and the current block based on an LIC flag. FIG. 23A shows an example method for determining differences between templates of respective candidate reference blocks and a current block in a manner based on an LIC flag (e.g., as described herein in step 2204 of FIG. 22). FIG. 23A shows a flowchart 2300A. One or more steps of the example flowchart 2300 may be performed by a decoder. At step 2304, a decoder may identify a template of a block to be considered if it may be a candidate reference block. Candidate reference blocks may be identified using template matching, for example, if intra TMP is signaled by the encoder. One or more candidate reference blocks may be identified based on a BV, a BVP, or an indication thereof.

At step 2306, a decoder may determine if LIC may be used in relation to a current block. At step 2308, the difference between the templates of the identified block and the current block may be determined, for example, by calculating the SAD of the two templates. The difference between the templates of the identified block and the current block may be determined, for example, if the LIC flag is set to “0” (e.g., is set to off) or some other indicator indicates that LIC is not to be used. Both an encoder and a decoder may perform this step to preserve consistency of a predicted block, for example, to guarantee the prediction result is the same on the encoder and decoder sides.

Differences for templates may be calculated in a manner that considers the use of LIC, for example, if the LIC flag is set to “1” (e.g., is set to on). At step 2312, the differences may be calculated using MR-SAD, for example, if the LIC flag is on, and a decoder is configured to use a second technique for calculating differences (e.g., at step 2310).

At step 2314, parameters (e.g., alpha and beta) for the linear LIC function described herein may be calculated. Parameters (e.g., alpha and beta) for the linear LIC function may be calculated, for example, if the LIC flag is set to 1 and the decoder is configured to calculate differences using a first difference calculation technique (e.g., at step 2310). At step 2316, the LIC function, using the derived parameters, may be used with the candidate template. At step 2318, the differences may be calculated using SAD. The differences may be calculated using SAD, for example, based on using the LIC to the template. As described herein, SAD may be more sensitive than MR-SAD to illumination differences. Difference calculations are not limited to SAD and/or MR-SAD. The difference calculations at steps 2308 and 2312 may be performed, for example, by another difference calculation technique that may be more sensitive to illumination variations than a difference calculation technique that is used at step 2318.

FIG. 23B shows an example method for determining differences between templates of respective candidate reference blocks and a current block. FIG. 23B shows a flowchart 2300B. The example method shown in FIG. 23B operates the same as described herein with respect to FIG. 23A with the exception that an IBC-LIC yes decision at step 2306 (e.g., the LIC may be used in relation to a current block) may cause the method to proceed to step 2314 to calculate LIC parameters without the decision at step 2310.

FIG. 23C shows an example method for determining differences between templates of respective candidate reference blocks and a current block. FIG. 23 shows a flowchart 2300C. The example method shown in FIG. 23C operates the same as described herein with respect to FIG. 23A with the exception that an IBC-LIC yes decision at step 2306 (e.g., the LIC may be used in relation to a current block) may cause the method to proceed to step 2312 to calculate the difference between templates without the decision at step 2310.

Figure 24:
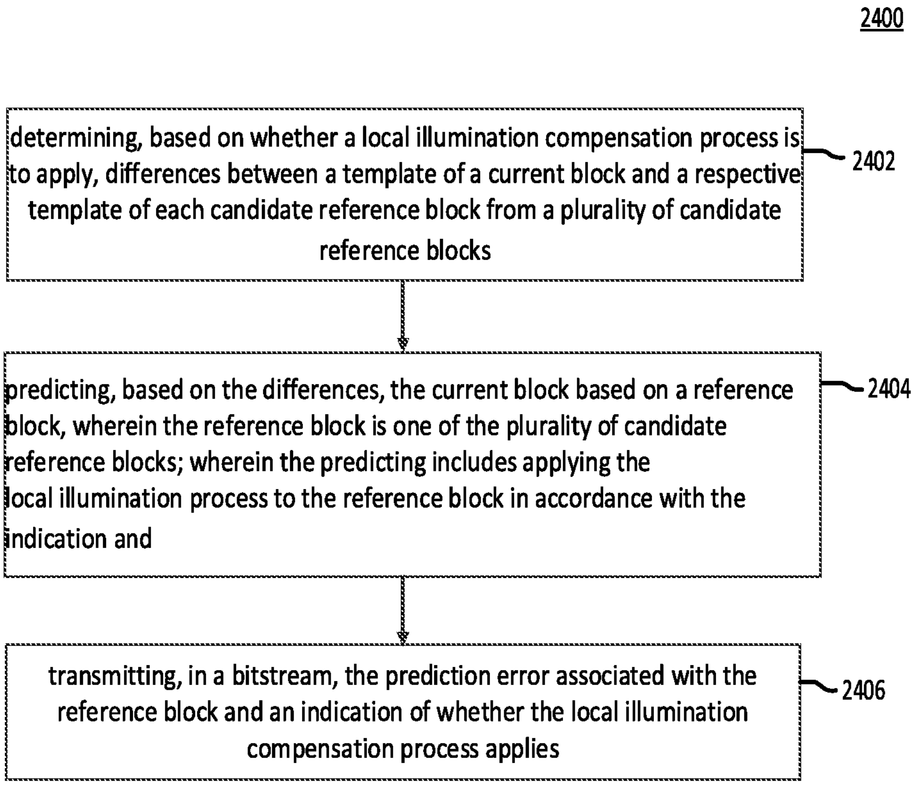
FIG. 24 shows a method performed by an encoder.

FIG. 24 shows an example method performed by an encoder. FIG. 24 shows a flowchart 2400. One or more steps of the example flowchart 2400 may be performed by an encoder, such as, for example, encoder 2102 as described herein in FIG. 21. An example counterpart decoding process 2200 was described herein with respect to FIG. 22. The method may begin, for example, if encoding a block in a current picture in a video sequence. The encoder may determine, based on a configuration, if IBC and/or intra TMP applies to the current block being encoded. A configuration may be parameters indicated in a header of a bitstream. An indication of the configuration may be performed, for example, in a sequence parameter set (SPS), picture parameter set (PPS), and/or in a picture header or a slice header. A flag may indicate, for example, if IBC and/or intra TMP are applied if performing a prediction (e.g., of a slice of a picture or video sequence being processed).

At step 2402, an encoder (e.g., encoder 2102) may determine differences between the template of a current block and respective templates of each candidate reference block from a plurality of candidate reference blocks. The encoder (e.g., encoder 2102) may determine differences between the template of a current block and respective templates of each candidate reference block from a plurality of candidate reference block, for example, based on whether LIC is to be used to the current block. The determination of whether LIC may be used for the current block may be based on a preconfigured threshold illumination value of the current block and/or candidate reference blocks. The determination of whether LIC may be used with the current block may be based on a preconfigured threshold value of the difference in illumination between the current block and candidate reference blocks. The current block and the plurality of candidate reference blocks may be located within a current picture. The current block and the plurality of candidate reference blocks may be located within a current picture, for example, if IBC and intra TMP are used for the current block.

Intra TMP may be used to determine a plurality of candidate reference blocks. Also, as described herein with respect to FIG. 22 and FIG. 23, a calculation of the differences of templates of respective candidate reference blocks and a current block may be performed differently based on whether LIC is to be used to the current block or whether LIC is not to be used with the current block. The differences between templates may be calculated using SAD, for example, if LIC is not to be used. The differences between templates may be calculated using either MR-SAD or a combination of LIC adjustment and SAD, for example, if LIC is to be used.

At step 2404, an encoder may predict a current block. The encoder may predict a current block, for example, after the differences have been calculated for the templates of candidate reference blocks. The encoder may predict a current block based on a reference block that may be based on the calculated differences between the template of a current block and the template of a candidate reference block. A block selected, from a plurality of candidate reference blocks, as the reference block may be the block corresponding to a template that may be determined to have a minimum calculated difference. A metric other than a minimum calculated difference may be used to select the reference block. The sample values of the reference block may be adjusted in accordance with the linear LIC function described herein. The sample values of the reference block may be adjusted in accordance with the linear LIC function described herein, for example, before the prediction error (e.g., residual) may be calculated with respect to the current block. The sample values of the reference block may be adjusted in accordance with the linear LIC function described herein before the prediction error (e.g., residual) may be calculated with respect to the current block, for example, if LIC is to be used to the current block. Parameters (e.g., the alpha and beta parameters as described herein) for the LIC function may be calculated using the templates of the reference block and the current block, for example, before the LIC function is used with the reference block. The prediction error may be calculated without adjusting the reference block for LIC. The prediction error may be calculated without adjusting the reference block for LIC, for example, if LIC is not to be used.

At step 2406, an encoder may send (e.g., transmit), to a decoder in a bitstream, a prediction error and an LIC flag indicating if LIC is to be used to the current block. The encoder may send (e.g., transmit) a prediction error and LIC flag, for example, after the prediction error is calculated for the current block. Transmission of the bitstream is as described herein.

Both an encoder and a decoder may identify a reference block using template matching, and a BV or an indication of a BV may not be sent (e.g., transmitted) in a bitstream, for example, if IBC-LIC is used with intra TMP for a current block. The encoder may predictively encode a BV using IBC-merge mode or IBC-AMVP as described herein, for example, if intra TMP is not used for the current block. The encoder may, as described herein with respect to FIG. 25 and other figures, use template matching to determine the reference block in accordance with the IBC-LIC context, for example, if intra TMP is not used for the current block.

An encoder and decoder in IBC-AMVP and IBC-merge modes may generate candidate lists of neighbor blocks for determining a BVP. The encoder and decoder in IBC-AMVP and IBC-merge modes may generate candidate lists of neighbor blocks for determining a BVP as described herein for AMVP mode and merge mode in inter prediction. Template matching based on the LIC flag may be used to change a sequence of ordering of the candidate BVPs. Candidate BVPs may be sequence ordered based on template matching. Candidate BVPs may be sequence ordered, based on template matching, so that candidate BVPs whose corresponding templates have a smaller difference (e.g., a greater similarity) with the template of the current block may have a higher likelihood of getting selected.

The example approaches discussed herein with respect to FIGS. 22-24 may be further used with inter prediction (e.g., affine model/mode, translational model/mode, or multi-hypothesis prediction mode) in addition or alternatively to IBC mode. For inter prediction, the terms BV, BVP, BVD, and BVD candidate may be replaced by the respective terms MV, MVP, MVD, and MVD candidate. The example approaches discussed herein may also be used with IBC and inter prediction. The example approaches discussed herein may also be used with IBC and inter prediction, for example, based on a translational motion model for the prediction block. In IBC, the candidate reference blocks associated with candidate reference block templates may be in the same picture as that of the current block associated with the current block. In inter-prediction, each of the candidate reference blocks may be determined from (and belong to) a different picture than a current picture of the current block. The candidate reference blocks may be determined from one or more reference pictures, as described herein with respect to FIG. 14. Additionally, for inter-prediction, instead of a decoder determining whether IBC-LIC is enabled, as described herein with respect to step 2306 as shown in FIGS. 23A-C, the decoder may determine whether LIC is enabled for inter prediction.

Figure 25:
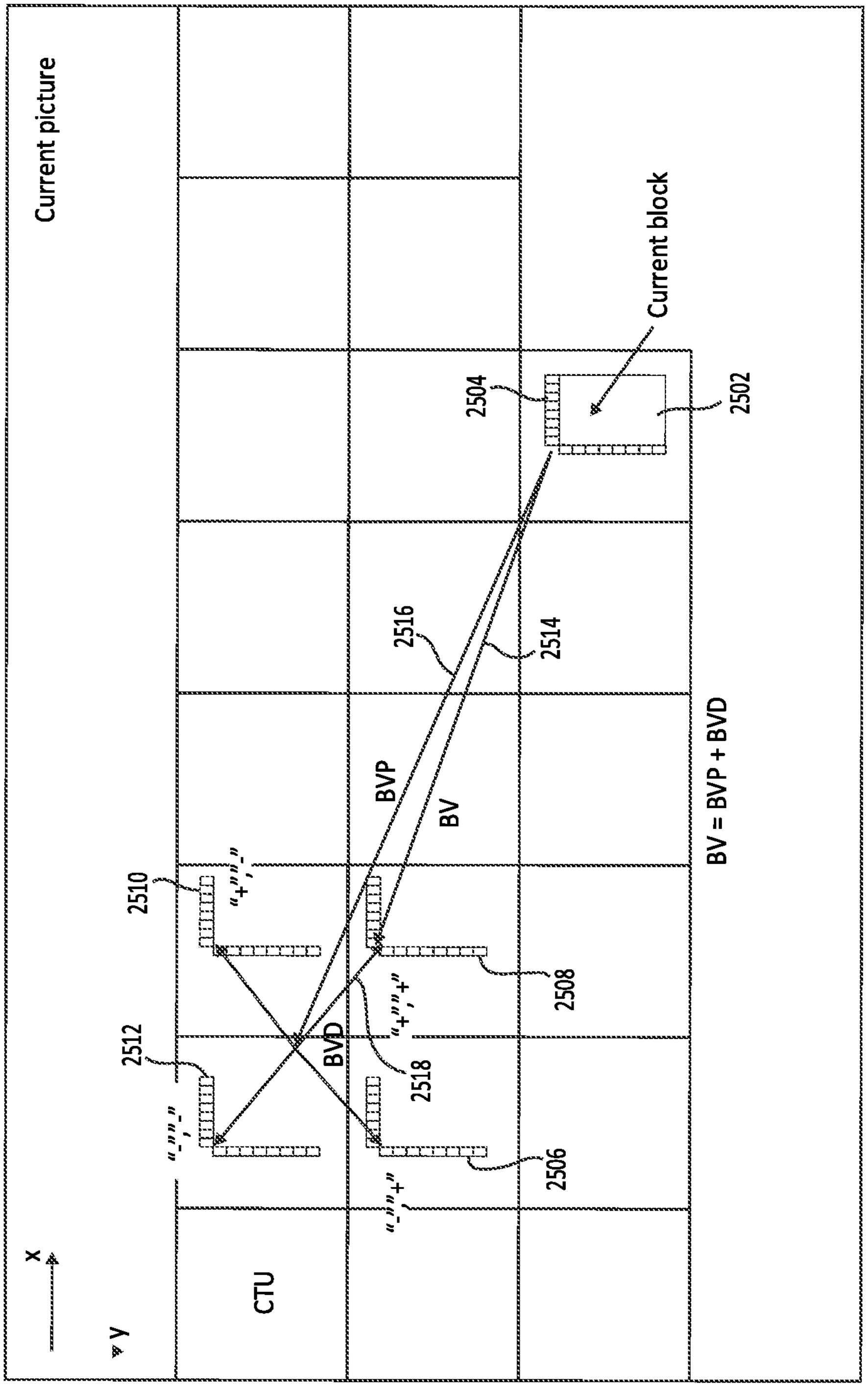
FIG. 25 shows an example determination of a magnitude and sign of a block vector difference (BVD) from a plurality of candidate BVDs.

FIG. 25 shows an example determination of a magnitude and sign of a BVD from a plurality of candidate BVDs. A BVP 2516 for a current block 2502 and candidate BVDs (e.g., BVD 2518) may be determined based on a list of candidate reference blocks. The candidate reference blocks, for example, correspond to templates 2506, 2508, 2510 and 2512. Differences between each of the templates 2506-2512 and the template 2504 of the current block 2502 may be determined using a technique that considers LIC, for example, if the LIC flag is set to "1" (e.g., set to on, used, etc.). The differences may be calculated using either a first difference calculation technique described herein in relation to step 2312 or a second difference calculation technique described herein in relation to steps 2314-2318, for example, if the LIC flag is on. The difference calculation may use the first difference calculation technique, for example, if the LIC flag is off or is not present. The template that may have the minimum difference with the current block template 2504 may be selected as the reference block. The reference block may be the block corresponding to the template 2508 as shown in FIG. 25.

As shown in FIG. 25, the four candidate templates correspond to different x and y component sign combinations of the BVD relative to the BVP. The determination based on the minimum differences may determine that the lower right (corresponding to +, −x, y displacement) template may be elected and allow a determination of BVD 2518. BV 2514 may be calculated as BV=BVP+BVD, for example, based on a determined BVP 2516 and BVD 2518. Both an encoder and/or a decoder may perform these steps. FIGS. 26-29 further illustrate BVD sign and magnitude determination.

Figure 26:
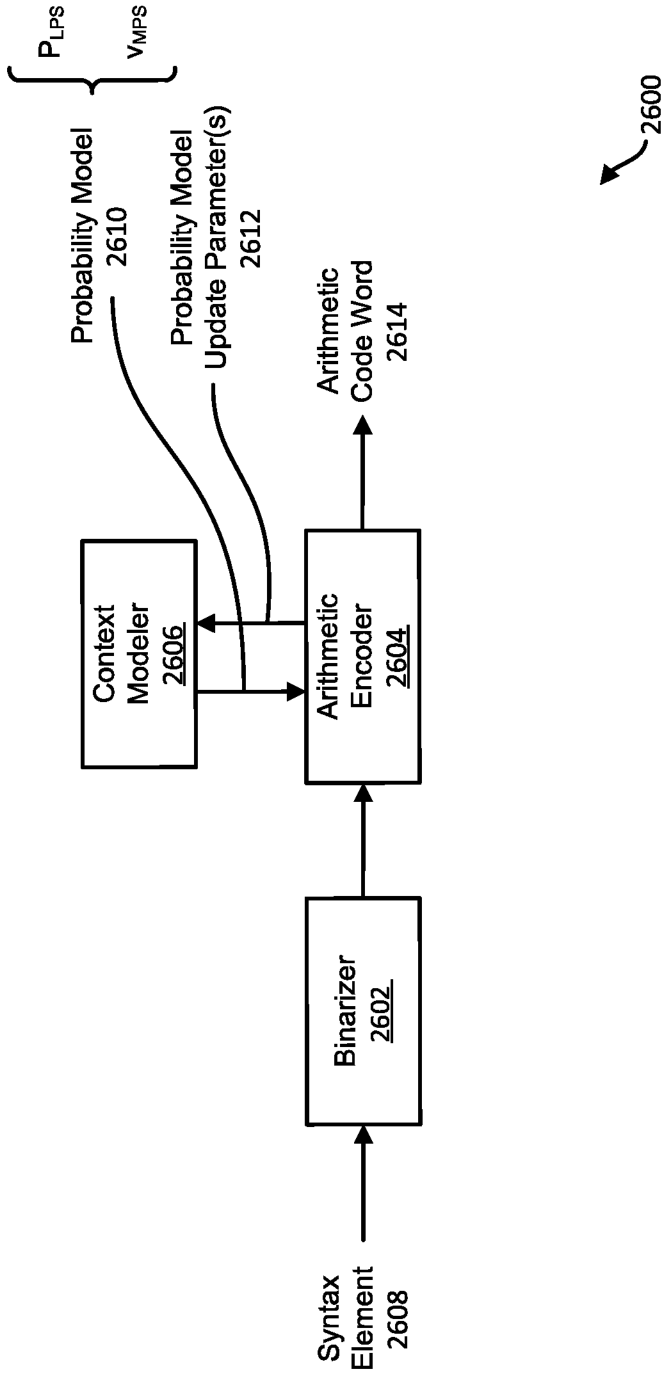
FIG. 26 shows an example of a context-based adaptive binary arithmetic coding (CABAC) encoder.

FIG. 26 shows an example of a context-based adaptive binary arithmetic coding (CABAC) encoder. A CABAC encoder (e.g., CABAC encoder 2600) may be implemented in a video encoder for entropy encoding syntax elements of a video sequence, such as a video encoder 200 as described herein with respect to FIG. 2 or encoder 2102 as described herein with respect to FIG. 21. As shown in FIG. 26, a CABAC encoder (e.g., CABAC encoder 2600) may comprise a binarizer 2602, an arithmetic encoder 2604, and/or a context modeler 2606.

A CABAC encoder (e.g., CABAC encoder 2600) may receive a syntax element 2608 for arithmetic encoding. Syntax elements (e.g., syntax element 2608) may be generated at a video encoder and/or may describe how a video signal may be reconstructed at a video decoder. Syntax elements may comprise an intra prediction mode based on a coding unit (CU) being intra predicted. Syntax elements may comprise motion data (e.g., MVD and MVP related data) based on the CU being inter predicted. Syntax elements may comprise displacement data (e.g., BVD and BVP related data) based on the CU being predicted using IBC.

A binarizer (e.g., binarizer 2602) may map a value of a syntax element (e.g., syntax element 2608) to a sequence of binary symbols (e.g., bins). The binarizer 2602 may define a unique mapping of values of syntax element 2608 to sequences of binary symbols. Binarization of syntax elements may help to improve probability modeling and implementation of arithmetic encoding. The binarizer 2602 may implement one or more binarization processes (e.g., unary, truncated unary, k-th order truncated Rice, k-th order exponential-Golomb (EGk), fixed-length, or some combination of two or more of these binarization processes). The binarizer 2602 may select a binarization process. The binarizer 2602 may select a binarization process, for example, based on a type of syntax element 2608 and/or on one or more syntax elements processed by CABAC encoder 2600 before syntax element 2608. The binarizer 2602 may not process a syntax element 2608. The binarizer 2602 may not process a syntax element 2608, for example, based on syntax element 2608 already being represented by a sequence of one or more binary symbols. A binarizer 2602 may not be used and a syntax element 2608 may be directly encoded by CABAC encoder 2600, for example, if represented by a sequence of one or more non-binary symbols.

One or more of the binary symbols may be processed by an arithmetic encoder (e.g., arithmetic encoder 2604). One or more of the binary symbols may be processed by an arithmetic encoder 2604, for example, based on (e.g., after) the binarizer 2602 optionally maps the value of syntax element 2608 to a sequence of binary symbols. The arithmetic encoder 2604 may process each of the one or more binary symbols in one of at least two modes: regular arithmetic encoding mode or bypass arithmetic encoding mode.

An arithmetic encoder (e.g., arithmetic encoder 2604) may process binary symbols that do not have a uniform, or approximately uniform, probability distribution in regular arithmetic encoding mode (e.g., binary symbols that do not have a probability distribution of 0.5 for each of their two possible values). In a regular arithmetic encoding mode, the arithmetic encoder 2604 may perform arithmetic encoding as described herein. The arithmetic encoder 2604 may, for example, subdivide a current coding interval into m disjoint subintervals. Each of the m disjoint subintervals may have a width proportional to a probability of the binary symbol having a different one of the values in an m-ary source alphabet. For example, with respect to a binary symbol, the value of m may be equal to two and the current coding interval may be subdivided into two disjoint intervals that each have a width proportional to the probability of a different one of the two possible values $\{0, 1\}$ for the binary symbol being encoded. The probabilities of the two possible values for the binary symbol may be indicated by a probability model (e.g., probability model 2610) for the binary symbol. The arithmetic encoder 2604 may encode the binary symbol by choosing a subinterval corresponding to an actual value of the binary symbol as a new coding interval for the next binary symbol to be encoded.

An arithmetic encoder (e.g., arithmetic encoder 2604) may receive a probability model 2610 from a context modeler (e.g., context modeler 2606). The context modeler 2606 may determine the probability model 2610 for the binary symbol by a fixed selection. The context modeler 2606 may determine the probability model 2610 for the binary symbol by a fixed selection, for example, based on a position of the binary symbol in the sequence of binary symbols representing syntax element 2608. The context modeler 2606 may determine the probability model 2610 for the binary symbol by an adaptive selection from among two or more probability models. The context modeler 2606 may determine the probability model 2610 for the binary symbol by an adaptive selection from among two or more probability models, for example, based on information related to the binary symbol. As shown in FIG. 26, a probability model (e.g., probability model 2610) may comprise two parameters: a probability Pups of the least probable symbol (LPS) and the value $V_{MPS}$ of the most probable symbol (MPS). A probability model 2610 may comprise a probability $P_{MPS}$ of the MPS in addition or alternatively to the probability $P_{LPS}$ of the LPS. Similarly, a probability model (e.g., probability model 2610) may comprise a value VIPS of a LPS in addition or alternatively to a value $V_{MPS}$ of a MPS. An arithmetic encoder (e.g., arithmetic encoder 2604) may provide one or more probability model update parameters (e.g., probability model update parameters 2612) to a context modeler (e.g., context modeler 2606). The arithmetic encoder 2604 may provide one or more probability model update parameters 2612 to a context modeler 2606, for example, after arithmetic encoder 2604 encodes the binary symbol. The context modeler 2606 may adapt probability model 2610. The context modeler 2606 may adapt probability model 2610, for example, based on the one or more probability model update parameters 2612. The one or more probability model update parameters 2612 may comprise an actual coded value of a binary symbol. A context modeler 2606 may update a probability model 2610 by increasing $P_{LPS}$ if the actual coded value of the binary symbol is not equal to $V_{MPS}$ and by decreasing $P_{LPS}$ otherwise.

An arithmetic encoder (e.g., arithmetic encoder 2604) may process binary symbols that may have a uniform, or an approximately uniform, probability distribution in bypass arithmetic encoding mode. An arithmetic encoder 2604 may bypass a probability model determination and/or adaptation performed in regular arithmetic encoding mode if encoding these binary symbols to speed up the encoding process, for example, because binary symbols processed by the arithmetic encoder 2604 in bypass arithmetic encoding mode may have a uniform, or approximately uniform, probability distribution. Additionally, subdivision of the current coding interval may be simplified due to the uniform, or approximately uniform, probability distribution. The current coding interval, for example, may be partitioned into two disjoint subintervals of equal width, which may be realized using a simple implementation that may further speed up the encoding process. An arithmetic encoder (e.g., arithmetic encoder 2604) may encode a binary symbol by choosing a subinterval corresponding to a value of a binary symbol as the new coding interval for the next binary symbol to be encoded. The resulting increase in encoding speed for binary symbols encoded by arithmetic encoder 2604 in bypass arithmetic encoding mode may be important because CABAC encoding may have throughput limitations.

An arithmetic encoder (e.g., arithmetic encoder 2604) may determine a value in the range of the final coding interval as an arithmetic code word (e.g., arithmetic code word 2614) for the binary symbols. An arithmetic encoder 2604 may determine a value in the range of the final coding interval as an arithmetic code word 2614 for the binary symbols, for example based on processing a number of binary symbols (e.g., corresponding to one or more syntax elements). The arithmetic encoder 2604 may output an arithmetic code word 2614. The arithmetic encoder 2604 may output the arithmetic code word 2614 to a bitstream that may be received and processed by a video decoder.

Two syntax elements that are coded in bypass arithmetic coding mode are the magnitude of the motion vector difference (MVD) and the magnitude of the block vector difference (BVD). These syntax elements may be respectively determined as part of advanced motion vector prediction (AMVP) for inter prediction and AMVP for intra block copy (IBC) as described herein. Although the bypass arithmetic coding mode may be used to speed up the arithmetic coding process, compression of the symbols of these syntax elements coded in bypass arithmetic encoding mode may be limited because their probability distributions are uniformly distributed, or at least approximately uniformly distributed. From information theory, a symbol cannot be compressed at a rate less than its entropy without loss of information, and a symbol with a uniform probability distribution has maximum entropy. Thus, symbols coded using the bypass arithmetic encoding mode may generally require more bits to encode than symbols encoded using the regular arithmetic encoding mode.

Apparatuses and methods for improving compression efficiency of one or more magnitude symbols of a BVD are described herein. Instead of entropy coding a magnitude symbol of the BVD, the methods described herein may entropy code an indication of whether a value of the magnitude symbol of the BVD matches a value of the magnitude symbol of a BVD candidate used as a predictor of the BVD. A BVD predictor may be selected from among a plurality of BVD candidates. A BVD predictor may be selected from among a plurality of BVD candidates, for example, based on costs of the plurality of BVD candidates. The cost of each BVD candidate in the plurality of BVD candidates may be calculated, for example, based on a difference between a template of a current block and a template of a candidate reference block. The candidate reference block may be displaced relative to the current block by a sum of the BVD candidate and a block vector predictor (BVP). The indication of whether the value of the magnitude symbol of the BVD matches the value of the magnitude symbol of the BVD predictor may have a non-uniform probability distribution and therefore provide improved compression efficiency over coding the magnitude symbol of the BVD based on a uniform probability distribution.

Figure 27A:
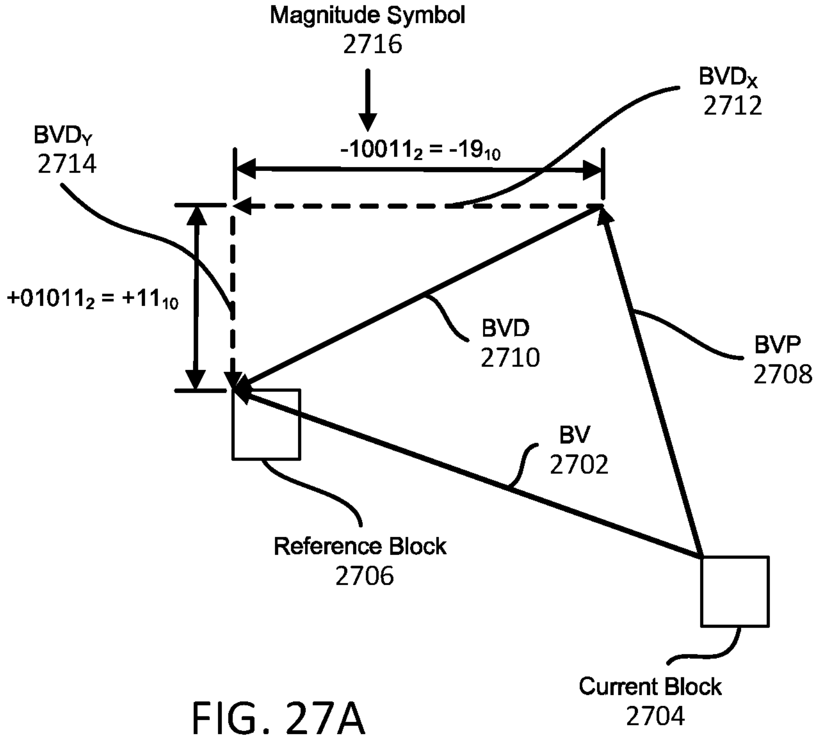
FIG. 27A shows an example of intra block copy (IBC).

FIG. 27A shows an example of IBC. BV 2702, current block 2704, reference block 2706, BVP 2708 and BVD 2710 as shown in FIG. 27A may be considered as respectively corresponding to BV 1710, current block 1702, reference block 1704, BVP 1706 and BVD 1708 as described herein with respect to FIG. 17. A BV (e.g., BV 2702) to be predictively encoded may be determined as described herein with respect to FIG. 17.

A BV (e.g., BV 2702) may be predictively encoded. A BV (e.g., BV 2702) may be predictively encoded, for example, before being signaled in a bit stream. A BV (e.g., BV 2702) may be predictively encoded, for example, based on the BVs of neighboring blocks of current block 2704 or BVs of other blocks. An encoder may predictively encode BV 2702, for example, using the merge mode or AMVP as described herein. The encoder may encode BV 2702 as a difference between BV 2702 and a BV predictor (BVP) 2708 for AMVP, as shown in FIG. 27A. The encoder may select BVP 2708 from a list of candidate BVPs. The candidate BVPs may come from previously decoded BVs of neighboring blocks of current block 2704 or other sources. Both the encoder and decoder may generate or determine the list of candidate BVPs.

An encoder may signal, in a bitstream, an indication of a BVP (e.g., BVP 2708) and a BV difference (e.g., BVD 2710). An encoder may signal, in a bitstream, an indication of BVP 2708 and BVD 2710, for example, based on the encoder selecting BVP 2708 from the list of candidate BVPs. The encoder may indicate BVP 2708 in the bitstream by an index, pointing into the list of candidate BVPs, and/or one or more flags. BVD 2710 may be calculated based on the difference between BV 2702 and BVP 2708. BVD 2710 may comprise a horizontal component ($BVD_x$) 2712 and a vertical component ($BVD_y$) 2714 that may be respectively determined in accordance with Equations (17) and (18) above. The two components $BVD_x$ 2712 and $BVD_y$ 2714 each comprise a magnitude and sign. As shown in FIG. 27A, $BVD_x$ 2712 has a magnitude of 10011 in fixed length binary (or 19 in base 10) and a negative sign. A positive horizontal direction points to the right in the example shown in FIG. 27A. As further shown in FIG. 27A, $BVD_y$ 2714 has a magnitude of 01011 in fixed length binary (or 11 in base 10) and a positive sign. A positive vertical direction points down in the example shown in FIG. 27A. The encoder may indicate BVD 2710 in the bitstream via its two components $BVD_x$ 2712 and $BVD_y$ 2714.

The decoder may decode a BV (e.g., BV 2702) by adding BVD 2710 to BVP 2708. The decoder may decode a current block (e.g., current block 2704) by determining a reference block (e.g., reference block 2706), which forms the prediction of current block 2704, using BV 2702 and combining the prediction with the prediction error. The decoder may determine reference block 2706 by adding BV 2702 to the location of current block 2704, which may give the location of reference block 2706.

As described herein, a magnitude of a BVD (e.g., BVD 2710) may be encoded in bypass arithmetic encoding mode. Although the bypass arithmetic encoding mode may be used to speed up the arithmetic encoding process, compression of the magnitude symbols of BVD 2710 encoded in bypass arithmetic encoding mode may be limited because their probability distributions may be uniformly distributed, or nearly uniformly distributed. From information theory, a symbol cannot be compressed at a rate less than its entropy without loss of information, and a symbol with uniform probability distribution has maximum entropy. Thus, symbols encoded using the bypass arithmetic encoding mode may generally require more bits to encode than symbols encoded using the regular arithmetic encoding mode.

As described herein the compression efficiency of one or more magnitude symbols of a BVD (e.g., BVD 2710) may be improved. An encoder may entropy encode an indication of whether a value of the magnitude symbol of BVD 2710 matches a value of the same magnitude symbol of a BVD candidate used as a predictor of BVD 2710 or not. An encoder may entropy encode this indication, for example, instead of directly entropy encoding a magnitude symbol of BVD 2710. The indication of whether the value of the magnitude symbol of BVD 2710 matches the value of the magnitude symbol of the BVD predictor may have a non-uniform probability distribution and therefore may provide improved compression efficiency. The encoder may select the BVD predictor from among a plurality of BVD candidates. The encoder may select the BVD predictor from among a plurality of BVD candidates, for example, based on costs of the plurality of the BVD candidates. The BVD candidates may include a BVD candidate for each possible value of the magnitude symbol of BVD 2710. A magnitude symbol of BVD 2710 that may be represented in binary form has only two possible values. Therefore, the BVD candidates may include two BVD candidates for this representation, one for each possible value of the magnitude symbol in BVD 2710 being encoded: a first BVD candidate equal to the BVD 2710 itself and a second BVD candidate equal to BVD 2710 but with the opposite (or other) value of the magnitude symbol of BVD 2710. A cost for each BVD candidate in the plurality of BVD candidates may be calculated, for example, based on a difference between a template of current block 2704 and a template of a candidate reference block. The candidate reference block may be displaced relative to the current block by a sum of the BVD candidate and BVP 2708.

FIG. 27A shows an example magnitude symbol 2716 of BVD 2710 to be entropy encoded. Magnitude symbol 2716 of BVD 2710 may be the second most significant bit in the fixed length binary representation of horizontal component $BVD_x$ 2712 of BVD 2710 and may have a binary value of "0". As described herein, the encoder may entropy encode an indication of whether the value of magnitude symbol 2716 of BVD 2710 matches the value of the same magnitude symbol of a BVD candidate used as a predictor of BVD 2710, for example, instead of directly entropy encoding magnitude symbol 2716 of BVD 2710. The encoder may select the BVD predictor from among a plurality of BVD candidates, for example, based on costs of the plurality of BVD candidates. The BVD candidates may include a BVD candidate for each of the two possible values {0, 1} of magnitude symbol 2716 of BVD 2710: a first BVD candidate 2718 equal to BVD 2710 itself and a second BVD candidate 2720 equal to BVD 2710 but with the opposite (or other) value of magnitude symbol 2716 of BVD 2710.

Figure 27B:
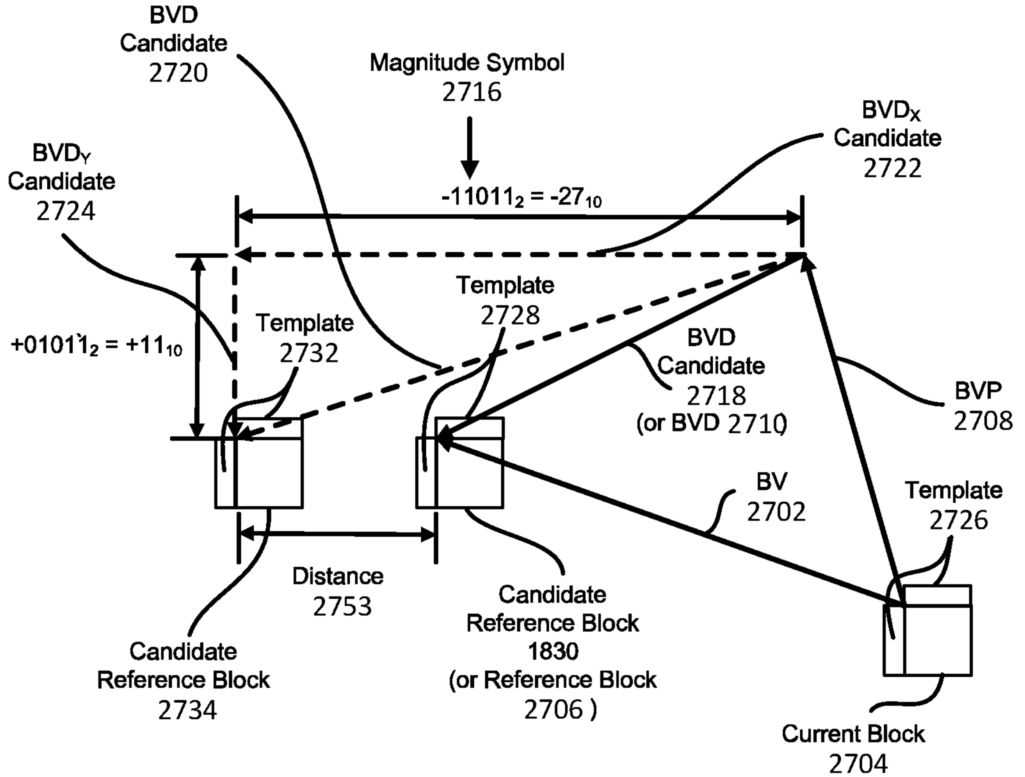
FIG. 27B shows example BVD candidates for entropy encoding a magnitude symbol of a BVD.

FIG. 27B shows example BVD candidates for entropy encoding a magnitude symbol 2716 of a BVD 2710. Specifically, FIG. 27B shows an example BVD candidate 2718 equal to BVD 2710 itself and BVD candidate 2720 equal to the BVD 2710 but with the opposite (or other) value of magnitude symbol 2716 of BVD 2710. With the opposite (or other) value of magnitude symbol 2716 of BVD candidate 2718, BVD candidate 2720 has a horizontal component $BVD_x$ 2722 with a magnitude of 11011 in fixed length binary (or 27 in base 10) and a negative sign. The vertical component BVD, 2724 of BVD candidate 2720 has the same magnitude of 01011 in fixed length binary (or 11 in base 10) and positive sign as vertical component BVD. 2714 of BVD candidate 2718 (or BVD 2710).

The cost for each BVD candidate in the plurality of BVD candidates may be calculated, for example, based on a difference between a template of current block 2726 and a template of a candidate reference block displaced relative to current block 2704 by a sum of the BVD candidate and BVP 2708. An encoder may determine a cost for BVD candidate 2718, for example, based on a difference between a template 2726 of current block 2704 and a template 2728 of a candidate reference block 2730 displaced relative to current block 2704 by a sum of BVD candidate 2718 and BVP 2708. The encoder may determine the difference between template 2726 and template 2728, for example, based on a difference between samples of template 2726 and samples of template 2728. This difference may comprise, for example, a sum of squared differences (SSD), a sum of absolute differences (SAD), a sum of absolute transformed differences (SATD), a mean removal SAD, and/or a mean removal SSD. The encoder may determine a cost for BVD candidate 2720, for example, based on a difference between template 2726 of current block 2704 and a template 2732 of a candidate reference block 2734 displaced relative to current block 2704 by a sum of BVD candidate 2720 and BVP 2708. The encoder may determine the difference between template 2726 and template 2732, for example, based on a difference (e.g., SSD, SAD, SATD, mean removal SAD, or mean removal SSD) between samples of template 2726 and samples of template 2728. Templates 2726, 2728, and 2732 may comprise one or more samples to the left and/or above their respective blocks. Templates 2726, 2728, and 2732 may comprise samples from one or more columns to the left of their respective block and/or from one or more rows above their respective block. FIG. 27B shows one example position and shape (e.g., L-shape rotated clockwise 90 degrees) of templates 2726, 2728, and 2732.

Figure 27C:
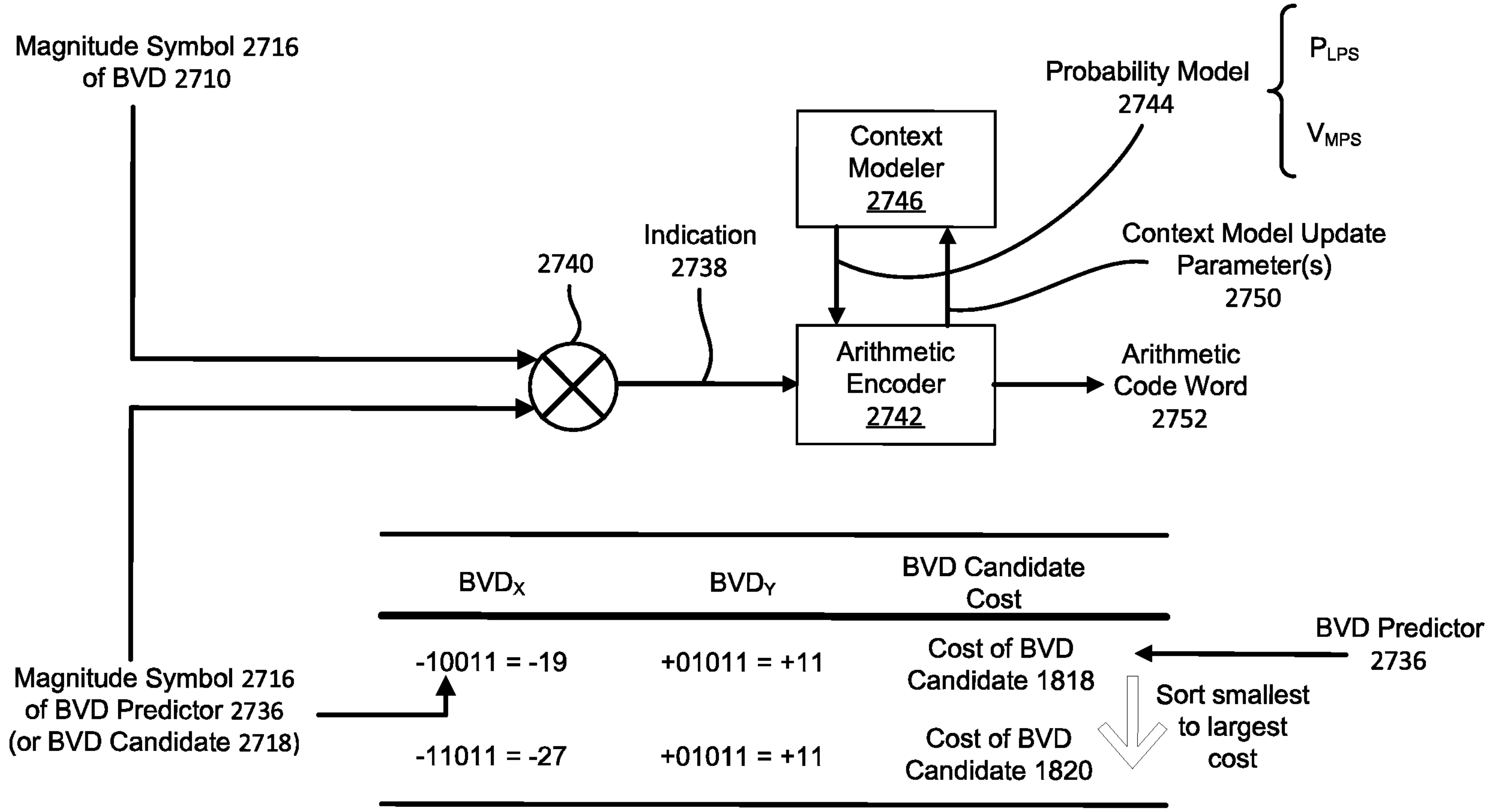
FIG. 27C shows an example table with components and costs of BVD candidates.

An encoder may select one of a plurality of BVD candidates as a BVD predictor. An encoder may select one of a plurality of BVD candidates as a BVD predictor, for example, based on determining the costs of each of the plurality of BVD candidates. The encoder may select the BVD candidate that may have the smallest cost among the plurality of BVD candidates as the BVD predictor. FIG. 27C shows an example table with components and costs of BVD candidates. The BVD candidates 2718 and 2720 may be assumed to be the only BVD candidates. More BVD candidates may be used. The rows of the table may be sorted by the costs of BVD candidates 2718 and 2720, with the BVD candidate with the smallest cost on top. BVD candidate 2718 may have the smallest cost among BVD candidates 2718 and 2720. The encoder may select BVD candidate 2718 as the BVD predictor 2736 for BVD 2710, for example, because BVD candidate 2718 has the smallest cost among BVD candidates 2718 and 2720.

An encoder may entropy encode an indication (e.g., indication 2738) of whether the value of magnitude symbol 2716 of BVD 2710 matches the value of magnitude symbol 2716 in BVD predictor 2736. An encoder may entropy encode an indication 2738 of whether the value of magnitude symbol 2716 of BVD 2710 matches the value of magnitude symbol 2716 in BVD predictor 2736, for example, based on selecting BVD candidate 2718 as BVD predictor 2736. A magnitude symbol 2716 of a BVD predictor (e.g., BVD predictor 2736) may have a value of "0", which matches the value of magnitude symbol 2716 of BVD 2710. An indication 2738 may indicate that a value of magnitude symbol 2716 of BVD 2710 matches the value of magnitude symbol 2716 of BVD predictor 2736. An indication (e.g., indication 2738) may be a single bit that has the value "0" if the value of magnitude symbol 2716 of BVD 2710 matches the value of magnitude symbol 2716 of BVD predictor 2736. An indication (e.g., indication 2738) may be a single bit that has the value "1" if the value of magnitude symbol 2716 of BVD 2710 does not match the value of magnitude symbol 2716 of BVD predictor 2736. Logic (e.g., logic 2740) may be used to determine indication 2738. The logic 2740 may implement a logical exclusive or (XOR) function. The indication 2738 may indicate a first candidate among a plurality of candidates (e.g., as sorted based on their respective costs) may have a value of magnitude symbol 2716 that matches the value of magnitude symbols 2716 in BVD 2710, for example, if a magnitude symbol 2716 is non-binary.

In FIG. 27C, an encoder may entropy encode indication 2738 using an arithmetic encoder (e.g., arithmetic encoder 2742). An indication 2738 may have a non-uniform probability distribution, for example, based on a method of determining an indication (e.g., indication 2738) as described herein. Therefore, an arithmetic encoder 2742 may process indication 2738 in regular arithmetic encoding mode as described herein. The arithmetic encoder 2742 may subdivide a current coding interval into m disjoint subintervals. Each of the m disjoint subintervals may have a width proportional to the probability of the symbol being encoded having a different one of the values in an m-ary source alphabet. For the indication 2738, which is binary, a value of m may be equal to two and the current coding interval may be subdivided into two disjoint intervals that each have a width proportional to the probability of a different one of the two possible values {0, 1} for indication 2738 being encoded. The probabilities of the two possible values for indication 2738 may be indicated by a probability model 2744 for indication 2738. The arithmetic encoder 2742 may encode indication 2738 by choosing the subinterval corresponding to the actual value of indication 2738 as the new coding interval for the next binary symbol to be encoded.

An arithmetic encoder (e.g., arithmetic encoder 2742) may receive a probability model (e.g., probability model 2744) from a context modeler (e.g., context modeler 2746). The context modeler 2746 may determine probability model 2744 for an indication (e.g., indication 2738) by a fixed selection or an adaptive selection from among two or more probability models. The context modeler 2746 may determine probability model 2744 by a fixed selection or an adaptive selection from among two or more probability models, for example, based on a position of magnitude symbol 2716 in $BVD_x$ 2712 of BVD 2710 or an index of (e.g., a value indicating) the position of magnitude symbol 2716 in $BVD_x$ 2712 of BVD 2710. The position (e.g., an index of the position) of magnitude symbol 2716 in $BVD_x$ 2712 of BVD 2710 may provide an indication of the distance 2753 (as described herein with respect to FIG. 27B) between the two candidate BVDs. The likelihood of the value of magnitude symbol 2716 of BVD predictor 2736 matching the value of magnitude symbol 2716 of BVD 2710 may be related to distance 2753. More particularly, the extent of the difference between respective templates of the candidate BVDs may likely be larger for greater values of distance 2753 between the candidate BVDs. The larger the difference between respective templates of the BVD candidates, the more likely the costs of the BVD candidates accurately reflect the BVD candidate with a value of magnitude symbol 2716 that matches the value of magnitude symbol 2716 of BVD 2710. The position (e.g., index of the position) of magnitude symbol 2716 in $BVD_x$ 2712 of BVD 2710 may be helpful in selecting probability model 2744 for indication 2738.

A context modeler (e.g., context modeler 2746) may compare the position (e.g., an index of the position) of magnitude symbol 2716 in $BVD_x$ 2712 of BVD 2710 to one or more thresholds for adaptive selection from among two or more probability models. The context modeler 2746 may compare a position (e.g., an index of the position) of magnitude symbol 2716 in $BVD_x$ 2712 of BVD 2710 to a first threshold. The context modeler 2746 may select a first probability model for indication 2738, for example, based on the position (e.g., an index of the position) of magnitude symbol 2716 in BVD. 2712 of BVD 2710 being less than a threshold. The context modeler 2746 may select a second probability model for indication 2738, for example, based on the position (e.g., an index of the position) of magnitude symbol 2716 in $BVD_x$ 2712 of BVD 2710 being greater than a threshold. A context modeler 2746 may compare the position (e.g., an index of the position) of magnitude symbol 2716 in $BVD_x$ 2712 of BVD 2710 to a second threshold based on the position (e.g., an index of the position) of magnitude symbol 2716 in $BVD_x$ 2712 of BVD 2710 being greater than the threshold. A context modeler 2746 may select a second probability model for indication 2738, for example, based on the position (e.g., an index of the position) of magnitude symbol 2716 in BVD. 2712 of BVD 2710 being less than a second threshold. A context modeler 2746 may select a third probability model for indication 2738, for example, based on the position (e.g., an index of the position) of magnitude symbol 2716 in $BVD_x$ 2712 of BVD 2710 being greater than the second threshold.

A context modeler (e.g., context modeler 2746) may determine a probability model (e.g., probability model 2744) by a fixed selection and/or an adaptive selection from among two or more probability models. A context modeler (e.g., context modeler 2746) may determine a probability model (e.g., probability model 2744) by a fixed selection and/or an adaptive selection from among two or more probability models, for example, based on the change in value of BVD 2710 (or $BVD_x$ 2712 of BVD 2710) for an incremental change in value of magnitude symbol 2716 of BVD 2710. The change in value of BVD 2710 (or $BVD_x$ 2712 of BVD 2710) for an incremental change in value of magnitude symbol 2716 of BVD 2710 may be determined as $2^{(n-1)}$, where n is the bit position of magnitude symbol 2716 in $BVD_x$ 2712 of BVD 2710. In the example shown in FIG. 27, n=4 and therefore the change in value of BVD 2710 (or $BVD_x$ 2712 of BVD 2710) for an incremental change in value of magnitude symbol 2716 of BVD 2710 may be determined as $2^{(4-1)}$ or 8. The change in value of BVD 2710 (or $BVD_x$ 2712 of BVD 2710) for an incremental change in value of magnitude symbol 2716 of BVD 2710 may provide an indication of the distance 2753 (as shown in FIG. 27B) between the two candidate BVDs. As described herein, the likelihood of the value of magnitude symbol 2716 of BVD predictor 2736 matching the value of magnitude symbol 2716 of BVD 2710 may be related to distance 2753. The extent of the difference between respective templates of the candidate BVDs may likely be larger for greater values of distance 2753 between the candidate BVDs. The larger the difference between respective templates of the BVD candidates, the more likely the costs of the BVD candidates accurately reflect the BVD candidate with a value of magnitude symbol 2716 that matches the value of magnitude symbol 2716 of BVD 2710. Thus, the change in value of BVD 2710 (or $BVD_x$ 2712 of BVD 2710) for an incremental change in value of magnitude symbol 2716 of BVD 2710 may be helpful in selecting probability model 2744 for indication 2738.

A context modeler (e.g., context modeler 2746) may compare the value of BVD 2710 (or $BVD_x$ 2712 of BVD 2710) for an incremental change in value of magnitude symbol 2716 of BVD 2710 to one or more thresholds. A context modeler (e.g., context modeler 2746) may compare the value of BVD 2710 (or $BVD_x$ 2712 of BVD 2710) for an incremental change in value of magnitude symbol 2716 of BVD 2710 to one or more thresholds, for example, for adaptive selection from among two or more probability models. A context modeler 2746 may compare, for example, the value of BVD 2710 (or $BVD_x$ 2712 of BVD 2710) for an incremental change in value of magnitude symbol 2716 of BVD 2710 to a first threshold. A context modeler 2746 may select a first probability model for indication 2738, for example, based on the value of BVD 2710 (or $BVD_x$ 2712 of BVD 2710) for an incremental change in value of magnitude symbol 2716 of BVD 2710 being less than the threshold. A context modeler 2746 may select a second probability model for indication 2738, for example, based on the value of BVD 2710 (or $BVD_x$ 2712 of BVD 2710) for an incremental change in value of magnitude symbol 2716 of BVD 2710 being greater than a threshold. A context modeler 2746 may compare the value of BVD 2710 (or $BVD_x$ 2712 of BVD 2710) for an incremental change in value of magnitude symbol 2716 of BVD 2710 to a second threshold, for example, based on the value of BVD 2710 (or $BVD_x$ 2712 of BVD 2710) for an incremental change in value of magnitude symbol 2716 of BVD 2710 being greater than a threshold. A context modeler 2746 may select a second probability model for indication 2738, for example, based on the value of BVD 2710 (or $BVD_x$ 2712 of BVD 2710) for an incremental change in value of magnitude symbol 2716 of BVD 2710 being less than the second threshold. A context modeler 2746 may select a third probability model for indication 2738, for example, based on the value of BVD 2710 (or $BVD_x$ 2712 of BVD 2710) for an incremental change in value of magnitude symbol 2716 of BVD 2710 being greater than the second threshold.

As shown in FIG. 27C, a probability model (e.g., probability model 2744) may comprise two parameters: a probability $P_{LPS}$ of a least probable symbol (LPS) for indication 2738 and a value $V_{MPS}$ of a most probable symbol (MPS) for indication 2738. A probability model 2744 may comprise the probability $P_{MPS}$ of the MPS for indication 2738 in addition, or alternatively, to the probability $P_{LPS}$ of the LPS for indication 2738. Similarly, a probability model (e.g., probability model 2744) may comprise the value $V_{LPS}$ of the LPS for indication 2738 in addition, or alternatively, to the value $V_{MPS}$ of the MPS for indication 2738. The arithmetic encoder 2742 may provide one or more probability model update parameters 2750 to a context modeler 2746. The arithmetic encoder 2742 may provide one or more probability model update parameters 2750 to a context modeler 2746, for example, based on an arithmetic encoder 2742 encoding indication 2738. The context modeler 2746 may adapt a probability model 2744 based on the one or more probability model update parameters 2750. The one or more probability model update parameters 2750 may comprise the actual coded value of indication 2738. A context modeler 2746 may update a probability model (e.g., probability model 2744) by increasing $P_{LPS}$ for indication 2738 if the actual coded value of indication 2738 is not equal to $V_{MPS}$ and by decreasing $P_{LPS}$ for indication 2738 otherwise.

An arithmetic encoder (e.g., arithmetic encoder 2742) may determine a value in a range of a final coding interval as an arithmetic code word (e.g., arithmetic code word 2752) for binary symbols. An arithmetic encoder 2742 may determine a value in a range of a final coding interval as an arithmetic code word 2752 for binary symbols, for example, based on processing a number of binary symbols (e.g., corresponding to one or more syntax elements). The arithmetic encoder 2742 may output an arithmetic code word 2752. An arithmetic encoder 2742 may output an arithmetic code word 2752 to a bitstream that may be received and processed by a video decoder.

Figure 27D:
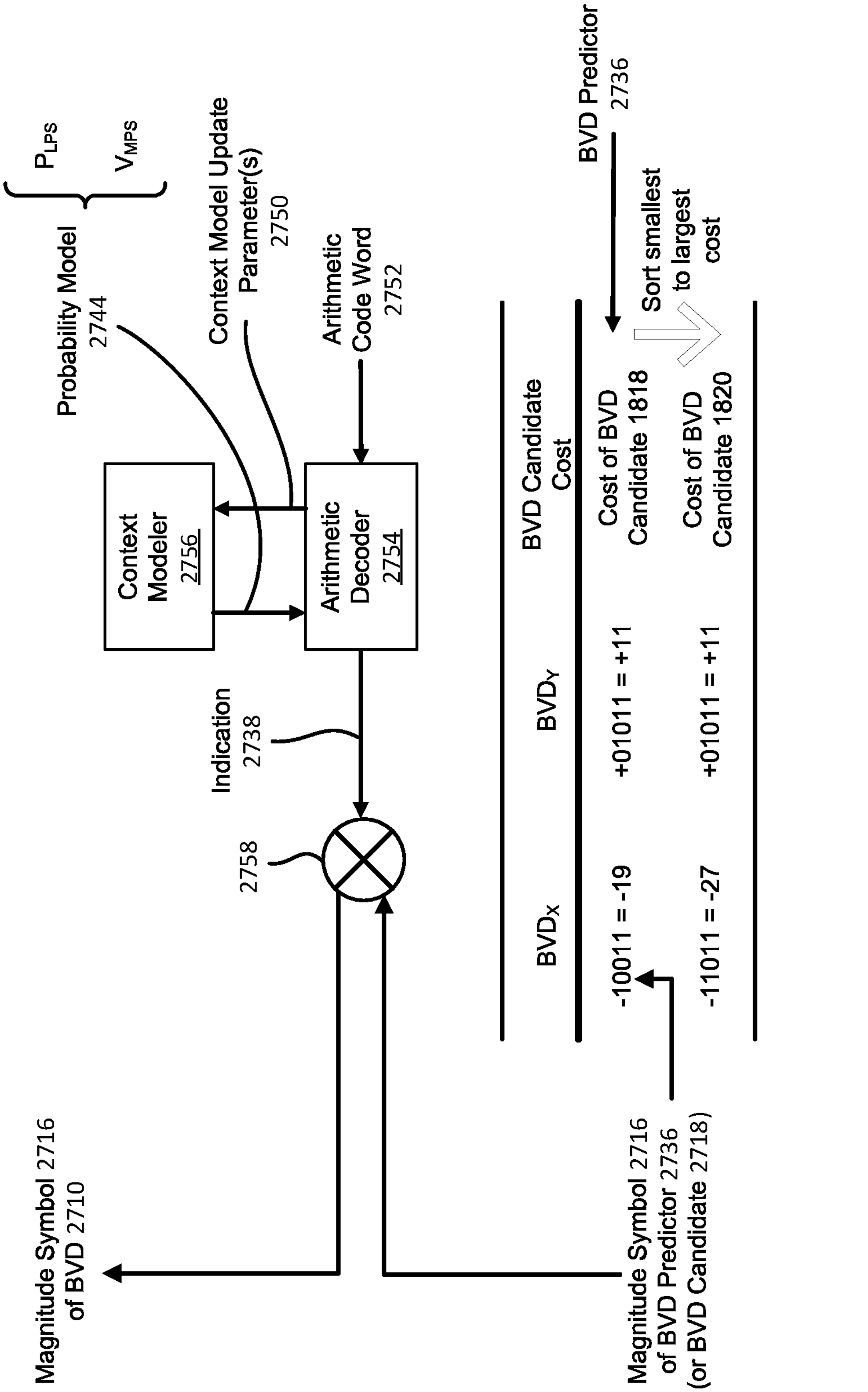
FIG. 27D shows an example of a decoder determining a magnitude signal of a BVD.

FIG. 27D shows an example of a decoder determining a magnitude signal of a BVD. FIG. 27D shows an example of a decoder (e.g., decoder 300 as described with respect to FIG. 3) that may receive an arithmetic code word (e.g., arithmetic code word 2752), an arithmetically decode indication (e.g., arithmetically decode indication 2738) from arithmetic code word 2752, and use indication 2738 to determine a magnitude symbol (e.g., magnitude symbol 2716) of BVD 2710.

A decoder may receive an arithmetic code word (e.g., arithmetic code word 2752) in a bitstream. The decoder may provide an arithmetic code word (e.g., arithmetic code word 2752) to an arithmetic decoder 2754. An indication 2738 may have a non-uniform probability distribution based on a method of determining indication 2738 as described herein. Therefore, arithmetic decoder 2754 may process indication 2738 in regular arithmetic decoding mode. An arithmetic decoder (e.g., arithmetic decoder 2754) may perform recursive interval subdivision as explained herein to decode symbols encoded by the arithmetic code word 2752. An arithmetic decoder (e.g., arithmetic decoder 2754) may arithmetically decode a symbol that may take a value from an m-ary source alphabet by dividing an initial coding interval into m disjoint subintervals. Each of the m disjoint subintervals may have a width proportional to the probability of the symbol having a different one of the values in the m-ary source alphabet. The value m may be equal to two and the initial coding interval may be subdivided into two disjoint intervals that each have a width proportional to the probability of a different one of the two possible values {0, 1} for binary symbols like indication 2738. The probabilities of the symbol having different values in the m-ary source alphabet may be referred to as a probability model for the symbol as described herein. The symbol may be arithmetically decoded from an arithmetic code word 2752 by determining the symbol value corresponding to the subinterval in which the arithmetic code word falls within. The decoder may sequentially decode each symbol $s_i$ of a sequence $s=\{s_1, s_2, \ldots, s_N\}$ encoded by arithmetic code word 2752 by recursively using this interval-subdivision scheme N times and determining which subinterval arithmetic code word 2752 falls within during each iteration.

An arithmetic decoder (e.g., arithmetic decoder 2754) may receive a probability model (e.g., probability model 2744) for indication 2738 from context modeler 2746. An arithmetic decoder (e.g., arithmetic decoder 2754) may receive a probability model (e.g., probability model 2744) for indication 2738 from context modeler 2746, for example, if decoding the symbol corresponding to indication 2738. A context modeler (e.g., context modeler 2756) may determine probability model 2744 for indication 2738 by a fixed selection or by an adaptive selection from among two or more probability models as described herein with respect to context modeler 2746, as shown in FIG. 27C.

As shown in FIG. 27D, an arithmetic decoder (e.g., arithmetic decoder 2754) may provide one or more probability model update parameters 2750 to a context modeler (e.g., context modeler 2756). The arithmetic decoder 2754 may provide one or more probability model update parameters 2750 to a context modeler 2756, for example, based on (e.g., after) arithmetic decoder 2754 decoding indication 2738. The context modeler 2756 may adapt probability model 2744. The context modeler 2756 may adapt probability model 2744, for example, based on the one or more probability model update parameters 2750. The one or more probability model update parameters 2750 may comprise an actual decoded value of indication 2738. The context modeler 2756 may update probability model 2744 by increasing $P_{LPS}$ for indication 2738 if the actual decoded value of indication 2738 is not equal to $V_{MPS}$ and by decreasing $P_{LPS}$ for indication 2738 otherwise.

A decoder may determine a value of magnitude symbol 2716 of BVD 2710, for example, based on the value of magnitude symbol 2716 of BVD predictor 2736 and the value of indication 2738. A decoder may determine a value of magnitude symbol 2716 of BVD 2710 based on the value of magnitude symbol 2716 of BVD predictor 2736 and the value of indication 2738, for example, after entropy decoding indication 2738. The decoder may determine the value of magnitude symbol 2716 of BVD 2710 as being equal to the magnitude symbol of BVD predictor 2736, for example, based on indication 2738 indicating that the value of magnitude symbol 2716 of BVD 2710 matches the value of magnitude symbol 2716 of BVD predictor 2736. The decoder may determine the value of magnitude symbol 2716 of BVD 2710 as being not equal to, or equal to the opposite value of, magnitude symbol 2716 of BVD predictor 2736, for example, based on indication 2738 indicating that the value of magnitude symbol 2716 of BVD 2710 does not match the value of magnitude symbol 2716 of BVD predictor 2736. Magnitude symbol 2716 of BVD predictor 2736 may have a value of "0", that matches the value of magnitude symbol 2716 of BVD 2710. An indication 2738 may indicate that the value of magnitude symbol 2716 of BVD 2710 matches the value of magnitude symbol 2716 of BVD predictor 2736. An indication 2738 may be a single bit that may have the value "0", for example, if the value of magnitude symbol 2716 of BVD 2710 matches the value of magnitude symbol 2716 of BVD predictor 2736. An indication 2738 may be a single bit that may have the value "1", for example, if the value of magnitude symbol 2716 of BVD 2710 does not match the value of magnitude symbol 2716 of BVD predictor 2736. Logic 2758 may be used to determine magnitude symbol 2716 of BVD 2710. The logic 2758 may implement a logical XOR function. The indication 2738 may indicate that the first candidate among the plurality of candidates (e.g., as sorted based on their respective costs) that has a value of magnitude symbol 2716 that matches the value of magnitude symbols 2716 in BVD 2710, for example, if the magnitude symbol 2716 is non-binary.

A decoder may determine a value of magnitude symbol 2716 of BVD predictor 2736 as described herein. More specifically, the decoder may select a BVD predictor (e.g., BVD predictor 2736) from among a plurality of BVD candidates based on costs of the plurality of the BVD candidates. The BVD candidates may include a BVD candidate for each possible value of the magnitude symbol of BVD 2710. A magnitude symbol of BVD 2710 represented in binary form may only have two possible values. Therefore, the BVD candidates may include at least two BVD candidates for this representation, one for each possible value of the magnitude symbol in BVD 2710 being encoded: a first BVD candidate may be equal to BVD 2710 itself and a second BVD candidate may be equal to BVD 2710 but with the opposite, or other, value of the magnitude symbol of BVD 2710. The cost for each BVD candidate in the plurality of BVD candidates may be calculated as described herein with respect to the encoder. cost for each BVD candidate in the plurality of BVD candidates may be calculated as described herein with respect to the encoder, for example, based on a difference between a template of current block 2704 and a template of a candidate reference block. The candidate reference block may be displaced relative to the current block by a sum of the BVD candidate and BVP 2708. The decoder may select the BVD candidate with the lost cost as BVD predictor 2736.

The example approach to entropy code an indication of whether a value of a magnitude symbol of a BVD matches, or does not match, a value of the magnitude symbol of a BVD candidate used as a predictor of the BVD, as discussed herein with respect to FIG. 27, may be used with multiple magnitude symbols of the BVD. This example approach may be further used with one or more magnitude symbols of $BVD_x$ 2716 other than magnitude symbol 2716. For each additional magnitude symbol of $BVD_x$ 2716 that the example approach discussed herein with respect to FIG. 27 is used, additional candidate BVPs may be determined. Using this approach, for example, to N magnitude symbols of $BVD_x$ 2716 (where N is an integer value), 2^N different BVP candidates may be determined—one for each possible combination of values for the N magnitude symbols of $BVD_x$ 2716. Cost values may be further determined for each of the BVP candidates and sorted to determine a BVP predictor for encoding each of the N magnitude symbols of $BVD_x$ 2716.

The example approach to entropy code an indication of whether a value of a magnitude symbol of a BVD matches, or does not match, a value of the magnitude symbol of a BVD candidate used as a predictor of the BVD, as discussed herein with respect to FIG. 27, may be used with one or more magnitude symbols of $BVD_y$ 2714 in addition or alternatively to one or more magnitude symbols of $BVD_x$ 2716.

Although components $BVD_y$ 2714 and $BVD_x$ 2716 of BVD 2710 and components of BVD candidates may use fixed-length binary, other binarizations of components $BVD_y$ 2714 and $BVD_x$ 2716 of BVD 2710 and components of BVD candidates may be possible. Components $BVD_y$ 2714 and $BVD_x$ 2716 of BVD 2710, for example, may be represented using unary, truncated unary, k-th order truncated Rice, k-th order exponential-Golomb (Egk), or some combination of two or more of these binarization processes. For Egk, each codeword may include a unary prefix of length $L_N+1$ and a suffix of length $L_N+k$, where $L_N=[\log_2((N>>k)+1)]$. For Egk representations of components $BVD_y$ 2714 and $BVD_x$ 2716 of BVD 2710 and components of BVD candidates, any magnitude symbols coded using the example approach discussed herein with respect to FIG. 27 may be in the respective suffix of one or more of components $BVD_y$ 2714 and $BVD_x$ 2716 of BVD 2710 and components of BVD candidates.

The examples discussed herein with respect to FIG. 27 may be used with IBC and inter prediction, for example, based on a translational motion model for the prediction block. The examples as described herein with respect to FIG. 27 may be used with IBC and inter prediction, for example, based on an affine motion model for the prediction block.

Figure 28:
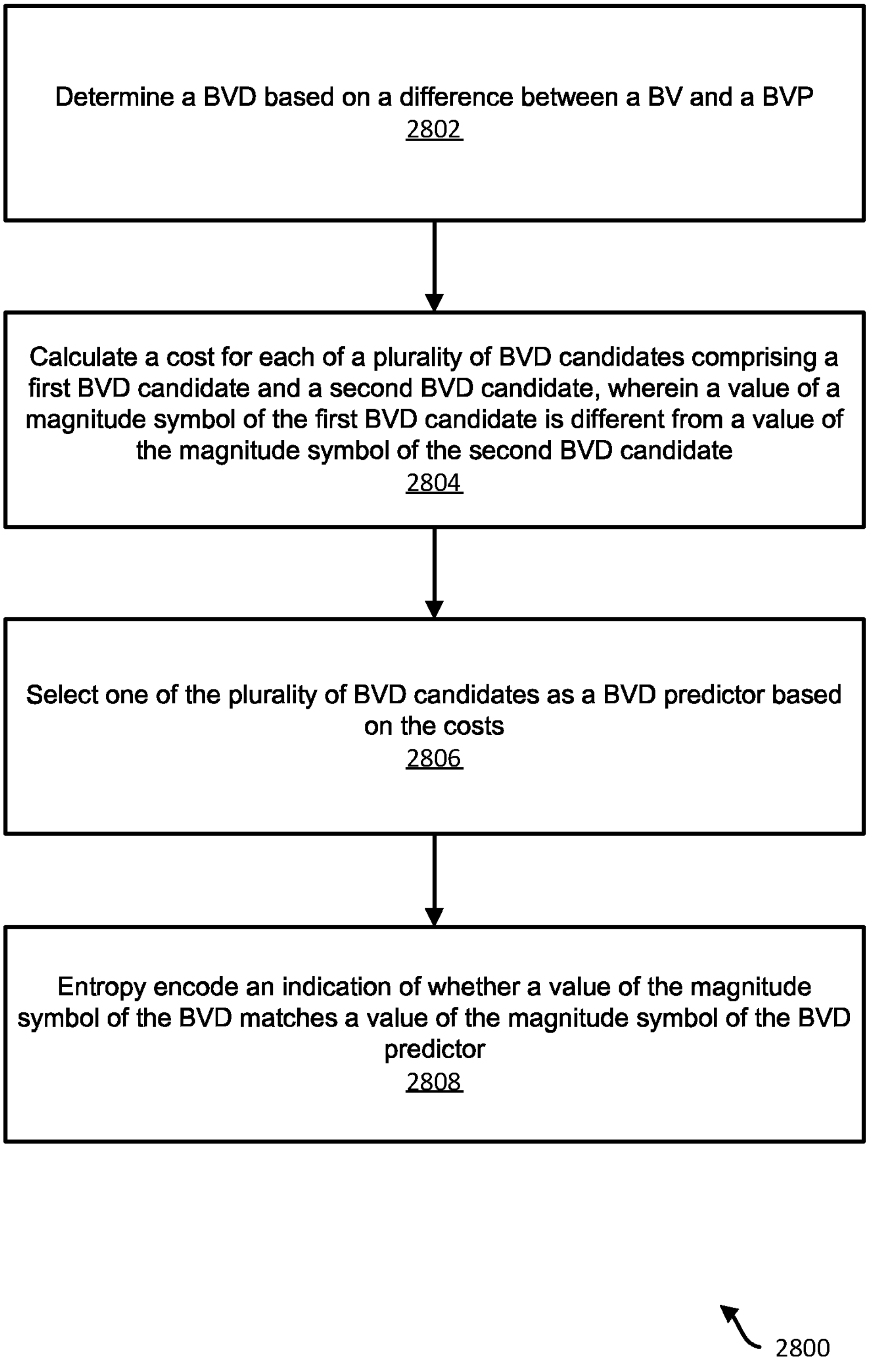
FIG. 28 shows a method for entropy encoding.

FIG. 28 shows a method for entropy encoding. FIG. 28 shows a flowchart 2800. FIG. 28 shows an example method for entropy encoding an indication of whether a value of a magnitude symbol of a BVD matches, or does not match, a value of the magnitude symbol of a BVD candidate used as a predictor of the BVD. One or more steps of the example flowchart 2800 may be performed by an encoder (e.g., encoder 200 as described herein with respect to FIG. 2 or encoder 2102 as described herein with respect to FIG. 21).

At step 2802, an encoder may determine a BVD. The encoder may determine a BVD, for example, based on a difference between a BV and a BVP. The BV may indicate a displacement of a reference block relative to a current block, and the reference block may be used to predict the current block.

At step 2804, an encoder calculates a cost for each of a plurality of BVD candidates. The plurality of BVD candidates may comprise at least a first BVD candidate and a second BVD candidate, wherein a value of a magnitude symbol of the first BVD candidate may be different from a value of the magnitude symbol of the second BVD candidate. The encoder may calculate a cost, for each BVD candidate in the plurality of BVD candidates, for example, based on a difference between a template of a current block and a template of a candidate reference block displaced relative to the current block by a sum of the BVD candidate and the BVP. The BVD may be one of the first or second BVD candidates. A first BVD candidate may differ from a second BVD candidate by the value of a magnitude symbol. The magnitude symbol may be either a horizontal or vertical component of the first BVD candidate. The first and second BVD candidates may be represented in binary form. The first and second BVD candidates may be represented in binary form using unary, truncated unary, k-th order truncated Rice, k-th order exponential-Golomb (EGk), fixed-length, or some combination of two or more of these binarization processes. The first BVD candidate may be represented in binary form using a Golomb code word comprising the magnitude symbol of the first BVD candidate in a suffix of the Golomb code word. The Golomb code word may be an exponential-Golomb code word.

At step 2806, an encoder may select one of the plurality of BVD candidates as a BVD predictor. An encoder may select one of the plurality of BVD candidates as a BVD predictor, for example, based on the costs. The encoder may select one of the plurality of BVD candidates as the BVD predictor, for example, based on the one of the plurality of BVD candidates having a smallest cost among the costs. The BVD predictor may be the first BVD candidate or the second BVD candidate.

At step 2808, an encoder may entropy encodes an indication of whether the magnitude symbol of the BVD matches, or does not match, a value of the magnitude symbol of the BVD predictor. The encoder may arithmetically encode an indication based on a probability model. The probability model may indicate a probability of a least probable symbol for the indication, and a value of a most probable symbol for the indication. The encoder may select the probability model from a plurality of probability models, for example, based on a position of the magnitude symbol in the BVD. The encoder may select the probability model from among the plurality of probability models, for example, based on a change in value of the BVD for an incremental change in value of the magnitude symbol of the BVD. The encoder may select the probability model from among the plurality of probability models, for example, based on a comparison of the change in value of the BVD to one or more thresholds.

Figure 29:
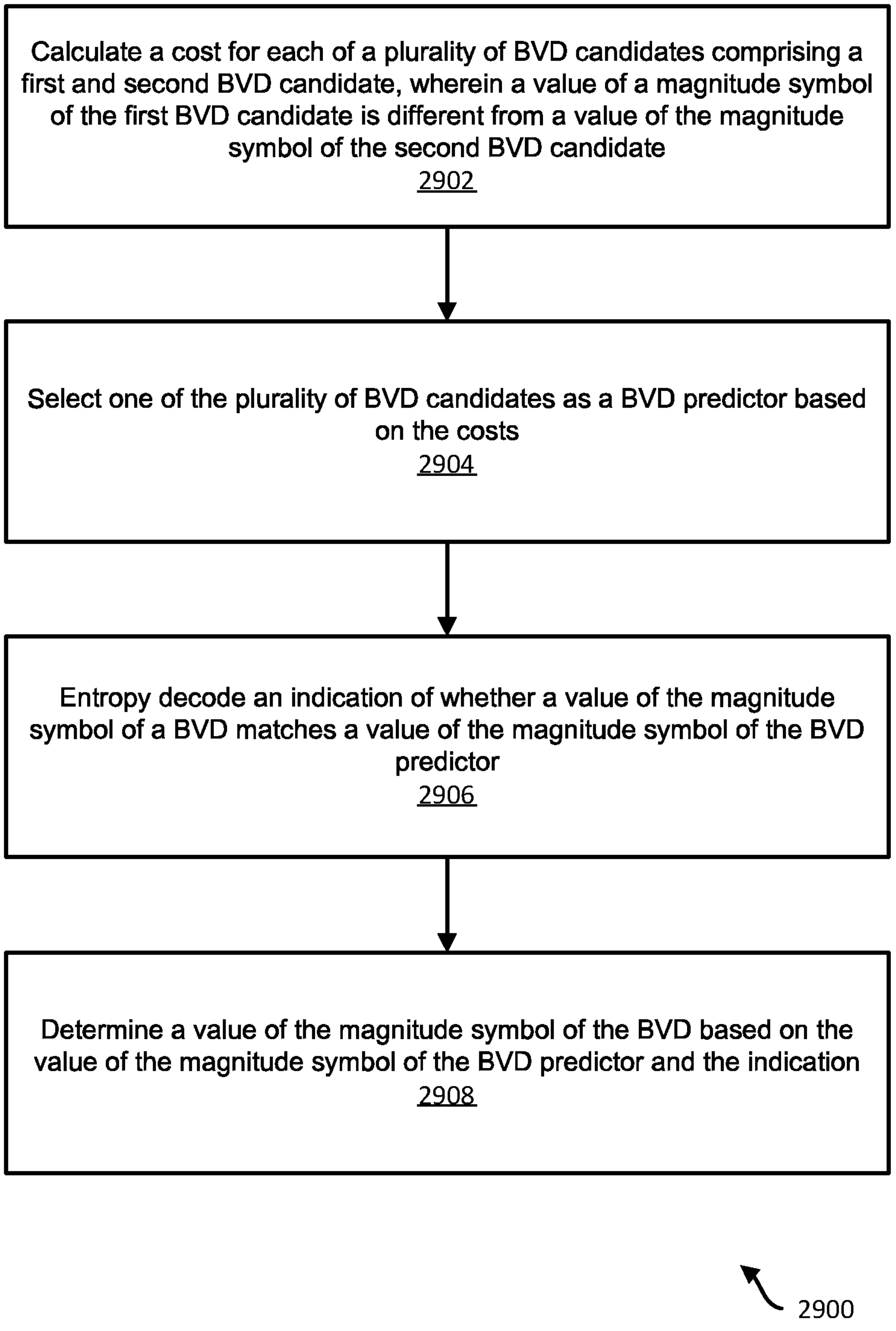
FIG. 29 shows a method for entropy decoding.

FIG. 29 shows a method for entropy decoding. FIG. 29 shows a flowchart 2900. FIG. 29 shows an example method for entropy decoding an indication of whether a value of a magnitude symbol of a BVD matches, or does not match, a value of the magnitude symbol of a BVD candidate used as a predictor of the BVD and using the indication to determine a magnitude symbol of the BVD. One or more steps of the example flowchart 2900 may be performed by a decoder (e.g., decoder 300 as described herein with respect to FIG. 3 or decoder 2104 as described herein with respect to FIG. 21).

At step 2902, a decoder may calculate a cost for each of a plurality of BVD candidates. The BVD candidates may at least comprise a first and second BVD candidate. A value of a magnitude symbol of the first BVD candidate may be different from a value of the magnitude symbol of the second BVD candidate. The first and second BVD candidates may be represented in binary form. The first and second BVD candidates may be represented in binary form using unary, truncated unary, k-th order truncated Rice, k-th order exponential-Golomb (EGk), fixed-length, or some combination of two or more of these binarization processes. The first BVD candidate may be represented in binary form using a Golomb code word comprising the magnitude symbol of the first BVD candidate in a suffix of the Golomb code word. The Golomb code word may be an exponential-Golomb code word.

At step 2904, a decoder may select one of a plurality of BVD candidates as a BVD predictor. A decoder may select one of a plurality of BVD candidates as a BVD predictor, for example, based on the costs. The decoder may select one of the plurality of BVD candidates as the BVD predictor, for example, based on the one of the plurality of BVD candidates having a smallest cost among the costs. The BVD predictor may be the first BVD candidate or the second BVD candidate.

At step 2906, a decoder may entropy decode an indication of whether a value of the magnitude symbol of a BVD matches, or does not match, a value of the magnitude symbol of the BVD predictor. The decoder may arithmetically decode the indication based on a probability mode. The probability model may indicate a probability of a least probable symbol for the indication and a value of a most probable symbol for the indication. The decoder may select the probability model from a plurality of probability models, for example, based on a position of the magnitude symbol in the BVD. The decoder may select the probability model from a plurality of probability models, for example, based on a change in value of the BVD for an incremental change in value of the magnitude symbol of the BVD. The decoder may select the probability mode from the plurality of probability models, for example, based on a comparison of the change in the value of the BVD to one or more thresholds.

At step 2908, a decoder may determine a value of a magnitude symbol of a BVD. A decoder may determine a value of a magnitude symbol of a BVD, for example, based on the value of the magnitude symbol of the BVD predictor and the indication. The decoder may determine the value of the magnitude symbol of the BVD as being equal to the magnitude symbol of the BVD predictor, for example, based on the indication indicating that the value of the magnitude symbol of the BVD matches the value of the magnitude symbol of the BVD predictor. The decoder may determine the value of the magnitude symbol of the BVD as being not equal to the magnitude symbol of the BVD predictor, for example, based on the indication indicating that the value of the magnitude symbol of the BVD does not match the value of the magnitude symbol of the BVD predictor.

A decoder may further determine a BV based on a sum of a BVD and a BVP. The BV may indicate a displacement of a reference block relative to a current block, and the reference block may be used to predict the current block. A decoder may further calculate a cost, for each BVD candidate in the plurality of BVD candidates. A decoder may calculate a cost, for each BVD candidate in the plurality of BVD candidates, for example, based on a difference between a template of a current block and a template of a candidate reference block displaced relative to the current block by a sum of the BVD candidate and the BVP. A BVD may be one of a first or a second BVD candidates. A first BVD candidate may differ from a second BVD candidate by a value of a magnitude symbol. A magnitude symbol may be in either a horizontal or vertical component of a first BVD candidate.

A decoder (e.g., decoder 2104 as described herein with respect to FIG. 21), may receive, in a bitstream, an indication of whether to use, or not use, a local illumination compensation process, and may determine, based on the indication, differences between a template of a current block and a respective template of each candidate reference block of a plurality of candidate reference blocks. A decoder may predict, based on the differences, the current block based on a reference block. The reference block may be one of the plurality of candidate reference blocks. The predicting may include using the local illumination compensation process to the reference block in accordance with the indication. For LIC used with IBC, the current block and the plurality of candidate reference blocks may be within a picture. For LIC used with an inter prediction mode, the plurality of candidate reference blocks may be from one or more different pictures than a current picture of the current block.

Determining by a decoder may comprise calculating differences using a first difference calculation process that may be different from a second difference calculation process used to calculate the differences based on the indication indicating not to use the local illumination compensation, for example, based on an indication indicating to use a local illumination compensation. The second difference calculation process may be less sensitive to illumination differences than the first difference calculation process. The first difference calculation process may include a formula for sum of absolute differences (SAD) and the second difference calculation process may include one of mean-removed SAD (MR-SAD), Hadamard absolute differences (HAD) or sum of absolute transformed differences (SATD).

A determining in the decoder may comprise calculating, for each candidate reference block of a plurality of candidate reference blocks, local illumination compensation parameters based on the template of each candidate reference block, of the plurality of candidate reference blocks, and the template of the current block, for example, based on the indication indicating to use the local illumination compensation. The decoder may use, for each candidate reference block of the plurality of candidate reference blocks, the local illumination compensation process to the template of each candidate reference block, of the plurality of candidate reference blocks, using the calculated parameters. The decoder may calculate the differences after the using the local illumination compensation process. The calculating of differences after the using may comprise calculating the differences using the sum of absolute differences (SAD).

Determining at a decoder may comprise searching a predefined search region in a picture to identify each of the plurality of candidate reference blocks by comparing a template of each of the candidate reference blocks with the template of the current block based on the indication. Determining at a decoder may comprise identifying a plurality of candidate reference blocks in accordance with block vectors of a predetermined set of neighbor blocks of a current block. The decoder may determine an ordering sequence of the candidate reference blocks in accordance with the differences. The predicting the current block may be based on the ordering sequence. Determining at a decoder may comprise determining a block vector predictor and a magnitude of a block vector difference for the current block. The decoder may identify (e.g., determine, obtain (a plurality of candidate reference blocks in accordance with a block vector predictor and a magnitude of the block vector difference. and the decoder may determine a sign of the block vector difference, wherein reconstructing the current block may be based further on the determined sign and the block vector difference.

A decoder may calculate a cost for each of a plurality of block vector difference (BVD) candidates comprising a first BVD candidate and a second BVD candidate. Each of the BVD candidates may correspond to a respective one of the plurality of candidate reference blocks. A value of a magnitude symbol of the first BVD candidate may be different from a value of the magnitude symbol of the second BVD candidate. A decoder may select one of the plurality of BVD candidates as a BVD predictor based on the costs. A decoder may entropy decode a second indication indicating whether a value of the magnitude symbol of a BVD matches a value of the magnitude symbol of the BVD predictor. A decoder may determine a value of the magnitude symbol of the BVD based on the value of the magnitude symbol of the BVD predictor and the second indication. The decoder decoding the indication may comprise arithmetically decoding the indication based on a probability model indicating: a probability of a least probable symbol for the indication; and a value of a most probable symbol for the indication. The first BVD candidate may be represented in binary form using a Golomb code word comprising the magnitude symbol of the first BVD candidate in a suffix of the Golomb code word.

In a decoder, a local illumination compensation process may be in accordance with p'[x]=alpha*p[x]+beta, where p[x] may represent a sample in the template of a candidate reference block or in the candidate reference block, p'[x] may represent the sample resulting from the local illumination process, and alpha and beta may be determined based on the template of the current block and the template of the candidate reference block.

An indication indicating whether to use, or not use, LIC may be a flag associated with a current block. A bitstream received by a decoder may include a second indication associated with the current block indicating use of an intra block copy (IBC) mode. The bitstream may include a third indication associated with the current block indicating the use of a template matching prediction (intra TMP) mode.

An encoder (e.g., encoder 2102 as described herein with respect to FIG. 21), may determine, based on whether a local illumination compensation process may use, or may not use, differences between a template of a current block and a respective template of each candidate reference block from a plurality of candidate reference blocks. The encoder may further predict, based on the differences, the current block based on a reference block, wherein the reference block may be one of a plurality of candidate reference blocks. The encoder may send (e.g., transmit), in a bitstream, a prediction error associated with the reference block and an indication of whether the local illumination compensation applies, or is not used. The predicting may include using the local illumination process to the reference block in accordance with the indication. For LIC used with IBC, the current block and the plurality of candidate reference blocks may be within a picture. For LIC used with an inter prediction mode, the plurality of candidate reference blocks may be from one or more different pictures than a current picture of the current block.

The determining at an encoder may comprise calculating differences using a first difference calculation process that may be different from a second difference calculation process used to calculate the differences based on a local illumination compensation process, for example, based on an indication that the local illumination compensation process is not to be used. A second difference calculation process may be less sensitive to illumination differences than a first difference calculation process. The first difference calculation process may include a formula for sum of absolute differences (SAD) and the second difference calculation process may include one of mean-removed SAD, Hadamard absolute differences (HAD) or sum of absolute transformed differences (SATD).

Determining at an encoder may comprise: based on a local illumination compensation process being used: calculating, for each candidate reference block of the plurality of candidate reference blocks, local illumination compensation parameters based on the template of the each candidate reference block and the template of the current block; using, for each candidate reference block of the plurality of candidate reference blocks, the local illumination compensation process to the template of the each candidate reference block using the calculated parameters; and calculating the differences after the using. Calculating the differences after the using may comprise calculating the differences using the sum of absolute differences (SAD).

Determining at an encoder may comprise searching a predefined search region in a picture to identify each of the candidate reference blocks by comparing a template of each of the candidate reference blocks with the template of the current block based on if the local illumination compensation is to be used.

Determining at an encoder may comprise: identifying a plurality of candidate reference blocks in accordance with block vectors of a predetermined set of neighbor blocks of the current block; and determining an ordering sequence of the candidate reference blocks in accordance with the differences, wherein the predicting the current block is further based on the ordering sequence.

Determining at an encoder may comprise determining a block vector predictor and a magnitude of a block vector difference for the current block; identifying a plurality of candidate reference blocks in accordance with a block vector predictor and magnitude of the block vector difference; and determining a sign of the block vector difference, wherein the predicting is based further on the determined sign.

An encoder may further perform: determining a block vector difference (BVD) based on a difference between a block vector (BV) and a block vector predictor (BVP); calculating a cost for each of a plurality of BVD candidates comprising a first BVD candidate and a second BVD candidate, wherein each of the BVD candidates correspond to a respective one of the plurality of candidate reference blocks, and wherein a value of a magnitude symbol of the first BVD candidate may be different from a value of the magnitude symbol of the second BVD candidate; selecting one of the plurality of BVD candidates as a BVD predictor based on the costs; and entropy encoding an indication of if a value of the magnitude symbol of the BVD matches, or does not match, a value of the magnitude symbol of the BVD predictor. The encoding the indication may further comprise arithmetically encoding the indication based on a probability model indicating: a probability of a least probable symbol for the indication; and a value of a most probable symbol for the indication. The first BVD candidate may be represented in binary form using a Golomb code word comprising the magnitude symbol of the first BVD candidate in a suffix of the Golomb code word.

The various examples discussed herein with respect to FIGS. 27-29 may be further used with one or more magnitude symbols of an MVD used in inter prediction (e.g., affine model/mode, translational model/mode, or multi-hypothesis prediction mode) in addition or alternatively to one or more magnitude symbols of a BVD used in IBC. For inter prediction, the terms BV, BVP, BVD, and BVD candidate may be replaced by the respective terms MV, MVP, MVD, and MVD candidate. The examples discussed herein may be used with IBC and inter prediction. The examples discussed herein may be used with IBC and inter prediction, for example, based on a translational motion model for the prediction block. The examples discussed herein may be used with IBC and inter prediction, for example, based on an affine motion model for the prediction block. Herein, the term "bins" may refer to the bits, or binary symbols, used to encode and decode symbols of BVDs or MVDs.

At the encoder a local illumination compensation process may be in accordance with p'[x]=alpha*p[x]+beta, where p[x] may represent a sample in a template of a candidate reference block or in a candidate reference block, p'[x] may represent a sample resulting from the local illumination process, and alpha and beta may be determined based on the template of the current block and the template of the candidate reference block.

An indication of whether to use, or not use, LIC may be a flag associated with a current block, a bitstream that may include a second indication associated with the current block indicating use of an intra block copy (IBC) mode. The bitstream may include a third indication associated with the current block. The third indication may indicate the use of a template matching prediction (intra TMP) mode.

An encoder (e.g., decoder 2102 as described herein with respect to FIG. 21) may operate to adjust sample values of a reference block in accordance with a local illumination compensation, and reconstructing a current block based on an adjusted reference block and a prediction error from the bitstream.

Figure 30:
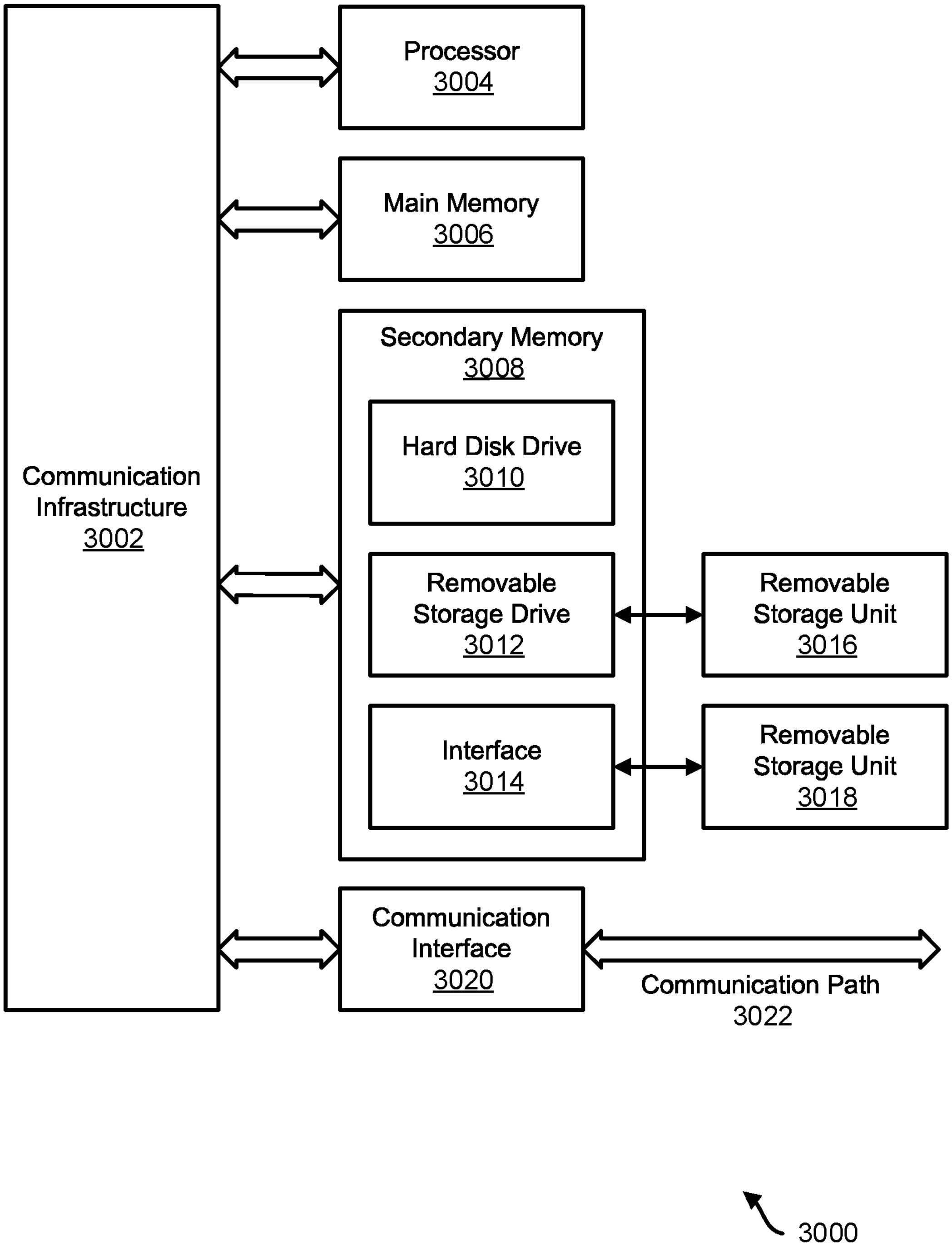
FIG. 30 shows an example of a computer system.

FIG. 30 shows an example of a computer system. For example, the example computer system 3000 shown in FIG. 30 may implement one or more of the methods described herein. For example, various devices and/or systems described herein (e.g., in FIGS. 1, 2, and 3) may be implemented in the form of one or more computer systems 3000. Furthermore, each of the steps of the flowcharts depicted in this disclosure may be implemented on one or more computer systems 3000.

The computer system 3000 may comprise one or more processors, such as a processor 3004. The processor 3004 may be a special purpose processor, a general purpose processor, a microprocessor, and/or a digital signal processor. The processor 3004 may be connected to a communication infrastructure 3002 (for example, a bus or network). The computer system 3000 may also comprise a main memory 3006 (e.g., a random access memory (RAM)), and/or a secondary memory 3008.

The secondary memory 3008 may comprise a hard disk drive 3010 and/or a removable storage drive 3012 (e.g., a magnetic tape drive, an optical disk drive, and/or the like). The removable storage drive 3012 may read from and/or write to a removable storage unit 3016. The removable storage unit 3016 may comprise a magnetic tape, optical disk, and/or the like. The removable storage unit 3016 may be read by and/or may be written to the removable storage drive 3012. The removable storage unit 3016 may comprise a computer usable storage medium having stored therein computer software and/or data.

The secondary memory 3008 may comprise other similar means for allowing computer programs or other instructions to be loaded into the computer system 3000. Such means may include a removable storage unit 3018 and/or an interface 3014. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 3018 and interfaces 3014 which may allow software and/or data to be transferred from the removable storage unit 3018 to the computer system 3000.

The computer system 3000 may also comprise a communications interface 3020. The communications interface 3020 may allow software and data to be transferred between the computer system 3000 and external devices. Examples of the communications interface 3020 may include a modem, a network interface (e.g., an Ethernet card), a communications port, etc. Software and/or data transferred via the communications interface 3020 may be in the form of signals which may be electronic, electromagnetic, optical, and/or other signals capable of being received by the communications interface 3020. The signals may be provided to the communications interface 3020 via a communications path 3022. The communications path 3022 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 3016 and 3018 or a hard disk installed in the hard disk drive 3010. The computer program products may be means for providing software to the computer system 3000. The computer programs (which may also be called computer control logic) may be stored in the main memory 3006 and/or the secondary memory 3008. The computer programs may be received via the communications interface 3020. Such computer programs, when executed, may enable the computer system 3000 to implement the present disclosure as discussed herein. In particular, the computer programs, when executed, may enable the processor 3004 to implement the processes of the present disclosure, such as any of the methods described herein. Accordingly, such computer programs may represent controllers of the computer system 3000.

Figure 31:
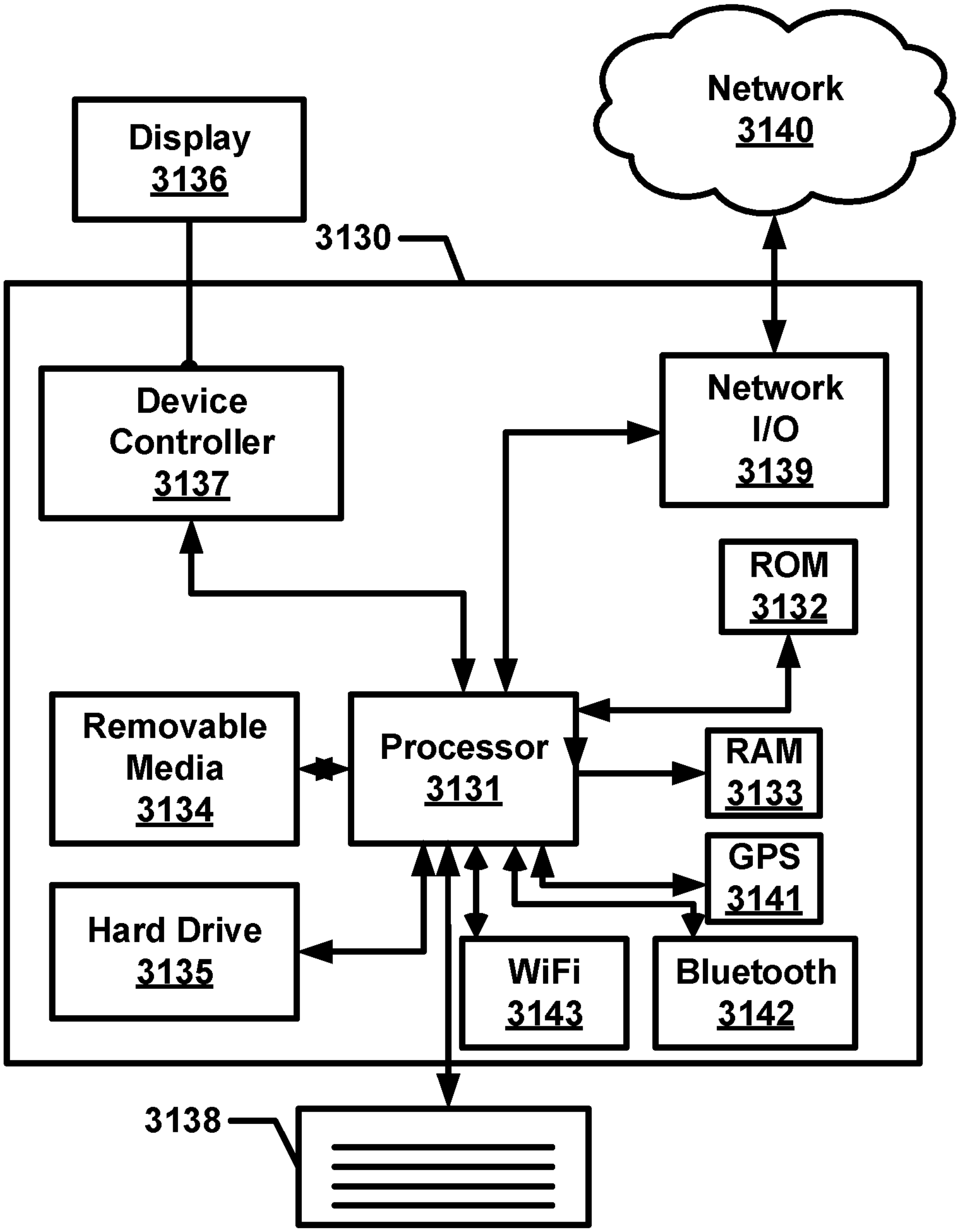
FIG. 31 shows example elements of a computing device that may be used to implement any of the various devices described herein.

FIG. 31 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 3130 may include one or more processors 3131, which may execute instructions stored in the random-access memory (RAM) 3133, the removable media 3134 (such as a Universal Serial Bus (USB) drive, compact disk (CD) or digital versatile disk (DVD), or floppy disk drive), or any other desired storage medium. Instructions may also be stored in an attached (or internal) hard drive 3135. The computing device 3130 may also include a security processor (not shown), which may execute instructions of one or more computer programs to monitor the processes executing on the processor 3131 and any process that requests access to any hardware and/or software components of the computing device 3130 (e.g., ROM 3132, RAM 3133, the removable media 3134, the hard drive 3135, the device controller 3137, a network interface 3139, a GPS 3141, a Bluetooth interface 3142, a WiFi interface 3143, etc.). The computing device 3130 may include one or more output devices, such as the display 3136 (e.g., a screen, a display device, a monitor, a television, etc.), and may include one or more output device controllers 3137, such as a video processor. There may also be one or more user input devices 3138, such as a remote control, keyboard, mouse, touch screen, microphone, etc. The computing device 3130 may also include one or more network interfaces, such as a network interface 3139, which may be a wired interface, a wireless interface, or a combination of the two. The network interface 3139 may provide an interface for the computing device 3130 to communicate with a network 3140 (e.g., a RAN, or any other network). The network interface 3139 may include a modem (e.g., a cable modem), and the external network 3140 may include communication links, an external network, an in-home network, a provider's wireless, coaxial, fiber, or hybrid fiber/coaxial distribution system (e.g., a DOCSIS network), or any other desired network. Additionally, the computing device 3130 may include a location-detecting device, such as a global positioning system (GPS) microprocessor 3141, which may be configured to receive and process global positioning signals and determine, with possible assistance from an external server and antenna, a geographic position of the computing device 3130.

The example in FIG. 31 may be a hardware configuration, although the components shown may be implemented as software as well. Modifications may be made to add, remove, combine, divide, etc. components of the computing device 3130 as desired. Additionally, the components may be implemented using basic computing devices and components, and the same components (e.g., processor 3131, ROM storage 3132, display 3136, etc.) may be used to implement any of the other computing devices and components described herein. For example, the various components described herein may be implemented using computing devices having components such as a processor executing computer-executable instructions stored on a computer-readable medium, as shown in FIG. 31. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. A dimension of a current block may be determined. The dimension of the current block may be determined, aligned with a direction for flipping, based on a reconstruction-reordered intra block copy (RRIBC) mode and the direction for flipping a reference block relative to the current block. A component block vector predictor (BVP) may be determined based on the determined dimension of the current block, wherein the component is in the direction. The component of the BVP may be used to determine or predict a block vector (BV) of the current reference block for the current block. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block. A computer-readable medium may store instructions that, when executed, cause performance of the described method, additional operations and/or include the additional elements.

A computing device may perform a method comprising multiple operations. A computing device may receive an indication of whether to use a local illumination compensation process in a bitstream. Based on the indication, differences may be determined between a respective template for each candidate reference block of a plurality of candidate reference block and a current block may be determined. The current block and the plurality of candidate reference blocks may be within a picture. Based on the determined differences, the current block may be predicted based on a reference block. The reference block may be one of the plurality of candidate reference blocks, and the predicting may include using a local illumination compensation process to the reference block in accordance with the indication. Based on the indication, differences between the current block and the respective template may be determined. Determining the differences between the current block and the respective template may comprise indicating an application of the local illumination compensation and calculating the differences using a first difference calculation. A second difference calculation may be used to calculate the differences based on no indication to use the local illumination compensation. A second difference calculation may be less sensitive to illumination differences than the first difference calculation. A first difference calculation may include an application of a formula for sum of absolute differences (SAD) and a second difference calculation formula may include an application of one of mean-removed SAD (MR-SAD), Hadamard absolute differences (HAD), and/or sum of absolute transformed differences (SATD). Determining the difference may be based on an indication indicating an application of a local illumination compensation process. Determining the difference may comprise calculating local illumination compensation parameters based on a template of each candidate reference block and a template of a current block. The calculating may be for each candidate reference block of a plurality of candidate reference blocks. A local illumination compensation process may be used with the template of each candidate reference block using the calculated parameters for each candidate reference block of the plurality of candidate reference blocks. The difference may be calculated based on the illumination process being used. Calculating the differences after application may comprise calculating the differences using the sum of absolute differences (SAD). Determining the difference may comprise searching a predefined search region in a picture to identify each candidate reference block by comparing the template of each of the candidate reference blocks with the template of the current block based on the indication. Determining the difference may comprise identifying a plurality of candidate reference blocks in accordance with block vectors of a predetermined set of neighbor blocks of the current block, and determining an ordering sequence to order the candidate reference blocks in accordance with the differences. Predicting the current block may be further based on the ordering sequence. Determining a difference may include determining a block vector predictor and/or a magnitude of a block vector difference for a current block. A plurality of candidate reference blocks may be identified in accordance with the block vector predictor and/or the magnitude of the block vector difference. A sign of the block vector difference, may be determined, and reconstructing the current block may be based further on the determined sign and/or the block vector difference. Calculating a cost for each of a plurality of block vector difference (BVD) candidates may be performed. Calculating the cost may comprise a first BVD candidate and/or a second BVD candidate. Each of the BVD candidates may correspond to one of the plurality of candidate reference blocks, and a value of a magnitude symbol of the first BVD candidate may be different from a value of the magnitude symbol of the second BVD candidate. A BVD predictor of the plurality of BVD candidates may be selected based on a cost. A second indication may be entropy decoded to determine whether a value of the magnitude symbol of a BVD matches a value of the magnitude symbol of the BVD predictor. A value of the magnitude symbol of the BVD may be determined based on the value of the magnitude symbol of the BVD predictor and the second indication. Decoding an indication may include arithmetically decoding an indication based on a probability model that may indicate a probability of a least probable symbol for the indication and/or a value of a most probable symbol for the indication. A first BVD candidate may be represented in binary form using a Golomb code word that may comprise a magnitude symbol of a first BVD candidate in a suffix of the Golomb code word. A local illumination compensation process may be in accordance with p'[x] =alpha*p[x]+beta. p[x] may represent a sample in a template of a candidate reference block and/or in the candidate reference block, p'[x] represents a sample resulting from a local illumination process, and alpha and/or beta may be determined based on the template of the current block and/or the template of the candidate reference block. A difference between a template of a current block, after using a local illumination compensation process, and a respective template of each candidate reference block after using the local illumination compensation process may be determined. Determining a difference may comprise an application of a formula for a sum of absolute differences (SAD). An indication may be a flag associated with a current block. A bitstream may include a second indication associated with a current block. The second indication may indicate use of an intra block copy (IBC) mode. A bitstream may include a third indication associated with a current block. The third indication may indicate the use of a template matching prediction (intra TMP) mode. Predicting a current block may be based further on a prediction error from a bitstream. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to send (e.g., transmit) an indication of whether to use a local illumination compensation process in a bitstream. A computer-readable medium may store instructions that, when executed, cause performance of the described method, additional operations and/or include the additional elements.

A computing device may perform a method comprising multiple operations. A computing device may determine differences between a respective template of each candidate reference block from a plurality of candidate reference blocks and a template of a current block, and may be determined if a local illumination compensation process is to be used. The current block and/or the plurality of candidate reference blocks may be within a picture. The current block, based on a reference block, may be predicted based on the differences. The reference block may be one of a plurality of candidate reference blocks, and the predicting may include using the local illumination process to the reference block in accordance with the indication. A prediction error associated with the reference block and/or an indication of whether the local illumination compensation process applies may be sent (e.g., transmitted) in a bitstream. Determining the difference, if a local illumination compensation process may be used, may comprise calculating a differences using a first difference calculation that may be different from a second difference calculation that may be used to calculate a difference if the local illumination compensation process is not used. A second difference calculation may be less sensitive to an illumination differences than a first difference calculation. A first difference calculation may include a formula for sum of absolute differences (SAD) and/or a second difference calculation that may include one of mean-removed SAD, Hadamard absolute differences (HAD), and/or sum of absolute transformed differences (SATD). Determining a difference, if a local illumination compensation process may be used may comprise calculating, for each candidate reference block of a plurality of candidate reference blocks, local illumination compensation parameters based on the template of each candidate reference block and/or the template of the current block. For each candidate reference block, of the plurality of candidate reference blocks, the local illumination compensation process to the template of each candidate reference block using the calculated parameters may be used. The difference may be determined after the local illumination compensation process may be used. Calculating differences after using a local illumination compensation process may comprise calculating the differences using a sum of absolute differences (SAD). Determining a difference may include searching a predefined search region in a picture to identify each of a candidate reference blocks by comparing a template of each of the candidate reference blocks with a template of the current block based on whether the local illumination compensation may be used. Determining a difference may comprise identifying a plurality of candidate reference blocks in accordance with block vectors of a predetermined set of neighbor blocks of the current block. An ordering sequence of candidate reference blocks based on the differences may be determined. Predicting the current block may be based further on the ordering sequence. Determining a difference may include determining a block vector predictor and/or a magnitude of a block vector difference for a current block. A plurality of candidate reference blocks in accordance with the block vector predictor and/or magnitude of the block vector difference may be identified. A sign of the block vector difference may be determined. Predicting may be based further on the determined sign. A block vector difference (BVD) may be determined based on a difference between a block vector (BV) and a block vector predictor (BVP). The difference may be determined based on calculating a cost for each of a plurality of BVD candidates that may comprise a first BVD candidate and/or a second BVD candidate. Each of the BVD candidates may correspond to one of a plurality of candidate reference blocks. The value of a magnitude symbol of the first BVD candidate may be different from a value of the magnitude symbol of the second BVD candidate. A predictor BVD may be selected from the plurality of BVD candidates based on a costs. An indication of whether a value of the magnitude symbol of the BVD matches a value of the magnitude symbol of the BVD predictor may be entropy encoded. Encoding an indication may further comprise arithmetically encoding an indication based on a probability model that may indicate a probability of a least probable symbol for the indication; and/or a value of a most probable symbol for the indication. A first BVD candidate may be represented in binary form using a Golomb code word comprising a magnitude symbol of the first BVD candidate in a suffix of the Golomb code word. A local illumination compensation process may be in accordance with $p'[x]=alpha*p[x]+beta$. $p[x]$ may represent a sample in a template of a candidate reference block and/or in a candidate reference block, $p'[x]$ may represent a sample resulting from the local illumination process, and alpha and/or beta may be determined based on the template of the current block and the template of the candidate reference block. A difference may be determined between a template of the current block, after using a local illumination compensation process, and a respective template of each candidate reference block after using the local illumination compensation process. Determining a difference may comprise an application of a formula for a sum of absolute differences (SAD). An indication may be a flag associated with the current block. A bitstream may include a second indication associated with the current block. The second indication may indicate a use of an intra block copy (IBC) mode. A bitstream may include a third indication associated with the current block. The third indication may indicate a use of a template matching prediction (intra TMP) mode. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to receive in a bitstream the prediction error associated with the reference block and an indication of whether the local illumination compensation process applies. A computer-readable medium may store instructions that, when executed, cause performance of the described method, additional operations and/or include the additional elements.

A computing device may perform a method comprising multiple operations. A computing device may determine a plurality of candidate reference blocks in accordance with block vectors of a predetermined set of neighbor blocks of a current block. The computing device may determine differences between a respective template of each candidate reference block from the plurality of candidate reference blocks and a template of the current block that may be based on an application of a local illumination compensation process. The current block and the plurality of candidate reference blocks may be within a picture. The computing device may determine an ordering sequence of the candidate reference blocks based on the differences. A computing device may predict the current block based on a reference block. The reference block may be one of the plurality of candidate reference blocks based on the differences. The predicting the current block may be based on the ordering sequence. Predicting the current block may include using the local illumination process to the reference block based on the indication. The computing device may send (e.g., transmit), in a bitstream, a prediction error associated with the reference block and an indication of whether the local illumination compensation process applies. The indication may be a flag associated with the current block. The bitstream may include a second indication that may be associated with the current block that may indicate the use of an intra block copy (IBC) mode. The bitstream may include a second indication, that may be associated with the current block, that may indicate the use of a template matching prediction (intra TMP) mode. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to receive in a bitstream the prediction error associated with the reference block and an indication of whether the local illumination compensation process applies. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a computing device in a bitstream, an indication of whether to use a local illumination compensation;

based on the indication, determining differences between a corresponding template of each candidate reference block of a plurality of candidate reference blocks and a template of a current block of content, and wherein the determining the differences comprises:

based on the indication indicating to use the local illumination compensation, determining the differences using a first difference calculation that is different from a second difference calculation for calculating the differences based on the indication indicating not to use the local illumination compensation; and based on the determined differences, predicting the current block by applying the local illumination compensation to a reference block, from the plurality of candidate reference blocks, in accordance with the indication.

2. The method of claim 1, wherein the first difference calculation is less sensitive to illumination differences than the second difference calculation.

3. The method of claim 1, wherein the first difference calculation comprises using a formula for a sum of absolute differences (SAD), and wherein the second difference calculation comprises using one of: a mean-removed SAD (MR-SAD), Hadamard absolute differences (HAD), or a sum of absolute transformed differences (SATD).

4. The method of claim 1, wherein the determining the differences comprises:

based on the indication indicating to use local illumination compensation and for each candidate reference block of the plurality of candidate reference blocks, determining local illumination compensation parameters based on:

the template of each candidate reference block; and the template of the current block;

for each candidate reference block of the plurality of candidate reference blocks:

applying, based on the determined local illumination compensation parameters, the local illumination compensation to the template of the candidate reference block; and after the applying, determining the differences using a sum of absolute differences (SAD).

5. The method of claim 1, wherein the current block and the plurality of candidate reference blocks are within a picture, and wherein the determining the differences comprises:

determining, within a predefined search region of the picture, each candidate reference block of the plurality of candidate reference blocks by comparing, based on the indication, the template of each candidate reference block with the template of the current block.

6. The method of claim 1, wherein the determining the differences comprises:

based on block vectors of a predetermined set of neighboring blocks of the current block, determining the plurality of candidate reference blocks; and determining, based on the differences, an ordering sequence of the candidate reference blocks, wherein the predicting the current block is further based on the determined ordering sequence.

7. The method of claim 1, further comprising:

determining a cost for each of a plurality of block vector difference (BVD) candidates comprising a first BVD candidate and a second BVD candidate, wherein each of the BVD candidates correspond to a respective one of the plurality of candidate reference blocks, and wherein a value of a magnitude symbol of the first BVD candidate is different from a value of a magnitude symbol of the second BVD candidate;

based on the determined costs, selecting one of the plurality of BVD candidates as a BVD predictor;

decoding a second indication indicating whether a value of a magnitude symbol of a BVD matches a value of a magnitude symbol of the BVD predictor; and based on the value of the magnitude symbol of the BVD predictor and the second indication, determining a value of the magnitude symbol of the BVD.

8. The method of claim 1, wherein the indication is a flag associated with the current block.

9. The method of claim 1, wherein the bitstream includes a second indication, associated with the current block, indicating use of an intra block copy (IBC) mode.

10. The method of claim 1, wherein the bitstream includes a second indication, associated with the current block, indicating use of a template matching prediction (intra TMP) mode.

11. The method of claim 1, wherein the predicting the current block is further based on a prediction error received from the bitstream.

12. A method comprising:

based on whether a local illumination compensation is to be applied, determining, by a computing device, differences between a corresponding template of each candidate reference block of a plurality of candidate reference blocks and a template of a current block, wherein the current block and the plurality of candidate reference blocks are within a picture, and wherein the determining the differences comprises:

based on an indication that the local illumination compensation applies to the reference block, determining the differences using a first difference calculation that is different from a second difference calculation for calculating the differences based on the indication indicating not to use the local illumination compensation;

based on the determined differences, predicting the current block by applying the local illumination compensation to a reference block, from the plurality of candidate reference blocks, in accordance with the indication of whether local illumination compensation applies to the reference block; and sending, in a bitstream, a prediction error associated with the reference block and the indication of whether local illumination compensation applies to the reference block.

13. The method of claim 12, wherein the determining the differences comprises:

determining a block vector predictor (BVP) and a magnitude of a block vector difference (BVD) for the current block;

based on the BVP and the magnitude of the BVD, determining the plurality of candidate reference blocks; and determining a sign of the BVD, and wherein the predicting the current block is further based on the determined sign of the BVD.

14. The method of claim 12, further comprising:

determining a block vector difference (BVD) based on a difference between a block vector (BV) and a block vector predictor (BVP);

determining a cost for each of a plurality of BVD candidates comprising a first BVD candidate and a second BVD candidate, wherein each of the BVD candidates correspond to a respective one of the plurality of candidate reference blocks, and wherein a value of a magnitude symbol of the first BVD candidate is different from a value of a magnitude symbol of the second BVD candidate;

based on the determined costs, selecting one of the plurality of BVD candidates as a BVD predictor; and encoding an indication indicating whether a value of a magnitude symbol of the BVD matches a value of the magnitude symbol of the BVD predictor.

15. A method comprising:

determining a plurality of candidate reference blocks in accordance with block vectors of a predetermined set of neighbor blocks of a current block of content;

based on an application of a local illumination compensation, determining differences between a corresponding template of each candidate reference block from the plurality of candidate reference blocks and a template of the current block, wherein the current block and the plurality of candidate reference blocks are within a picture, and wherein the determining the differences comprises:

determining the differences using a first difference calculation that is different from a second difference calculation for calculating the differences based on not applying the local illumination compensation;

determining an ordering sequence of the candidate reference blocks in accordance with the determined differences;

based on the determined differences, predicting the current block based on a reference block and the ordering sequence, wherein the reference block is one of the plurality of candidate reference blocks, and wherein the predicting comprises applying the local illumination compensation to the reference block based on an indication of whether local illumination compensation applies to the reference block; and sending, in a bitstream, a prediction error associated with the reference block and the indication of whether local illumination compensation applies.

16. The method of claim 15, wherein the indication is a flag associated with the current block.

17. The method of claim 15, wherein the bitstream includes a second indication, associated with the current block, indicating use of an intra block copy (IBC) mode.

18. The method of claim 15, wherein the bitstream includes a second indication, associated with the current block, indicating use of a template matching prediction (intra TMP) mode.

19. The method of claim 1, wherein:

the first difference calculation is a sum of absolute differences (SAD); and the second difference calculation is a mean-removed SAD (MR-SAD), a Hadamard absolute differences (HAD), or a sum of absolute transformed differences (SATD).

20. The method of claim 12, wherein:

the first difference calculation is a sum of absolute differences (SAD); and the second difference calculation is a mean-removed SAD (MR-SAD), a Hadamard absolute differences (HAD), or a sum of absolute transformed differences (SATD).

* * * * *